(12) United States Patent
Kuromizu

(10) Patent No.: US 8,939,597 B2
(45) Date of Patent: Jan. 27, 2015

(54) ILLUMINATION DEVICE, DISPLAY DEVICE, AND TELEVISION RECEPTION DEVICE

(75) Inventor: Yasumori Kuromizu, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/006,070

(22) PCT Filed: Apr. 2, 2012

(86) PCT No.: PCT/JP2012/058899
§ 371 (c)(1),
(2), (4) Date: Sep. 18, 2013

(87) PCT Pub. No.: WO2012/133888
PCT Pub. Date: Oct. 4, 2012

(65) Prior Publication Data
US 2014/0009697 A1 Jan. 9, 2014

(30) Foreign Application Priority Data
Apr. 1, 2011 (JP) .................. 2011-081912

(51) Int. Cl.
*G09F 13/04* (2006.01)
*F21V 8/00* (2006.01)
*G02F 1/1335* (2006.01)
*G02F 1/1362* (2006.01)
*G02F 1/1333* (2006.01)

(52) U.S. Cl.
CPC .............. *G02B 6/0088* (2013.01); *G02B 6/005* (2013.01); *G02F 1/133615* (2013.01); *G02F 1/13624* (2013.01); *G02F 2001/133317* (2013.01); *G02F 2001/133322* (2013.01); *G02F 2201/52* (2013.01)

USPC .......................................... 362/97.2; 362/97.1

(58) Field of Classification Search
USPC ............................... 362/97.1–97.2
See application file for complete search history.

(56) References Cited

U.S. PATENT DOCUMENTS
2012/0086883 A1* 4/2012 Wakita et al. ................... 349/61

FOREIGN PATENT DOCUMENTS
JP 2002-116440 A 4/2002

* cited by examiner

*Primary Examiner* — Mary Ellen Bowman
(74) *Attorney, Agent, or Firm* — Chen Yoshimura LLP

(57) ABSTRACT

An illumination device 12 of the present invention is provided with: a housing member 22 that has a bottom plate 22a, a side wall 22b, and a pair of protrusions 22c; a light guide plate 26 having a pair of first end faces 26d, a pair of second end faces 26b that extend in a direction intersecting the first end faces 26d, and a pair of recesses 26e at the respective first end faces 26d, the light guide plate being disposed in the housing member 22 in a manner so that the rear surface 26c thereof faces the bottom plate 22a and the recesses 26e respectively engage the protrusions 22c; a light source unit 2 having light sources 24 and being disposed in the housing member 22 in a manner so that the light sources 24 face at least the second end surfaces 26b of the light guide plate 26; and a frame 27 having a frame-shaped covering plate 27a covering the outer edges W of the plate surface 26a of the light guide plate 26, and a pressing part 27c that protrudes downwards from the covering plate 27a in a manner so as to selectively press the peripheral portion S0 of the recess 26e of the plate surface 26a of the light guide plate 26.

24 Claims, 35 Drawing Sheets

ILLUMINATION DEVICE, DISPLAY DEVICE, AND TELEVISION RECEPTION DEVICE

TECHNICAL FIELD

The present invention relates to an illumination device, a display device, and a television receiver.

BACKGROUND ART

In recent years, liquid crystal panels are in general use as the display part for televisions, mobile telephones, personal digital assistants, and the like. Liquid crystal panels do not emit light on their own, and thus, in order to display images, light from an illumination device (the so-called backlight) is used. This illumination device is disposed on the rear surface side of the liquid crystal panel, and is configured so as to radiate light spread in a planar manner towards the rear surface of the liquid crystal panel.

As the illumination device, a type including a light guide plate and a light source unit disposed to face an end face of the light guide plate is known (Patent Document 1, for example). This type of illumination device is generally known as the side light type (or edge light type), and as the light source unit, a light source unit constituted of a plurality of LEDs and an LED substrate upon which these LEDs are mounted is used, for example. The light guide plate and the light source unit are housed in a box-shaped chassis.

As light from the respective LEDs mounted on the LED substrate is radiated towards an end face of the light guide plate, this light enters the light guide plate through the end face, and travels inside the light guide plate while being reflected by a reflective sheet disposed below the light guide plate and the like. This light is outputted as planar light from the front surface of the light guide plate. The light emitted from the front surface of the light guide plate passes through optical sheets made of a transparent resin and disposed on the front surface of the light guide plate, and radiates the liquid crystal panel from the rear thereof.

The light guide plate is placed in a proper position inside the chassis. A method to properly position the light guide plate inside the chassis includes providing a pair of protrusions that face each other on the bottom plate of the chassis, and having the protrusions engage respective recesses provided at respective ends of the light guide plate, for example. The light guide plate is held in place inside the chassis with the pair of protrusions being at the respective ends thereof.

RELATED ART DOCUMENT

Patent Document

Patent Document 1: Japanese Patent Application Laid-Open Publication No. 2002-116440

Problems to be Solved by the Invention

There are spaces between the pair of protrusions provided on the bottom plate and the recesses of the light guide plate in which the protrusions are fitted. This causes the light guide plate to move inside the chassis, resulting in a problem. If the light guide plate moves from the proper position inside the chassis, variations occur in the space (distance) between the end face of the light guide plate and the light source unit disposed to face the end face, resulting in a problem.

SUMMARY OF THE INVENTION

An object of the present invention is to provide an illumination device and the like in which the light guide plate is prevented from moving from a proper position inside a chassis.

Means for Solving the Problems

An illumination device according to the present invention includes: a housing member that has a bottom plate, side walls that rise from the bottom plate, and a pair of protrusions disposed on inner sides of the side walls, the pair of protrusions protruding from a plate surface of the bottom plate to face each other; a light guide plate that is a plate-shaped member having a pair of first end faces extending in one direction, and a pair of second end faces extending in a direction perpendicular to the first end faces, the light guide plate having, on the respective first end faces, a pair of recesses recessed inwardly from the respective end faces, the light guide plate being disposed inside the side walls such that a rear surface thereof faces the bottom plate and such that the respective protrusions engage the respective recesses; a light source unit having light sources and a light source substrate on which the light sources are mounted, the light source unit being disposed in the housing member such that the light sources face at least one of the second end faces of the light guide plate; and a frame having a frame-shaped covering plate that covers outer edges of a plate surface of the light guide plate, the frame further having pressing parts that extend downward from the covering plate so as to selectively press areas on the plate surface of the light guide plate around the recesses.

In the illumination device, when the areas around the recesses are pressed by the pressing parts, the light guide plate is fixed by being pressed between the pressing parts and the bottom plate. As described above, by applying force to the light guide plate from the respective sides thereof, it is possible to prevent the light guide plate from moving in the horizontal direction along the bottom plate, and therefore, the light guide plate can be held in place securely. Therefore, it is possible to prevent the light guide plate from moving inside the housing member. It is also possible to prevent the gap between the end face of the light guide plate and the light sources (light source unit) from varying. As a result, variations in efficiency of light from the respective light sources entering through the second end face can also be prevented, which makes it possible to prevent uneven brightness. Even when the light guide plate undergoes thermal expansion, it is possible to prevent noise and the like caused by the plate surface of the light guide plate rubbing the pressing parts.

It is preferable that the illumination device further include an optical sheet disposed on a front side of the light guide plate, the optical sheet having notches or holes at side edges for exposing the respective areas around the recesses.

An illumination device according to the present invention includes: a housing member that has a bottom plate, side walls that rise from the bottom plate, and a pair of protrusions disposed on inner sides of the side walls, the pair of protrusions protruding from a plate surface of the bottom plate to face each other, the pair of protrusions respectively having recessed surfaces that face each other; a light guide plate that is a plate-shaped member having a pair of first end faces extending in one direction, and a pair of second end faces extending in a direction perpendicular to the first end faces, the light guide plate having, on the respective first end faces, a pair of projections projecting outwardly from the respective end faces, the light guide plate being disposed inside the side walls such that a rear surface thereof faces the bottom plate and such that the respective projections engage the recessed surfaces of the protrusions; a light source unit having light sources and a light source substrate on which the light sources are mounted, the light source unit being disposed in the housing member such that the light sources face at least one of the second end faces of the light guide plate; and a frame having a frame-shaped covering plate that covers outer edges of a plate surface of the light guide plate, the frame further having pressing parts that extend downward from the covering plate so as to selectively press respective surfaces of the projections.

In the illumination device, when the respective surfaces of the projections are pressed by the pressing parts, the light guide plate is fixed by being pressed between the pressing parts and the bottom plate. As described above, by applying force to the light guide plate from the respective sides thereof, it is possible to prevent the light guide plate from moving in the horizontal direction along the bottom plate, and therefore, the light guide plate can be held in place securely. Therefore, it is possible to prevent the light guide plate from moving inside the housing member. It is also possible to prevent the gap between the second end face of the light guide plate and the light sources (light source unit) from varying. As a result, variations in efficiency of light from the respective light sources entering through the second end face can also be prevented, which makes it possible to prevent uneven brightness. Even when the light guide plate undergoes thermal expansion, it is possible to prevent noise and the like caused by the plate surface of the light guide plate rubbing the pressing parts.

It is preferable that the illumination device include an optical sheet disposed on the front surface of the light guide plate and covering the front surface of the light guide plate such that respective surfaces of the projections are exposed.

In the illumination device, the pressing parts may be configured to be in contact with the plate surface of the light guide plate along a line or at a point.

In the illumination device, the pressing parts may be configured to have a shape that gradually narrows from the covering plate side toward the light guide plate.

In the illumination device, the light guide plate may have a groove or a bank on a portion of the plate surface that is pressed by the pressing part.

In the illumination device, the pressing parts may each have a reflective part at an end thereof.

In the illumination device, a reflectivity of the reflective part may be set higher than a reflectivity of the frame.

In the illumination device, the frame may have outer walls that extend downward from outer edges of the covering plate, the outer walls being fixed to the side walls such that the light guide plate is pressed against the bottom plate by the pressing parts.

In the illumination device, it is preferable that the pressing parts be made of an elastic material.

A display device of the present invention includes a display panel that displays images using light from the aforementioned illumination device.

In the display device, the display panel may be a liquid crystal panel that uses liquid crystal.

A television receiver according to the present invention includes the display device.

Effects of the Invention

According to the present invention, an illumination device and the like in which the light guide plate is prevented from moving from a proper position inside a chassis is provided.

DETAILED DESCRIPTION OF EMBODIMENTS

<Embodiment 1>

Figure 2:
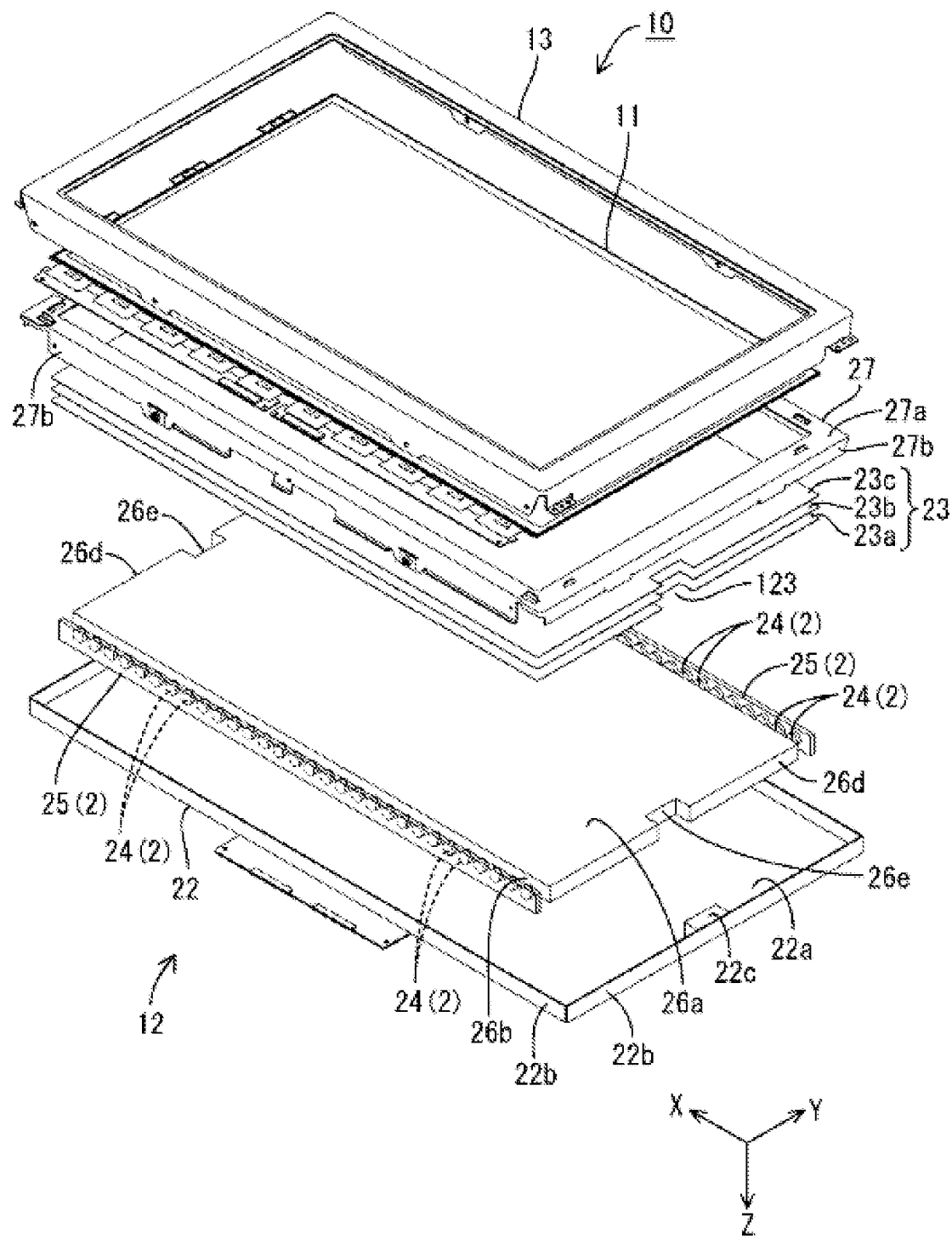
FIG. 2 is an exploded perspective view showing a schematic configuration of a liquid crystal display device.
Figure 3:
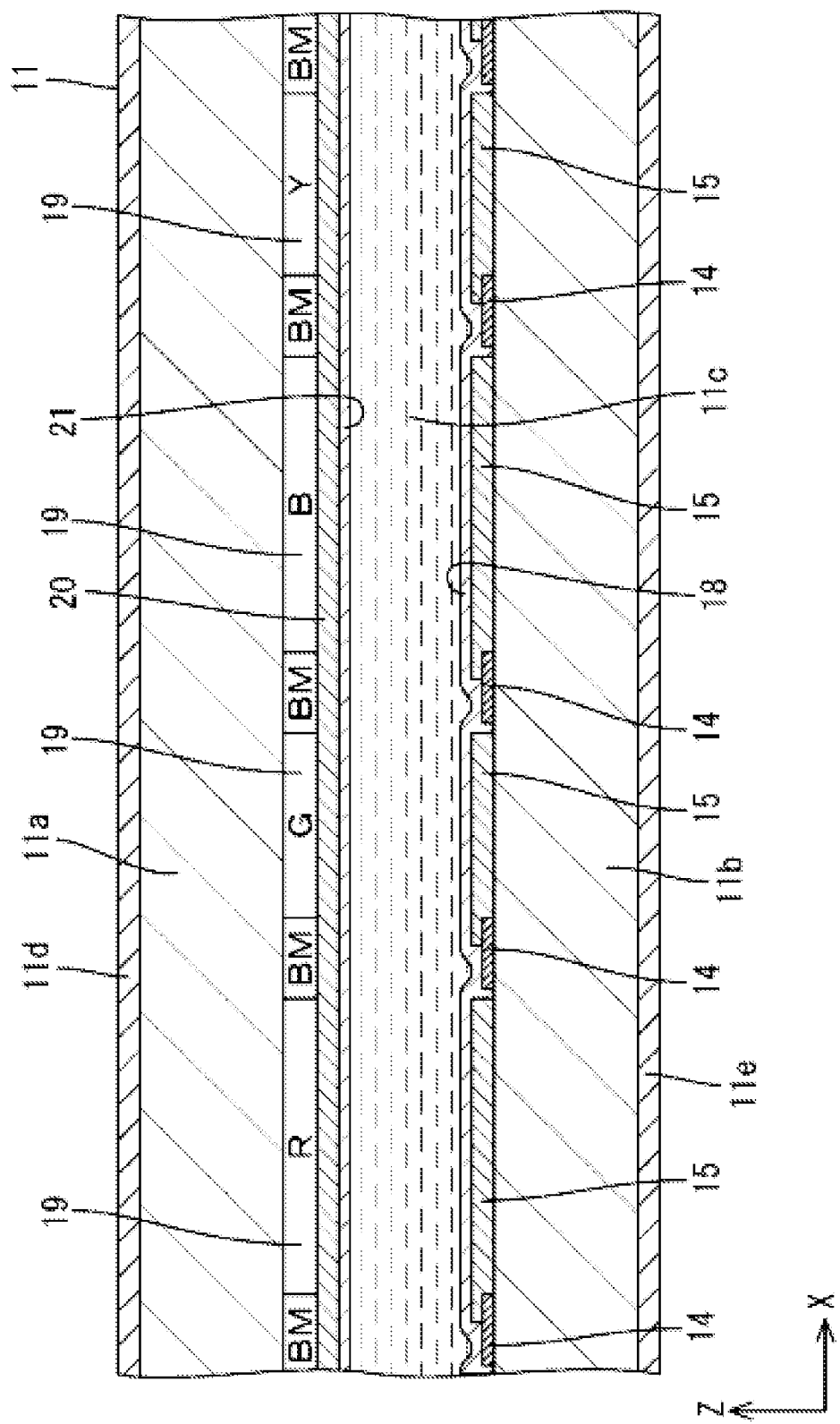
FIG. 3 is a cross-sectional view that shows a cross-sectional configuration of the liquid crystal panel along the long side direction.

Embodiment 1 of the present invention will be explained below with reference to FIGS. 1 to 8. In the present embodiment, a liquid crystal display device 10 will be described as an example. The drawings indicate an X axis, a Y axis, and a Z axis in a portion of the drawings, and each of the axes indicates the same direction for the respective drawings. The top side of FIGS. 2 and 3 is the front side, and the bottom side of FIGS. 2 and 3 is the rear side.

(Television Receiver)

Figure 1:
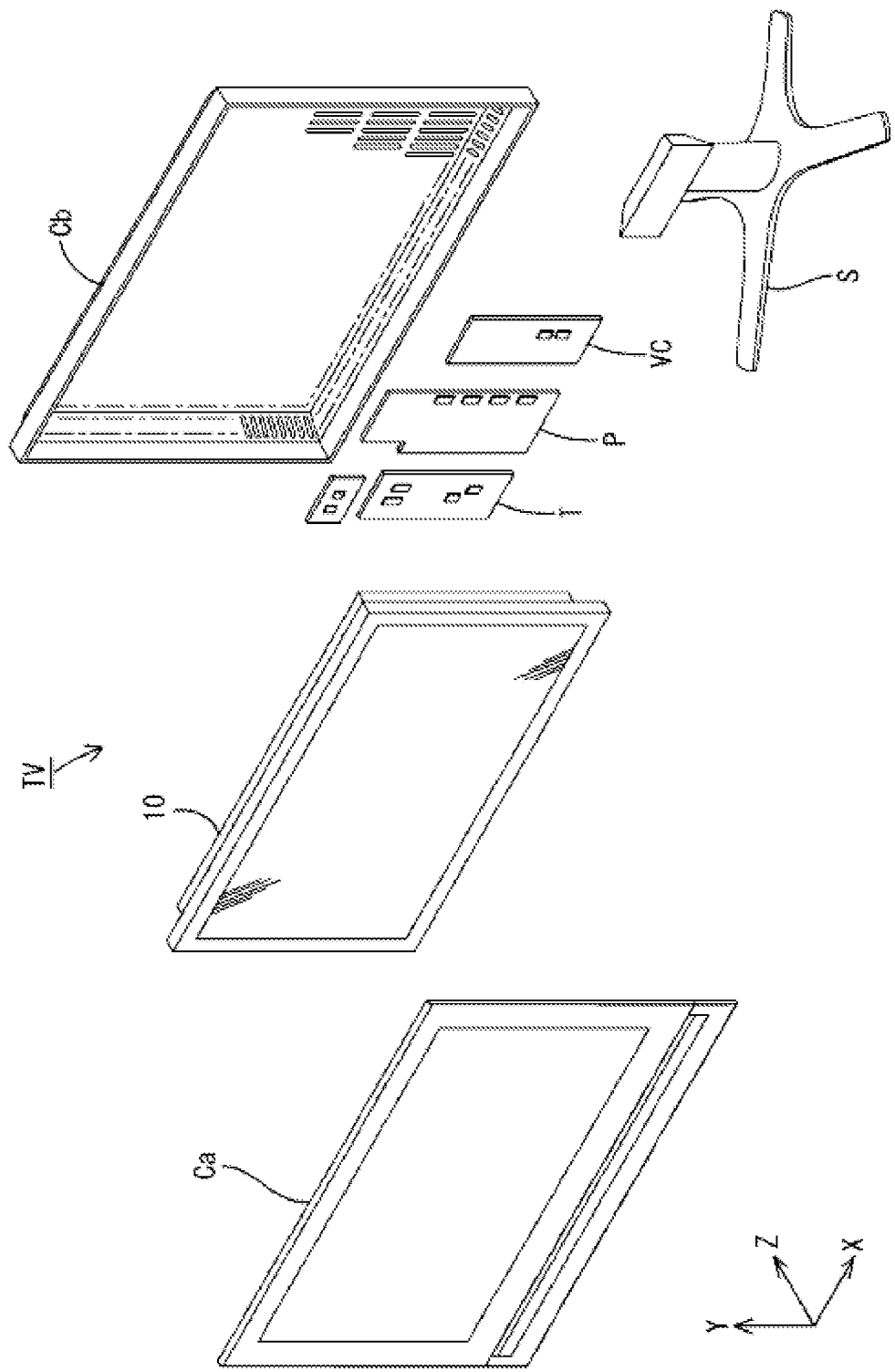
FIG. 1 is an exploded perspective view that shows a schematic configuration of a television receiver according to Embodiment 1 of the present invention.

As shown in FIG. 1, the television receiver TV of the present embodiment includes a liquid crystal display device (an example a display device) 10 that is a display device, front and rear cabinets Ca and Cb that sandwich the liquid crystal display device 10, a power supply circuit substrate P for supplying power, a tuner (reception part) T that can receive television image signals, an image conversion circuit substrate VC that converts the television image signals outputted from the tuner T to image signals for the liquid crystal display device 10, and a stand S.

The liquid crystal display device 10 is formed in a horizontally long quadrangular (rectangular) shape as a whole, and is disposed such that the long side direction thereof matches the horizontal direction (X axis direction) and the short side direction thereof matches the vertical direction (Y direction), respectively. As shown in FIG. 2, the liquid crystal display device 10 includes a liquid crystal panel 11 that is a display panel, and a backlight device (an example of an illumination device) 12 that is an external light source, and these are held together as one component by a frame-shaped bezel 13 and the like.

(Liquid Crystal Panel)

A configuration of the liquid crystal panel 11 in the liquid crystal display device 10 will be explained. The liquid crystal panel 11 is formed in a horizontally long quadrangular (rectangular) shape as a whole, and, as shown in FIG. 3, includes a pair of transparent (having light transmittance) glass substrates 11a and 11b, and a liquid crystal layer 11c disposed between the two substrates 11a and 11b and including liquid crystal that is a substance that changes optical characteristics thereof as a result of being applied with an electric field. The two substrates 11a and 11b are bonded to each other by a not-shown sealing agent while maintaining a gap that corresponds to the thickness of the liquid crystal layer. On the respective outer surfaces of the two substrates 11a and 11b, polarizing plates 11d and 11e are bonded. The long side direction of the liquid crystal panel 11 matches the X axis direction, and the short side direction thereof matches the Y axis direction.

Figure 4:
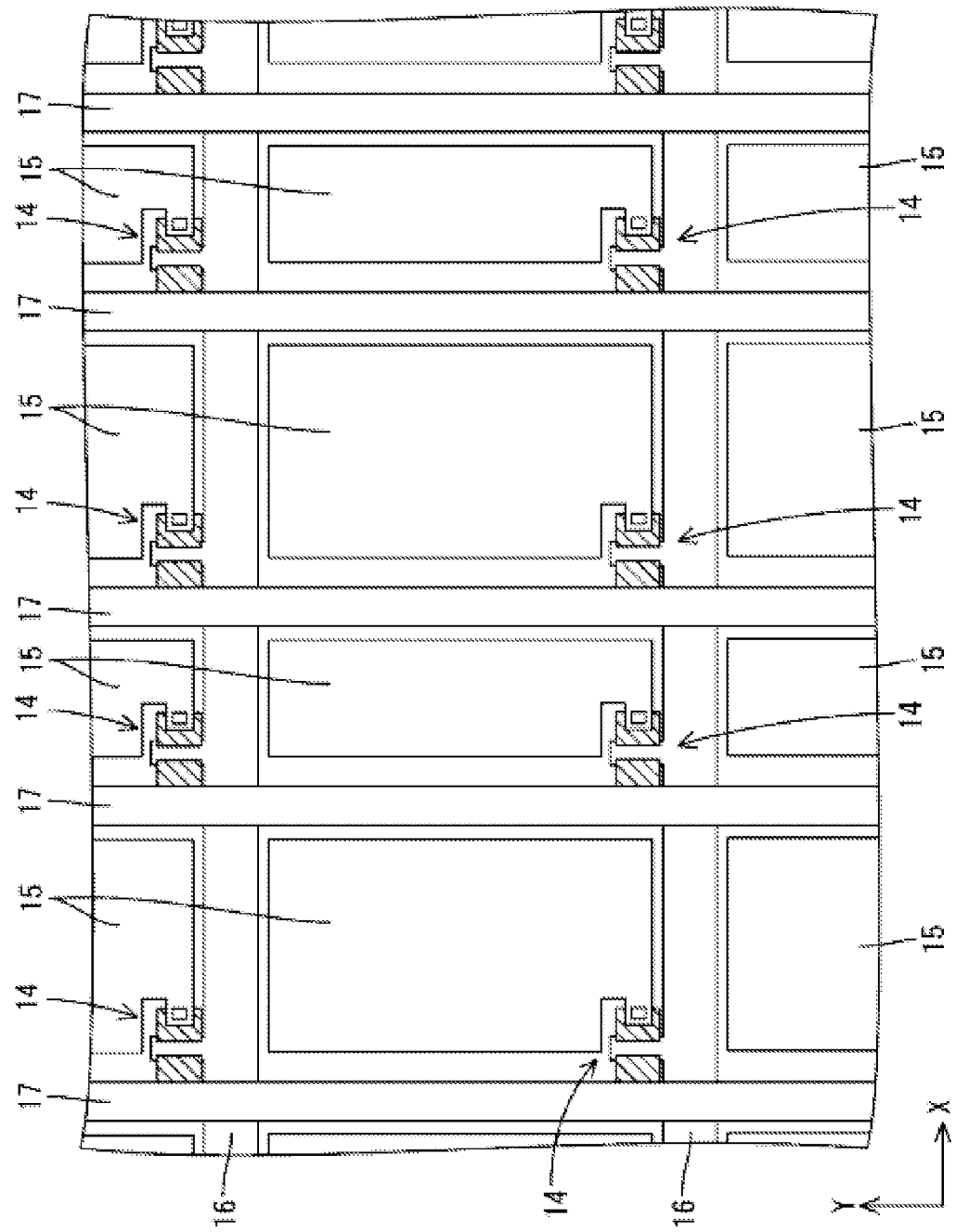
FIG. 4 is a magnified plan view that shows a plan view configuration of an array substrate.

Of the two substrates 11a and 11b, one on the front side (front surface side) is a CF substrate 11a, and the other on the rear side (rear surface side) is an array substrate 11b. As shown in FIG. 4, on the inner surface of the array substrate 11b, or in other words, on a surface thereof on the side of the liquid crystal layer 11c (side facing the CF substrate 11a), a plurality of TFTs (thin film transistors) 14 that are switching elements and a plurality of pixel electrodes 15 are arranged in a matrix (in rows and columns), and gate wiring lines 16 and source wiring lines 17 are disposed in a grid pattern so as to surround the respective TFTs 14 and pixel electrodes 15. The pixel electrodes 15 have a vertically long quadrangular (rectangular) shape in which the long side direction thereof matches the Y axis direction and the short side direction thereof matches the X axis direction, and the pixel electrodes 15 are made of a transparent electrode such as ITO (indium tin oxide) or ZnO (zinc oxide). The gate wiring lines 16 and the source wiring lines 17 are respectively connected to the gate electrodes and the source electrodes of the TFTs 14, and the pixel electrodes 15 are connected to the drain electrodes of the TFTs 14, respectively. As shown in FIG. 3, an alignment film 18 for defining the orientation of liquid crystal molecules is disposed on the TFTs 14 and the pixel electrodes 15 on the side facing the liquid crystal layer 11c. In an end portion of the array substrate 11b, terminals that are led out from the gate wiring lines 16 and the source wiring lines 17 are formed, and a not-shown driver part for driving liquid crystal is crimp-connected to these terminals through an anisotropic conductive film (ACF). The driver part for driving liquid crystal is electrically connected to a not-shown display control circuit substrate through various wiring substrates and the like. The display control circuit substrate is connected to the image conversion circuit substrate VC in the television receiver TV (see FIG. 1), and supplies driving signals to the respective wiring lines 16 and 17 through the driver part in accordance with output signals from the image conversion circuit substrate VC.

Figure 5:
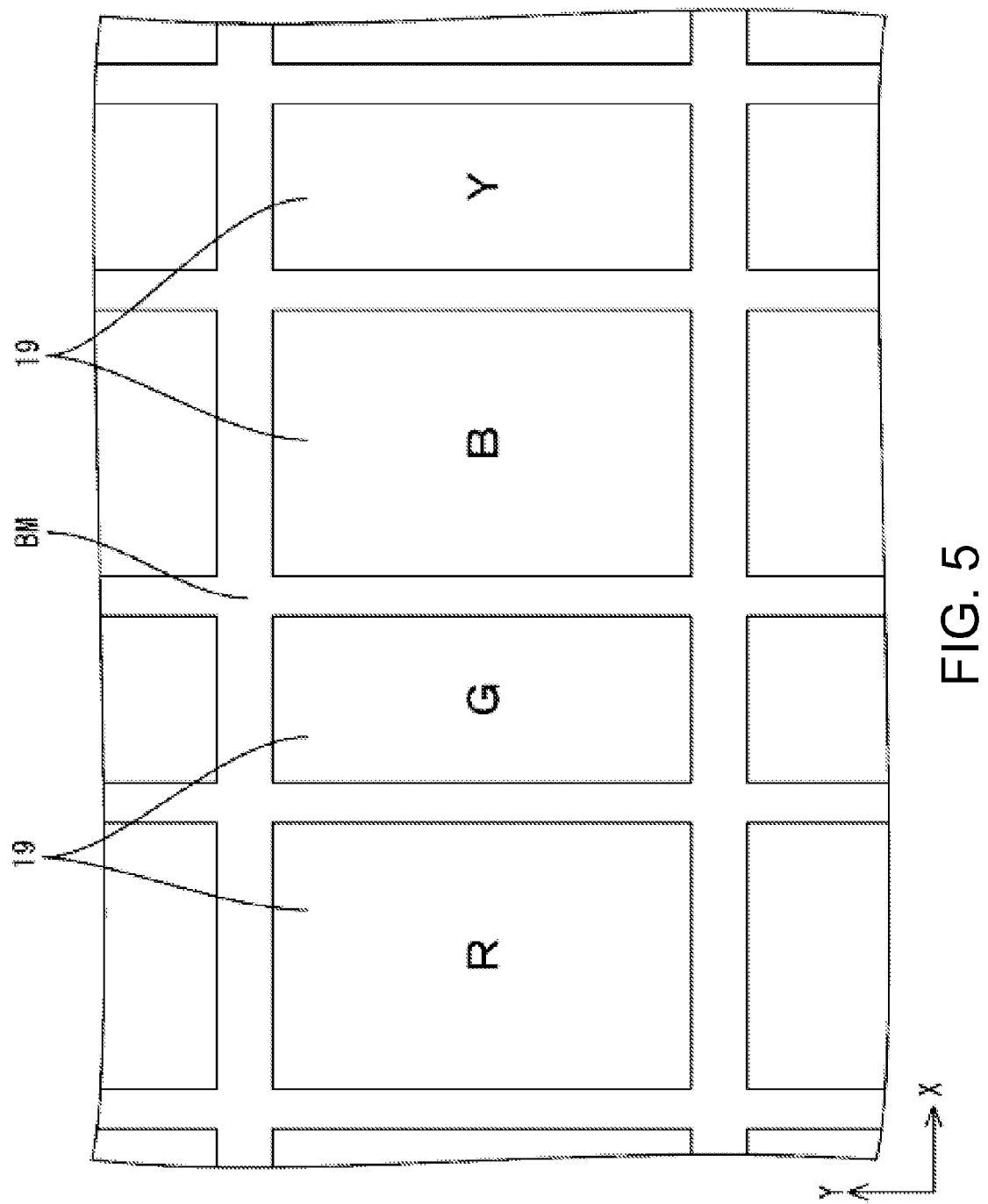
FIG. 5 is a magnified plan view that shows a plan view configuration of a CF substrate.

On the other hand, as shown in FIG. 5, on an inner surface of the CF substrate 11a, or in other words, on a surface thereof on the side of the liquid crystal layer 11c (side facing the array substrate 11b), color filters 19 made of a plurality of colored portions R, G, B, and Y arranged in a matrix (rows and columns) S0 as to face the respective pixels on the array substrate 11b are formed. The color filters 19 of the present embodiment include yellow colored portions Y in addition to red colored portions R, green colored portions G, and blue colored portions B, which are the three primary colors of light, and the respective colored portions R, G, B, and Y selectively transmit light of the corresponding colors (corresponding wavelengths). Each of the colored portions R, G, B, and Y is formed in a vertically long quadrangular (rectangular) shape with the long side direction matching the Y axis direction and the short side direction matching the X axis direction, respectively, in a manner similar to the pixel electrodes 15. A grid-shaped light-shielding layer (black matrix) BM is disposed between the respective colored portions R, G, B, and Y to prevent the colors from mixing. As shown in FIG. 3, in the CF substrate 11a, an opposite electrode 20 and an alignment film 21 are formed in this order on the surface of the color filters 19 facing the liquid crystal layer 11c.

The arrangement and size of the respective colored portions R, G, B, and Y constituting the color filters 19 will be explained in detail. As shown in FIG. 5, the respective colored portions R, G, B, and Y are arranged in a matrix with the X axis direction being the row direction and the Y axis direction being the column direction. The dimension of the respective colored portions R, G, B, and Y in the column direction (Y axis direction) is identical to each other, but the dimension thereof in the row direction (X axis direction) differs from each other among the respective colored portions R, G, B, and Y. Specifically, the respective colored portions R, G, B, and Y are arranged such that a red colored portion R, a green colored portion G, a blue colored portion B, and a yellow colored portion Y are aligned along the row direction in this order from the left side of FIG. 5, and the dimension of the red colored portion R and the blue colored portion B in the row direction is relatively large compared to the dimension of the yellow colored portion Y and the green colored portion G in the row direction. In other words, the colored portions R and B that have a relatively large dimension in the row direction, and the colored portions G and Y that have a relatively small dimension in the row direction are arranged alternately and repeatedly in the row direction. Accordingly, the area of the red colored portion R and the blue colored portion B is larger than the area of the green colored portion G and the yellow colored portion Y. The area of the blue colored portion B and the area of the red colored portion R are equal to each other. Similarly, the area of the green colored portion G and the area of the yellow colored portion Y are equal to each other. FIGS. 3 and 5 show a case in which the area of the red colored portion R and the blue colored portion B is approximately 1.6 times larger than the area of the yellow colored portion Y and the green colored portion G.

As a result of the color filters 19 having the above-mentioned configuration, in the array substrate 11b, as shown in FIG. 4, the dimension of the pixel electrodes 15 in the row direction (X axis direction) differs from each other among respective columns. In other words, the row direction dimension and area of pixel electrodes 15 that face the red colored portion R and the blue colored portion B become larger than the row direction dimension and area of pixel electrodes 15 that face the yellow colored portion Y and the green colored portion G. The gate wiring lines 16 are all arranged at an equal pitch, while the source wiring lines 17 are arranged at two different pitches corresponding to the dimensions of the pixel electrodes 15 in the row direction.

As described above, because the liquid crystal display device 10 according to the present embodiment uses the liquid crystal panel 11 that has the color filters 19 made of colored portions R, G, B, and Y of the four colors, the television receiver TV is provided with a specialized image conversion circuit substrate VC as shown in FIG. 1. In other words, this image conversion circuit substrate VC can convert the television image signals outputted from the tuner T into image signals of respective colors of blue, green, red, and yellow, and can output the generated image signals of the respective colors to the display control circuit substrate. The display control circuit substrate drives TFTs 14 provided for pixels of respective colors in the liquid crystal panel 11 through the respective wiring lines 16 and 17, based on these image signals, thereby appropriately controlling the transmission of light that passes through the colored portions R, G, B, and Y of the respective colors.

(Backlight Device)

Next, a configuration of the backlight device 12 of the liquid crystal display device 10 will be explained. As shown in FIG. 2, the backlight device 12 includes a chassis (housing member) 22 formed in a substantially box shape that has an open portion that is open toward the light emitting side (toward the liquid crystal panel 11), and optical sheets 23 disposed to cover the open portion of the chassis 22. The chassis 22 includes therein LEDs 24 that are light sources, LED substrates (light source substrates) 25 on which the LEDs 24 are mounted, a light guide plate 26 that guides light from the LEDs 24 toward the optical sheets 23 (liquid crystal panel 11), and a frame 27 that presses a prescribed position of the light guide plate 26 from the front side. A light source unit 2 includes the LEDs 24 and the LED substrate 25. The backlight device 12 is of a so-called edge light type (side light type) in which the LEDs 24 mounted on the LED substrates 25 are disposed on respective two edges of the light guide plate 26. The edge light type backlight device 12 is attached integrally to the liquid crystal panel 11 by the frame-shaped bezel 13, thus forming the liquid crystal display device 10.

(Chassis)

Figure 6:
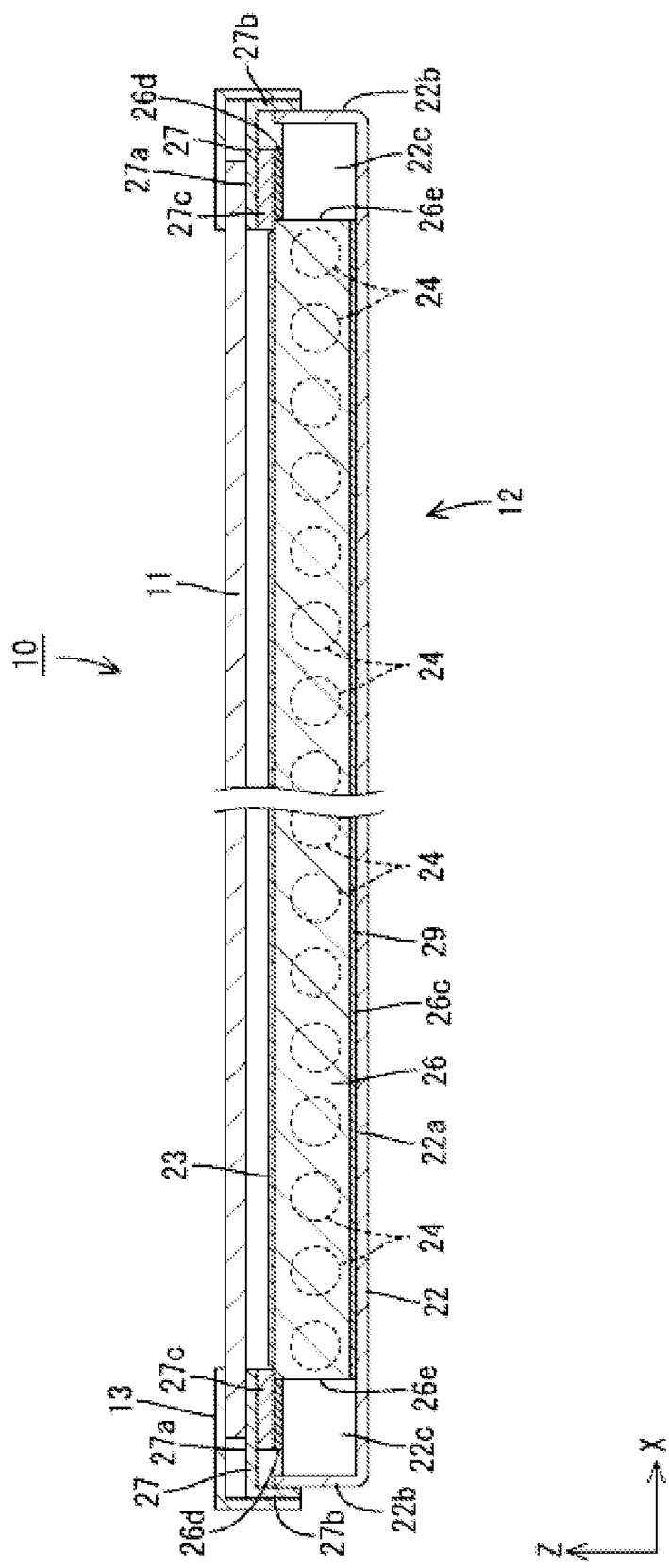
FIG. 6 is a cross-sectional view that shows a cross-sectional configuration of the liquid crystal display device along the long side direction.
Figure 7:
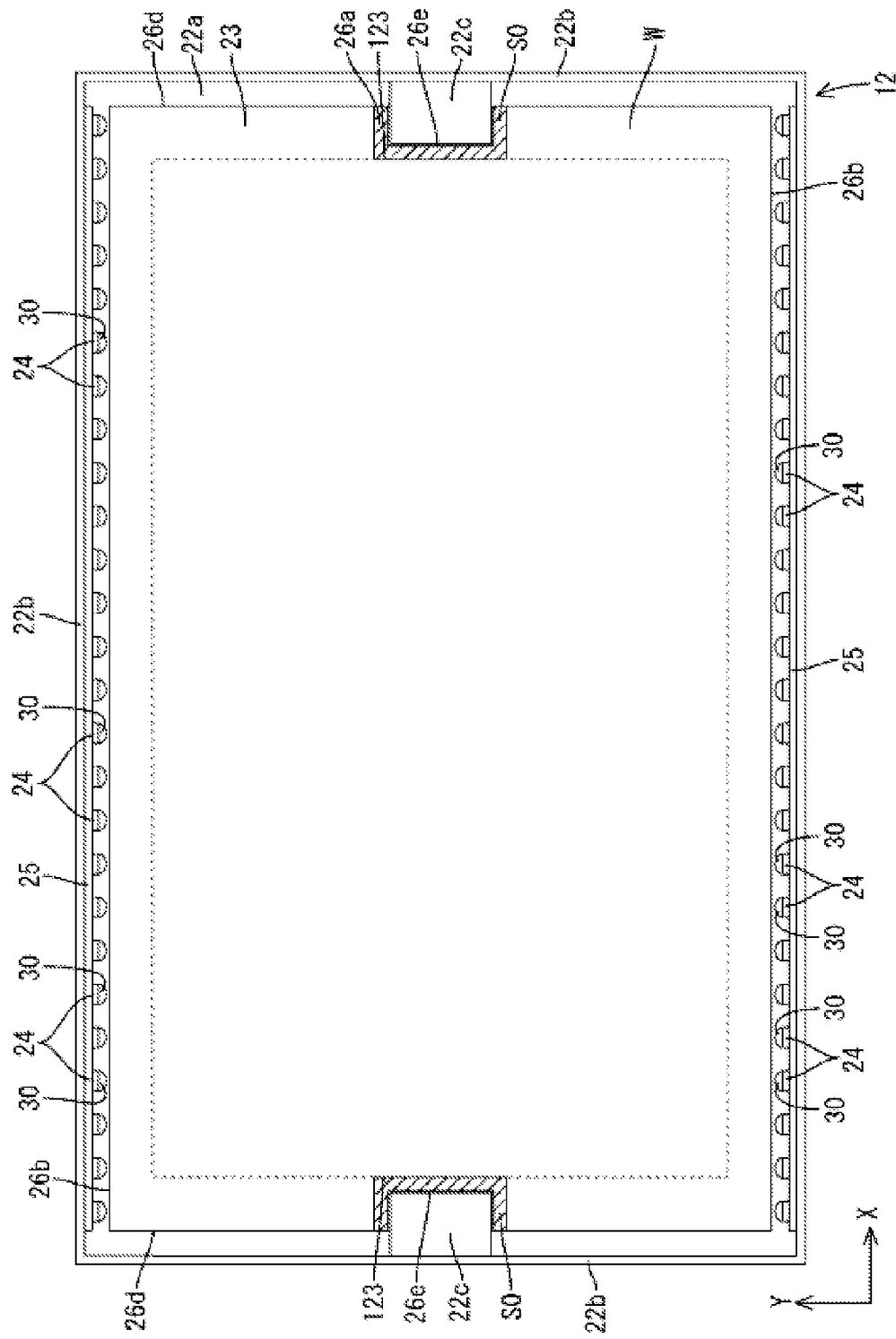
FIG. 7 is a plan view showing a plan view configuration of a backlight device from which a frame has been removed.

The chassis (housing member) 22 is made of a metal, and as shown in FIGS. 2 and 6, has a substantially shallow box shape as a whole with the front side thereof open, the chassis 22 being constituted of a bottom plate 22a having a horizontally long quadrangular shape similar to that of the liquid crystal panel 11, and side walls 22b that rise up from the respective outer edge sides of the bottom plate 22a. In the chassis 22 (bottom plate 22a), the long side direction thereof matches the X axis direction (horizontal direction), and the short side direction thereof matches the Y axis direction (vertical direction). The frame 27 and the bezel 13 can be fixed onto the side walls 22b with screws. As shown in FIGS. 2, 6, and 7, on the bottom plate 22a, a pair of protrusions 22c that face each other on the bottom plate 22a is provided. These protrusions 22c are formed to protrude from the front surface (plate surface) of the bottom plate 22a. The protrusions 22c are made of a resin molded parts, for example, and are attached to the bottom plate 22a of the chassis 22 in prescribed positions as separate parts. The protrusions 22c are fixed to the bottom plate 22a with not-shown screws. In other embodiments, the protrusions 22c may be fixed to the bottom plate 22a with an adhesive agent and the like, or may be integrally formed with the chassis 22 using the same material. The exterior shape of the protrusions 22c of the present embodiment is a cuboid, and the protrusions 22c are provided inside of the side walls 22b on the short sides of the chassis 22. The respective protrusions 22c are disposed near the centers of the respective side walls 22b.

(Optical Sheets)

As shown in FIG. 2, the optical sheets 23 are horizontally long quadrangular shape as a whole in a plan view, similar to the liquid crystal panel 11 and the chassis 22, and are each formed as a thin sheet. The optical sheets 23 are placed on the front side (light-emitting side) of the light guide plate 26, thereby being disposed between the light guide plate 26 and the liquid crystal panel 11. The optical sheets 23 include a diffusion sheet 23a, a lens sheet 23b, and a reflective polarizing plate 23c layered in this order from the light guide plate 26. The optical sheets 23 of the present embodiment have notches 123, 123 on respective ends on the short sides thereof. The notches 123, 123 are respectively disposed near the centers of the respective short sides.

(Frame)

As shown in FIG. 2 and the like, the frame 27 has a frame-shaped covering plate 27a that covers outer edges W (see FIG. 7) on the front side plate surface (front surface) 26a of the light guide plate 26, and outer walls 27b that extend downward from the outer edges of the covering plate 27a. The frame 27 is made of a synthetic resin, and by having the surface thereof colored black, for example, the frame 27 has light-shielding properties. The frame 27 can receive the outer edges of the liquid crystal panel 11 on the front side of the covering plate 27a. The frame 27 of the present embodiment has, as described later, pressing parts 27c on the rear side of the covering plate 27a (see FIG. 6).

(LEDs)

As shown in FIG. 6, the LEDs 24 are mounted on the LED substrate 25, and are of a so-called top type LEDs in which light-emitting surfaces are on the side opposite to the mounting surface that is mounted on the LED substrate 25. On the light-emitting surface of each LED 24, a lens member 30 for emitting light while diffusing the light in a wide angle is provided. The lens member 30 is interposed between the LED 24 and the light-receiving surface 26b of the light guide plate 26, and the light-emitting surface thereof has a spherical shape so as to have a convexity toward the light guide plate 26. The light-emitting surface of the lens member 30 is curved along the lengthwise direction of the light-receiving surface 26b of the light guide plate 26 such that the cross-sectional shape thereof is substantially an arc.

Each LED 24 includes an LED chip (not shown) that is a light-emitting source that emits blue light, and a green phosphor and a red phosphor as phosphors that emit light by being excited by the blue light. Specifically, each LED 24 has a configuration in which an LED chip made of an InGaN type material, for example, is sealed by a resin material onto a base plate that is attached to the LED substrate 25. The LED chip mounted on the base plate has a primary luminescence wavelength in a range of 420 nm to 500 nm, i.e., the blue wavelength region, and can emit highly pure blue light (blue single color light). The specific primary luminescence wavelength of the LED chip is preferably 451 nm, for example. On the other hand, the resin material that seals the LED chip has the green phosphor that emits green light by being excited by blue light emitted from the LED chip, and the red phosphor that emits red light by being excited by the blue light emitted from the LED chip, the green phosphor and the red phosphor being dispersed in the resin material at a prescribed ratio. By the blue light (blue component light) emitted from the LED chip, the green light (green component light) emitted from the green phosphor, and the red light (red component light) emitted from the red phosphor, the LED 24 can emit light of a prescribed color as a whole such as white light or white light with a bluish tone, for example. Because yellow light can be obtained by mixing the green component light from the green phosphor and the red component light from the red phosphor, it can also be said that this LED 24 has both the blue component light from the LED chip and the yellow component light. The chromaticity of the LED 24 changes in accordance with the absolute values or the relative values of the amounts of the green phosphor and the red phosphor included, for example, and therefore, the chromaticity of the LED 24 can be adjusted by appropriately adjusting the amounts of these green phosphor and red phosphor. In the present embodiment, the green phosphor has a primary luminescence peak in the green wavelength region from 500 nm to 570 nm inclusive, and the red phosphor has a primary luminescence peak in the red wavelength region from 600 nm to 780 nm inclusive.

Next, the green phosphor and the red phosphor included in the LED 24 will be explained in detail. It is preferable to use β-SiAlON that is a type of a SiAlON type phosphor as the green phosphor. The SiAlON type phosphor is a substance obtained by replacing some of silicon atoms of silicon nitride with aluminum atoms, and by replacing some of nitrogen atoms thereof with oxygen atoms, or in other words, the SiAlON is nitride. The SiAlON phosphor that is nitride has superior light-emitting efficiency and durability to those of other phosphors made of sulfide or oxide, for example. Here, "having superior durability" specifically means that the brightness is less likely to deteriorate over time even after being exposed to high-energy exciting light from the LED chip. In the SiAlON phosphor, a rare earth element (such as Tb, Yg, or Ag) is used as an activator. β-SiAlON, which is a type of the SiAlON type phosphor, is a substance represented by a general formula $Si_{6-z}Al_zO_zN$:Eu (z represents the solid solubility) or $(Si,Al)_6(O, N)_6$:Eu in which aluminum and oxygen are dissolved in β-type silicon nitride crystal. In the β-SiAlON of the present embodiment, Eu (europium) is used as the activator, for example, and because the use of Eu contributes to high purity in the color green, which is fluorescent light, it is very useful for adjusting the chromaticity of the LED 24. On the other hand, it is preferable to use CASN, which is a type of CASN type phosphor, as the red phosphor. The CASN type phosphor is nitride that includes calcium atoms (Ca), aluminum atoms (Al), silicon atoms (Si), and nitrogen atoms (N), and has superior light-emitting efficiency and durability as compared with other phosphors made of fluoride or oxide, for example. In the CASN type phosphor, a rare earth element (such as Tb, Yg, or Ag) is used as an activator. CASN, which is a type of the CASN type phosphor, includes Eu (europium) as an activator, and is represented by a compositional formula $CaAlSiN_3$:Eu.

(LED Substrate)

As shown in FIG. 2, the LED substrate 25 is formed in a narrow plate shape that extends along the long side direction of the chassis 22 (X axis direction, lengthwise direction of the light-receiving surface 26b of the light guide plate 26), and is disposed in the chassis 22 such that the main plate surface is parallel to the X axis direction and the Z axis direction, or in other words, such that the main plate surface is perpendicular to the plate surfaces of the liquid crystal panel 11 and the light guide plate 26 (optical sheets 23). The LED substrates 25 are in a pair disposed on both long side edges in the chassis 22. On the main plate surface of the LED substrate 25, that is, on the inner side thereof, which is a light source surface (surface facing the light guide plate 26, substrate surface) 25a that faces the light guide plate 26, the LEDs 24 having the above-mentioned configuration are mounted. On the light source surface 25a of the LED substrate 25, a plurality of LEDs 24 are arranged in a row (in a straight line) along the lengthwise direction (X axis direction). Therefore, a plurality of LEDs 24 are provided along the long side direction on the respective longer edges of the backlight device 12. Because the pair of the LED substrates 25 is disposed inside the chassis 22 such that the respective light source surfaces (mounting surfaces of the LEDs 24) face each other, the light-emitting surfaces of the LEDs 24 mounted on the respective LED substrates 25 face each other, and the optical axes of the respective LEDs 24 substantially match the Y axis direction.

The base member of the LED substrate 25 is made of the same metal material as the chassis 22 such as an aluminum material, and on the surface thereof, a not-shown wiring pattern is formed by using a metal film such as copper foil through an insulating layer. On the outermost surface of the LED substrate 25, a reflective layer (not shown) of a highly reflective white is formed. With this wiring pattern, the respective LEDs 24 arranged in a row on each LED substrate 25 are connected to each other in series. The base member of the LED substrate 25 may alternatively be formed of an insulating material such as ceramics.

(Light Guide Plate)

The light guide plate 26 is a plate-shaped member made of a synthetic resin material (an acrylic resin such as PMMA or a polycarbonate, for example) that has a higher refractive index than air and that is almost completely transparent (having excellent light transmission). As shown in FIGS. 2 and 7, the light guide plate 26 is a horizontally long quadrangle in a plan view, as in the liquid crystal panel 11 and the chassis 22, and the long side direction thereof matches the X axis direction and the short side direction matches the Y axis direction. As shown in FIG. 6, the light guide plate 26 is disposed in the chassis 22 directly below the liquid crystal panel 11 and the optical sheets 23, and is placed between the pair of LED substrates 25 disposed on both long sides of the chassis 22, thereby having the LED substrates 25 on both sides thereof in the Y axis direction. Thus, the LEDs 24 (LED substrates 25) and the light guide plate 26 are aligned in the Y axis direction, whereas the optical sheets 23 (liquid crystal panel 11) and the light guide plate 26 are aligned in the Z axis direction, and the two directions are perpendicular to each other. The light guide plate 26 has the function of receiving light emitted from the LEDs 24 in the Y axis direction, and causing the light to be propagated therein and to be outputted towards the optical sheets 23 (Z axis direction).

The light guide plate 26 has a pair of end faces (first end faces) 26b, 26b in the long side direction, and a pair of end faces (second end faces) 26d, 26d in the short side direction. The end faces 26b and the end faces 26d are formed on the light guide plate 26 S0 as to be perpendicular to each other. As described below, on the end faces 26d, 26d of the light guide plate 26, recesses 26e, 26e recessed inwardly are formed, respectively. As described below, the light guide plate 26 is pressed by the pressing parts 27c of the frame 27 selectively around the recesses 26e, 26e on the front surface thereof.

As shown in FIGS. 2 and 6, the light guide plate 26 has a substantially flat plate shape that extends along the respective plate surfaces of the bottom plate 22a of the chassis 22 and the optical sheets 23, and the main plate surfaces of the light guide plate 26 are parallel to the X axis direction and the Y axis direction. Of the main plate surfaces of the light guide plate 26, the surface on the front is a light output surface (light-emitting surface, front surface) 26a that outputs light therein toward the optical sheets 23 and the liquid crystal panel 11. Of the outer end faces continued from the main plate surfaces of the light guide plate 26, the two end faces (first end faces) 26b, 26b on the long sides that extend along the X axis direction face the LEDs 24 (LED substrates 25), respectively, with a prescribed gap therebetween, and these end faces are light-receiving surfaces 26b through which light emitted from the LEDs 24 enters. The light-receiving surfaces 26b are on a plane parallel to that defined by the X axis and the Z axis, and are substantially perpendicular to the light output surface 26a. The direction at which the LEDs 24 and the light-receiving surfaces 26b are aligned with respect to each other is the same as the Y axis direction, and is parallel to the light output surface 26a. On an opposite surface (rear surface) 26c of the light guide plate 26 opposite to the light output surface 26a, a reflective sheet 29 that can reflect light in the light guide plate 26 toward the front is provided S0 as to cover the entire opposite surface 26c. On at least one of the light output surface 26a and the opposite surface 26c opposite thereto in the light guide plate 26, a reflective part (not shown) that reflects internal light or a diffusion part (not shown) that diffuses internal light is patterned S0 as to have a prescribed distribution in the horizontal direction, thereby controlling the light emitted from the light output surface 26a to have an even distribution in the horizontal direction.

(Reflective Sheet)

The reflective sheet 29 is made of a white foam plastic sheet (foam polyethylene terephthalate sheet, for example). The reflective sheet 29 has a horizontally long quadrangular shape in a plan view, and the long side direction thereof matches the X axis direction and the short side direction thereof matches the Y axis direction. The reflective sheet 29 is housed in the chassis 22 so as to cover the bottom plate 22a.

(Purposes of Having Four Primary Colors in Liquid Crystal Panel and Differentiating Areas of Respective Colored Portions of Color Filters)

As discussed above, the color filters 19 of the liquid crystal panel 11 of the present embodiment have the yellow colored portions Y, in addition to the respective colored portions R, G, and B, which are the three primary colors of light, as shown in FIGS. 3 and 5. Therefore, the color gamut of the display image displayed by the transmitted light is expanded, thereby making it possible to realize the display with excellent color reproducibility. In addition, because the light that has transmitted through the yellow colored portions Y has a wavelength that is close to the luminosity peak, it tends to be perceived by human eyes as bright light even with a small amount of energy. As a result, even if the power output of the LEDs 24 in the backlight device 12 is reduced, the sufficient brightness can be obtained, thereby achieving the effects such as a reduction in power consumption of the LEDs 24 and thus excellent environmental performance.

On the other hand, when using the liquid crystal panel 11 having four primary colors as described above, the display image on the liquid crystal panel 11 tends to have a yellowish tone as a whole. In order to avoid this, in the backlight device 12 of the present embodiment, the chromaticity of the LEDs 24 is adjusted to have a bluish tone, which is a complementary color of yellow, such that the chromaticity of the display image is corrected. For this reason, the LEDs 24 provided in the backlight device 12 have the primary luminescence wavelength in the blue wavelength region as mentioned above, and emit light in the blue wavelength region at the highest intensity.

The research conducted by the inventor of the present invention shows that, when adjusting the chromaticity of the LEDs 24 as described above, as the chromaticity is made closer from white to blue, the brightness of the emitted light tends to become lower. Thus, in the present embodiment, the area of the blue colored portions B in the color filters 19 is made larger than the area of the green colored portions G and the yellow colored portions Y, which makes it possible to include more blue light, which is the complementary color of yellow, in the transmitted light of the color filters 19. This way, when adjusting the chromaticity of the LEDs 24 to correct the chromaticity of the display image, it is not necessary to adjust the chromaticity of the LEDs 24 toward the blue color as much as before, and as a result, it is possible to prevent the brightness of the LEDs 24 from being reduced due to the chromaticity adjustment.

Furthermore, according to the research conducted by the inventor of the present invention, when using the liquid crystal panel 11 having four primary colors, the brightness of the red color is lowered in particular among the light emitted from the liquid crystal panel 11. The possible cause thereof is that, in the liquid crystal panel 11 having four primary colors, the number of subpixels constituting one pixel increases from three to four, thus reducing the area of each subpixel compared to a liquid crystal panel having three primary colors, and as a result, the brightness of the red color in particular is lowered. To avoid this situation, in the present embodiment, the area of the red colored portions R in the color filters 19 is made larger than the area of the green colored portions G and the yellow colored portions Y, which makes it possible to include more red color in the transmitted light of the color filters 19. As a result, it is possible to prevent the brightness of the red light from being reduced due to increasing the colors in the color filters 19 to four.

(Description of Configuration of Main Part of the Present Embodiment)

Figure 8:
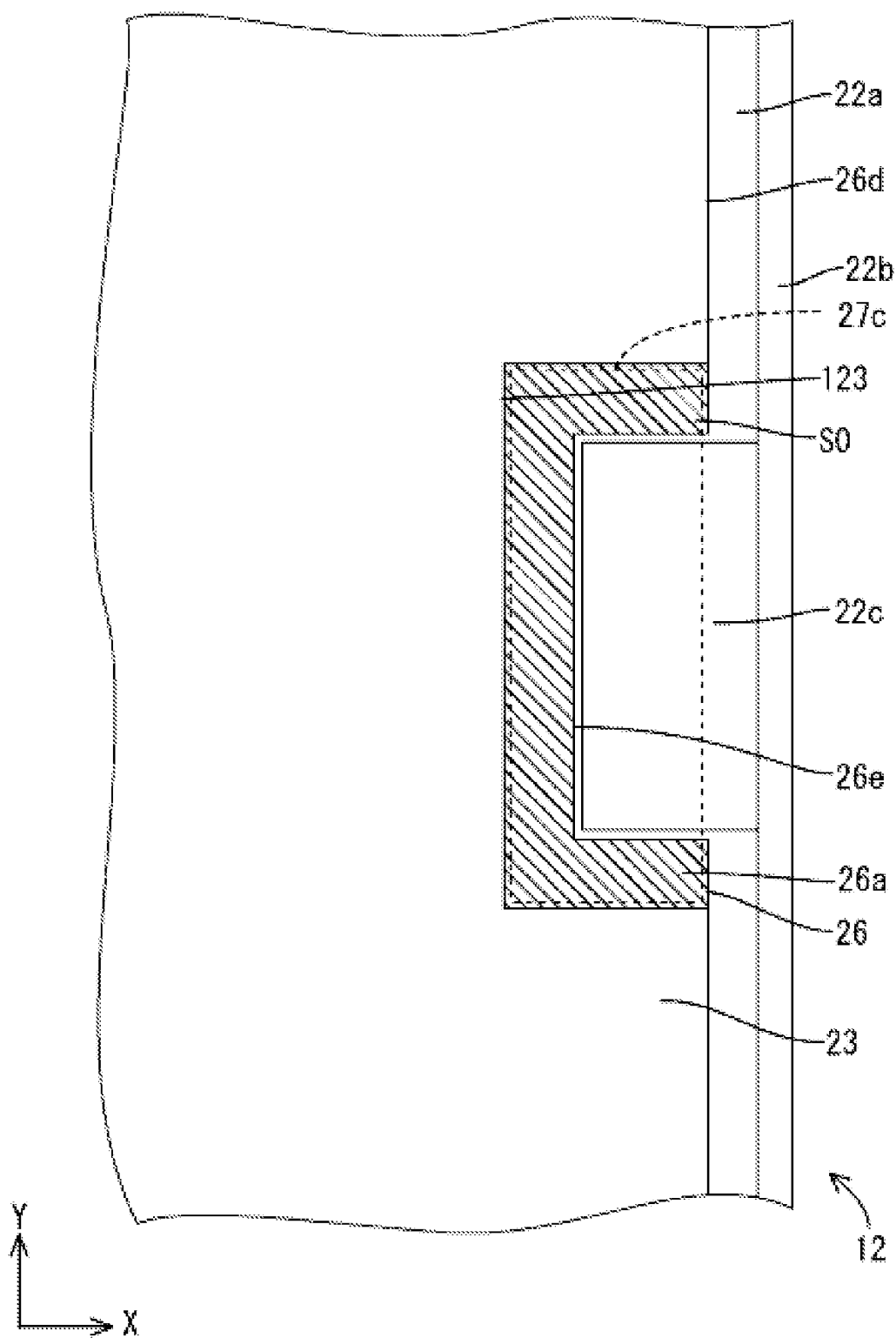
FIG. 8 is a magnified plan view showing a part of a plan view configuration of the backlight device shown in FIG. 7.

The main part of the liquid crystal display device 10 of the present embodiment will be described in detail with reference to figures. FIG. 6 is a cross-sectional view showing a cross-sectional configuration along the long side of the liquid crystal display device; FIG. 7 is a plan view showing a plan view configuration of the backlight device from which the frame has been removed; and FIG. 8 is a magnified plan view showing a part of a plan view configuration of the backlight device shown in FIG. 7. The liquid crystal display device 10 includes the backlight device 12 as described above, and as shown in the figures such as FIG. 6, the light guide plate 26 is housed in the chassis 22. As described above, in the light guide plate 26, the recesses 26e, 26e, which are recessed inwardly, are formed respectively at the two end faces (first end faces) 26d, 26d. The inside of each recess 26e is surrounded by three faces, and one of the three faces is positioned furthest from the end face 26d, and is placed in parallel with the end face 26d. The other two faces are disposed so as to be parallel to each other with the one face therebetween.

The two recesses 26e, 26e are formed in the respective center portions of the end faces 26d, 26d on the short sides. These recesses 26e, 26e are aligned along the long side direction of the light guide plate 26, and face each other. As shown in FIGS. 6 and 7, the light guide plate 26 is housed in the chassis 22 such that the protrusions 22c, 22c provided on the bottom plate 22a of the chassis 22 respectively engage the recesses 26e, 26e. The size of the recesses 26e is appropriately set so as to able to have the protrusions 22c placed inside. The height of the protrusions 22c from the bottom plate 22a is set to be lower than the position of the front surface 26a of the light guide plate 26 that is placed on the bottom plate 22a. As shown in the figures such as FIG. 6, the reflective sheet 29 is laid under (on the rear surface side of) the light guide plate 26.

As shown in FIGS. 6 and 7, the two protrusions 22c, 22c are disposed on the bottom plate 22a of the chassis 22 so as to face each other. When the protrusions 22c, 22c engage the recesses 26e, 26e of the light guide plate 26, the light guide plate 26 has the protrusions 22c, 22c on the respective short sides thereof. Although very small, a space is present between the respective recesses 26e, 26e of the light guide plate 26 and the protrusions 22c, 22c placed therein. This space is inevitably formed because of dimensional errors and the like of the recesses 26e, protrusions 22c, and the like. Thus, when the protrusions 22c are simply made to engage the recesses 26e, the light guide plate 26 is not securely fixed on the bottom plate 22a, and is allowed to move slightly. However, as described below, in the present embodiment, in addition to placing the protrusions 22c in the recesses 26e, the light guide plate 26 is pressed by the pressing members 27c of the frame 27 between the pressing members 27c and the bottom plate 22a, thereby making it possible to hold the light guide plate 26 in place securely inside the chassis 22.

As shown in FIGS. 6 and 7, the light source units 2 are disposed inside of the side walls 22b such that the respective LEDs 24 face the two end faces 26b, 26b on the long sides of the light guide plate 26. Between the respective LEDs 24 of the light source units 2 and the respective end faces 26b, 26b of the light guide plate 26, spaces of equal size (width) are formed. In order for light emitted from the respective LEDs 24 to enter the light guide plate 26 through the respective end faces 26b, 26b efficiently, it is preferable that such spaces be not formed. However, such spaces are provided in advance to prevent the end faces 26b, 26b of the light guide plate 26 and the respective LEDs 24 from contacting each other due to the thermal expansion of the light guide plate 26. When the light guide plate 26 thermally expands, the light guide plate 26 becomes longer in the short side direction, starting from the protrusions 22c. That is, when the thermal expansion of the light guide plate 26 occurs, the respective end faces 26b, 26b on the long sides move closer to the respective LEDs 24 of the light source units 2.

The optical sheets 23 are placed on the front surface 26a of the light guide plate 26. The respective notches 123, 123 formed at the respective short side ends of the optical sheets 23 are recessed inwardly, and each inside area is surrounded by three sides. One of the three sides is positioned furthest from the short side end, and is disposed in parallel therewith. The other two sides are disposed in parallel with each other having the one side therebetween. That is, the notch 123 has a shape formed by cutting out a small rectangular portion from a straight end of the optical sheets 23. The size of the notches 123 of the optical sheets 23 is set such that, when the optical sheets 23 are disposed on the front surface 26a of the light guide plate 26, the protrusions 22c are exposed from the notches 123 and portions of the front surface 26a around the recesses 26e are exposed. As shown in FIGS. 7 and 8, peripheral portions S0, S0 of the recesses 26e, 26e, which are portions of the front surface 26a of the light guide plate 26, are exposed from the respective notches 123, 123 of the optical sheets 23. The exposed peripheral portions S0 each have a shape that surrounds a recess 26e, and have a certain width. Specifically, as shown in FIG. 8, the peripheral portions S0 each have a shape that surrounds a protrusion 22c, which is rectangular in a plan view, from the two short sides and one long side.

As shown in FIG. 6, the frame 27 is placed on the top end of the side walls 22b that rise from the bottom plate 22a. As discussed above, the frame 27 has a frame-shaped covering plate 27a and outer walls 27b that extend downward from the outer edges of the covering plate 27a, and the outer walls 27b are attached to the outer surfaces of the side walls 22b of the chassis 22. The covering plate 27a extends from the top end of the side walls 22b toward the inside of the chassis 22, and covers outer edges W of the front surface 26a of the light guide plate 26 (FIG. 7). The covering plate 27a completely covers the peripheral portions S0, which are portions of the front surface 26a of the light guide plate 26. There is a small gap between the covering plate 27a and the light guide plate 26.

Pressing parts 27c are disposed on the rear side of the covering plate 27a (see FIG. 6). The pressing parts 27c are made by forming an elastic material such as urethane foam into a prescribed shape, and are disposed to protrude downward from the rear surface of the covering plate 27a. The thickness of the pressing parts 27c is greater than the gap between the covering plate 27a and the light guide plate 26. When the frame 27 is removed from the side walls 22b of the chassis 22 to see the rear side of the covering plate 27a, the end face of each pressing part 27c (facing the front surface 26a of the light guide plate 26) is flat, and the outer edges form a rectangular shape. The size of the rectangular end face is set such that the pressing part 27c fits inside the notch 123 of the optical sheets 23. In other words, the notches 123 of the optical sheets 23 are set such that the optical sheets 23 are not sandwiched between the pressing parts 27c and the light guide plate 26, when the optical sheets 23 are placed on the front surface 26a of the light guide plate 26. The optical sheets 23 are placed on the front surface 26a of the light guide plate 26 and positioned such that the respective pressing parts 27c, 27c are fitted inside of the notches 123, 123 that are at respective short side ends of the optical sheets 23 (see FIG. 8).

The pressing part 27c is pressed against the peripheral portion S0 by the covering plate 27a. That is, the peripheral portion S0 is a pressed portion that is pressed by the pressing part 27c. The two pressing parts 27c are disposed on the rear side of the covering plate 27a S0 as to press the respective peripheral portions S0, S0 that are provided at two locations on the front surface 26a of the light guide plate 26. Only the peripheral portions S0, S0 of the front surface 26a of the light guide plate 26 are selectively pressed by such pressing parts 27c. The light guide plate 26 is pressed against the bottom plate 22a that are on the rear surface 26c side thereof by the pressing parts 27c. That is, the light guide plate 26 is held in place inside the chassis 22, by being sandwiched by the pressing parts 27c of the frame 27 and the bottom plate 22a. The force with which the pressing parts 27c press the peripheral portions S0 of the light guide plate 26 is adjusted by appropriately changing the material for the pressing parts 27c, the thickness of the pressing parts 27c, the position at which the outer walls 27b of the frame 27 are attached to the side walls 22b of the chassis 22, and the like.

The liquid crystal panel 11 is placed on the frame 27, and the frame-shaped bezel 13 is placed on the frame 27 that has the liquid crystal panel 11 thereon.

When the liquid crystal display device 10 is powered on, power is supplied to the backlight device 12, and the respective LEDs 24 on the LED substrates 25 are illuminated. Then, the light therefrom enters the light guide plate 26 through the end faces 26b, and travels inside the light guide plate 26 by being reflected off of the reflective sheet 29 disposed on the rear surface 26c side of the light guide plate 26 and the like, and this light, which has become planar, is outputted from the front surface 26a. The light outputted from the front surface 26a passes through the optical sheets 23 and illuminates the liquid crystal panel 11 from the rear. With this light, the liquid crystal panel 11 displays an image on the front surface thereof.

(Effects)

In the backlight device 12 of the present embodiment, of the front surface 26a of the light guide plate 26, the peripheral portions S0 of the recesses 26e are pressed by the pressing parts 27c. Because the pressing parts 27c protrude from the rear side of the covering plate 27a of the frame 27 and are raised from the rear surface, the pressing parts 27c can selectively press the peripheral portions S0 of the light guide plate 26. By the two peripheral portions S0, S0 of the light guide plate 26 being pressed by the pressing parts 27c, 27c, the light guide plate 26 is sandwiched and held in place between the frame 27 that has the respective pressing parts 27c, 27c and the bottom plate 22a. As described above, by applying force to the light guide plate 26 from the respective sides thereof, it is possible to prevent the light guide plate 26 from moving in the horizontal direction along the bottom plate 22a, and therefore, the light guide plate 26 can be held in place securely. This makes it possible to prevent the light guide plate 26 from moving inside the chassis 22. It is also possible to prevent the gaps between the respective end faces 26b, 26b of the light guide plate 26 and the respective light source units 2 from varying. As a result, variations in efficiency of light from the respective LEDs 24 entering through the respective end faces 26d, 26d can also be prevented, which makes it possible to prevent uneven brightness in the backlight device 12.

The peripheral portions S0 are provided in locations that are less susceptible to thermal expansion in the light guide plate 26. In other words, as a result of being positioned away from the light source units 2, the peripheral portions S0 do not undergo thermal expansion almost at all as compared with the respective end faces 26b, 26b of the light guide plate 26 that face the light source units 2. Therefore, even when the light guide plate 26 undergoes thermal expansion, it is possible to prevent noise and the like caused by the front surface 26a of the light guide plate 26 rubbing the frame 27 that has the pressing parts 27c and the like.

The peripheral portions S0 are appropriately provided on the outer edges W of the front surface 26a of the light guide plate 26 and around the recesses 26e, 26e where thermal expansion does not occur almost at all in the light guide plate 26. Respective peripheral portions in other embodiments described below are appropriately provided on the front surface 26a of the light guide plate 26 in a similar manner.

<Embodiment 2>

Figure 9:
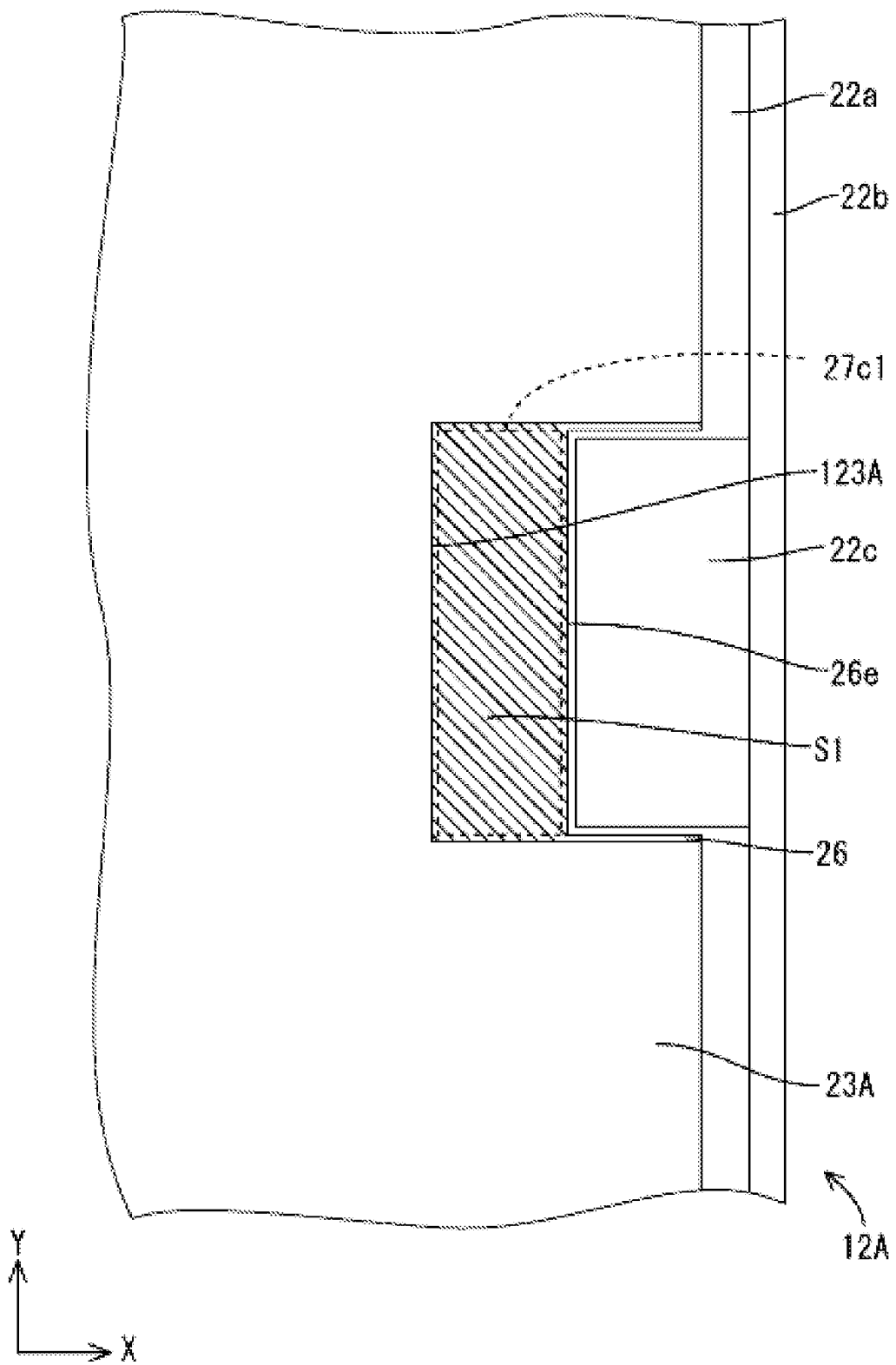
FIG. 9 is a magnified plan view showing a plan view configuration of a backlight device of Embodiment 2.

Next, Embodiment 2 will be explained with reference to FIG. 9 mainly. The basic configuration of a backlight device 12A of Embodiment 2 shown in FIG. 9 is similar to that of Embodiment 1. However, Embodiment 2 differs from Embodiment 1 in the shape of peripheral portions S1, the shape of notches 123A of optical sheets 23A, the shape of pressing parts that press the peripheral portions S1, and the like. Here, those differences will be mainly explained.

The backlight device 12A shown in FIG. 9 differs from that in Embodiment 1 in the location and shape of the peripheral portion S1 on the front surface 26a of the light guide plate 26. Specifically, the peripheral portion S1 is provided adjacent to one long side of a protrusion 22c that has a rectangular shape in a plan view. The shape of the peripheral portion S1 is a rectangular shape as shown in FIG. 9. In other words, the shape and size of the notch 123A are set such that the peripheral portion S1 having the above-mentioned shape is exposed from the optical sheets 23A. In the present embodiment, pressing parts 27c1 each having a corresponding shape to the shape of the peripheral portions S1 are provided in the frame 27. The peripheral portions S1 and the pressing parts 27c1 for pressing the peripheral portions S1 are provided at respective short side ends in a manner similar to Embodiment 1.

In the backlight device 12A of the present embodiment, the light guide plate 26 can be held in place securely in the chassis 22, and therefore, it is possible to prevent the light guide plate 26 from moving inside the chassis 22 as in Embodiment 1. It is also possible to prevent the gaps between the respective end faces 26b, 26b of the light guide plate 26 and the respective light source units 2 from varying. As a result, variations in efficiency of light from the respective LEDs 24 entering through the respective end faces 26b, 26b can also be prevented, which makes it possible to prevent uneven brightness in the backlight device 12A. Furthermore, even when the light guide plate 26 undergoes thermal expansion, it is possible to prevent noise and the like caused by the front surface 26a of the light guide plate 26 rubbing the frame that has the pressing parts 27c1 and the like.

<Embodiment 3>

Figure 10:
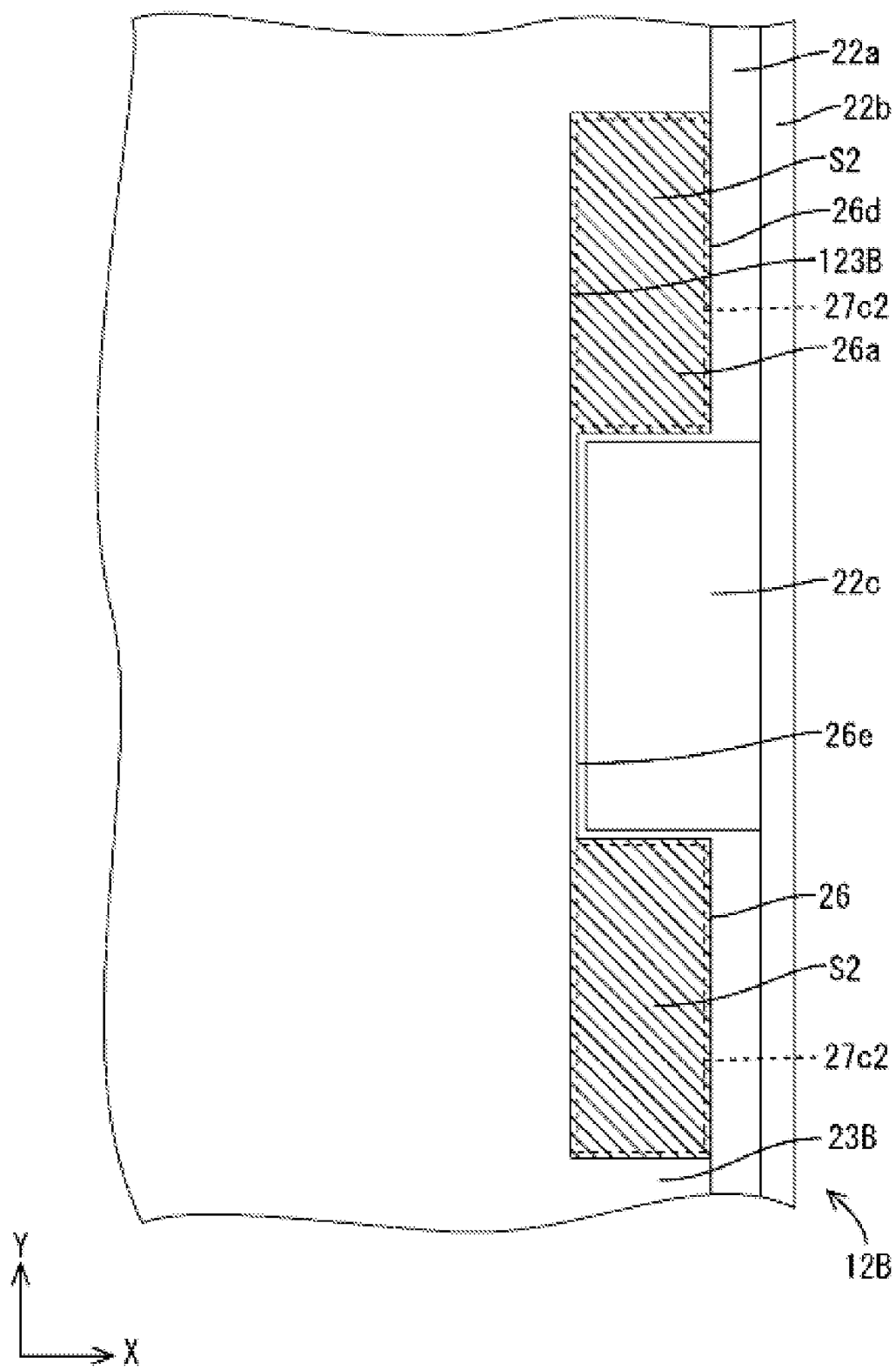
FIG. 10 is a magnified plan view showing a plan view configuration of a backlight device of Embodiment 3.

Next, Embodiment 3 will be explained with reference to FIG. 10 mainly. The basic configuration of a backlight device 12B of Embodiment 3 shown in FIG. 10 is similar to that of Embodiment 1. However, Embodiment 3 differs from Embodiment 1 in the shape of peripheral portions S2, the shape of notches 123B of optical sheets 23B, the shape of pressing parts 27c2 that press the peripheral portions S2, and the like. Here, those differences will be mainly explained.

The backlight device 12B shown in FIG. 10 differs from that in Embodiment 1 in the location and shape of the peripheral portion S2 on the front surface 26a of the light guide plate 26. Specifically, the peripheral portion S2 is divided S0 as to be positioned adjacent to respective two short sides of a protrusion 22c that has a rectangular shape in a plan view. The divided peripheral portions S2, S2 each have a rectangular shape as shown in FIG. 10, and are aligned along the end face 26d of the light guide plate 26 having a recess 26e (and a protrusion 22c) therebetween. In other words, the shape and size of the notch 123B are set such that the peripheral portions S2 having the above-mentioned shape are exposed from the optical sheets 23B. In the present embodiment, the pressing parts 27c2 each having a corresponding shape to the shape of the peripheral portions S2 are provided in the frame 27. That is, each pressing part 27c2 is divided into two pieces so as to correspond to the divided peripheral portions S2, S2 provided at one short side end. The peripheral portions S2 and the pressing parts 27c2 for pressing the peripheral portions S2 are provided at respective short side ends in a manner similar to Embodiment 1.

In the backlight device 12B of the present embodiment, the light guide plate 26 can be held in place securely in the chassis 22, and therefore, it is possible to prevent the light guide plate 26 from moving inside the chassis 22 as in Embodiment 1. It is also possible to prevent the gaps between the respective end faces 26b, 26b of the light guide plate 26 and the respective light source units 2 from varying. As a result, variations in efficiency of light from the respective LEDs 24 entering through the respective end faces 26b, 26b can also be prevented, which makes it possible to prevent uneven brightness in the backlight device 12B. Furthermore, even when the light guide plate 26 undergoes thermal expansion, it is possible to prevent noise and the like caused by the front surface 26a of the light guide plate 26 rubbing the frame that has the pressing parts 27c2 and the like.

<Embodiment 4>

Figure 11:
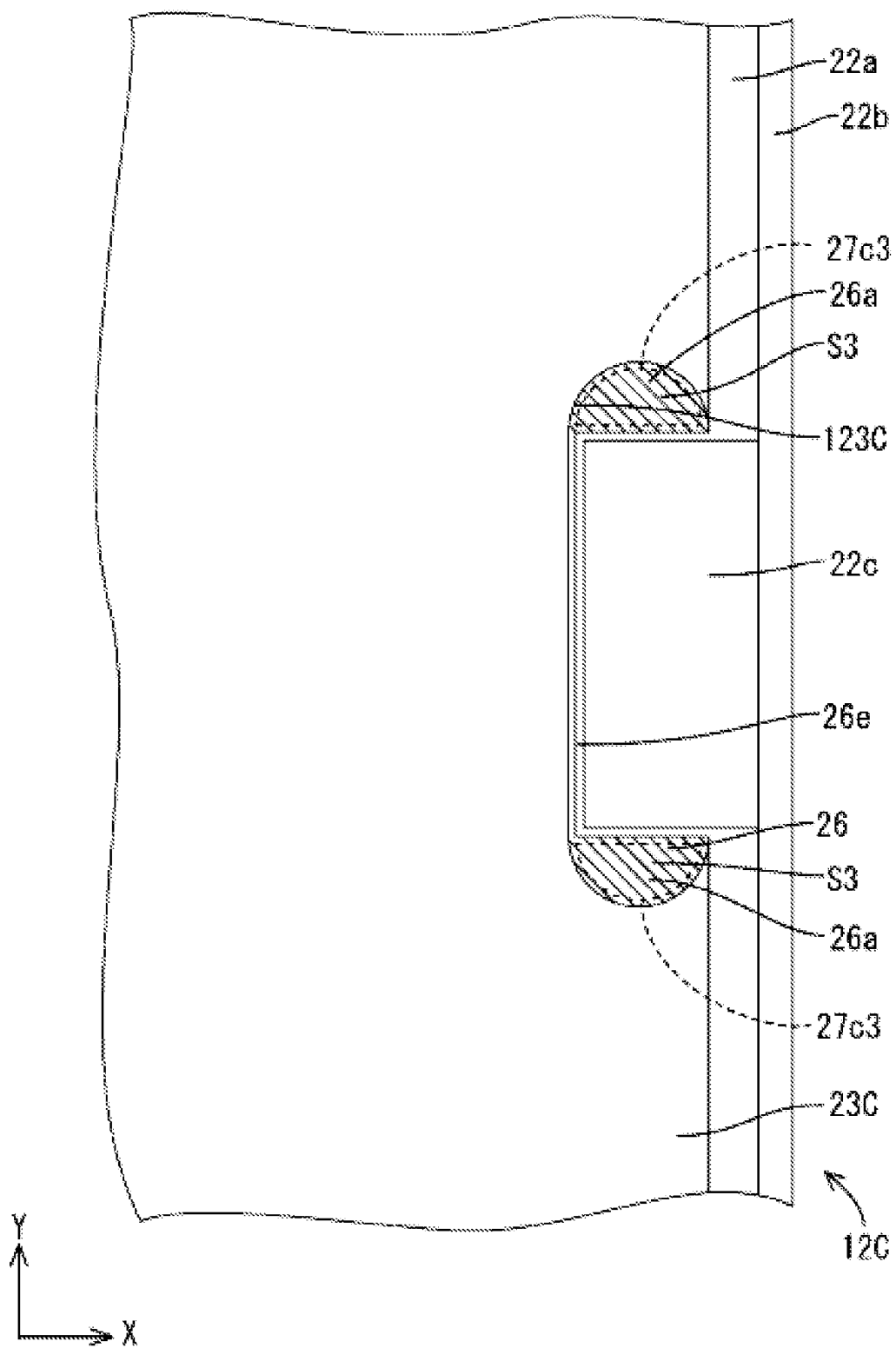
FIG. 11 is a magnified plan view showing a plan view configuration of a backlight device of Embodiment 4.

Next, Embodiment 4 will be explained with reference to FIG. 11 mainly. The basic configuration of a backlight device 12C of Embodiment 4 shown in FIG. 11 is similar to that of Embodiment 1. However, Embodiment 4 differs from Embodiment 1 in the shape of peripheral portions S3, the shape of notches 123C of optical sheets 23C, the shape of pressing parts 27c3 that press the peripheral portions S3, and the like. Here, those differences will be mainly explained.

The backlight device 12C shown in FIG. 11 differs from that in Embodiment 1 in the location and shape of the peripheral portions S3 on the front surface 26a of the light guide plate 26. Specifically, each of the peripheral portions S3 is divided so as to be positioned adjacent to respective two short sides of a protrusion 22c that has a rectangular shape in a plan view. The divided peripheral portions S3, S3 each have a semicircular shape as shown in FIG. 11, and are arranged so as to have a recess 26e (and a protrusion 22c) therebetween. In other words, the shape and size of the notches 123C are set such that the peripheral portions S3 having the above-mentioned shape are exposed from the optical sheets 23C. In the present embodiment, the pressing parts 27c3 having a corresponding shape to the shape of the peripheral portions S3 are provided in the frame 27. That is, each pressing part 27c3 is divided into two pieces so as to correspond to the divided peripheral portions S3, S3 provided at one short side end. The peripheral portions S3 and the pressing parts 27c3 for pressing the peripheral portions S3 are provided at respective short side ends in a manner similar to Embodiment 1.

In the backlight device 12C of the present embodiment, the light guide plate 26 can be held in place securely in the chassis 22, and therefore, it is possible to prevent the light guide plate 26 from moving inside the chassis 22 as in Embodiment 1. It is also possible to prevent the gaps between the respective end faces 26b, 26b of the light guide plate 26 and the respective light source units 2 from varying. As a result, variations in efficiency of light from the respective LEDs 24 entering through the respective end faces 26b, 26b can also be prevented, which makes it possible to prevent uneven brightness in the backlight device 12C. Furthermore, even when the light guide plate 26 undergoes thermal expansion, it is possible to prevent noise and the like caused by the front surface 26a of the light guide plate 26 rubbing the frame that has the pressing parts 27c3 and the like.

<Embodiment 5>

Figure 12:
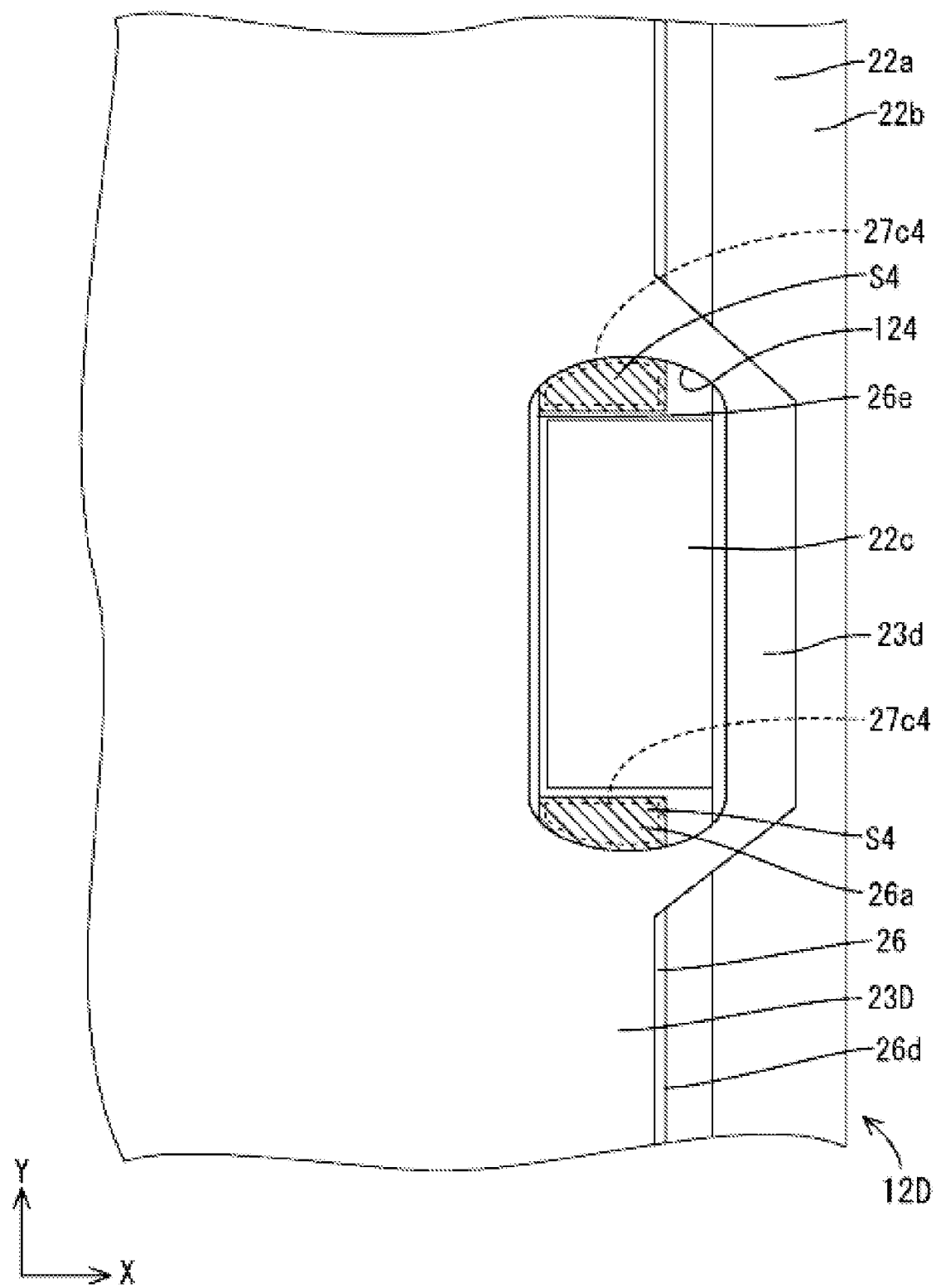
FIG. 12 is a magnified plan view showing a plan view configuration of a backlight device of Embodiment 5.

Next, Embodiment 5 will be explained with reference to FIG. 12 mainly. The basic configuration of a backlight device 12D of Embodiment 5 shown in FIG. 12 is similar to that of Embodiment 1. However, Embodiment 5 differs from Embodiment 1 in the shape of peripheral portions S4, the shape of optical sheets 23D, the shape of pressing parts 27c4 that press the peripheral portions S4, and the like. Embodiment 5 differs from Embodiment 1 also in that holes 124 are provided in the optical sheets 23D, instead of notches. Here, those differences will be mainly explained.

The backlight device 12D shown in FIG. 12 differs from that in Embodiment 1 in the location and shape of the peripheral portions S4 on the front surface 26a of the light guide plate 26. Specifically, the optical sheets 23d are provided with tabs 23d that extend toward the outside from the respective short side ends. These tabs 23d are provided to protrude toward the outside beyond the end faces 26d of the light guide plate 26. Inside of each tab 23d, a hole 124 is formed in an oval shape. The hole 124 is formed such that a protrusion 22c is fitted therein and a peripheral portion S4 of the recess 26e is exposed therefrom. Each of the peripheral portions S4 exposed from the holes 124 is divided and disposed adjacent to respective two short sides of a protrusion 22c that is a rectangular shape in a plan view. The divided peripheral portions S4, S4 each have a substantially rectangular shape as shown in FIG. 12, and are arranged so as to have a recess 26e (and a protrusion 22c) therebetween. In the present embodiment, pressing parts 27c4 having a corresponding shape to the shape of the peripheral portions S4 are provided in the frame 27. That is, each pressing part 27c4 is divided into two pieces so as to correspond to the divided peripheral portions S4, S4 provided at one short side end. The peripheral portions S4 and the pressing parts 27c4 for pressing the peripheral portions S4 are provided at respective short side ends in a manner similar to Embodiment 1.

In the backlight device 12D of the present embodiment, the light guide plate 26 can be held in place securely in the chassis 22, and therefore, it is possible to prevent the light guide plate 26 from moving inside the chassis 22 as in Embodiment 1. It is also possible to prevent the gaps between the respective end faces 26b, 26b of the light guide plate 26 and the respective light source units 2 from varying. As a result, variations in efficiency of light from the respective LEDs 24 entering through the respective end faces 26b, 26b can also be prevented, which makes it possible to prevent uneven brightness in the backlight device 12D. Furthermore, even when the light guide plate 26 undergoes thermal expansion, it is possible to prevent noise and the like caused by the front surface 26a of the light guide plate 26 rubbing the frame that has pressing parts 27c4 and the like.

In the present embodiment, if the height of the protrusions 22c from the bottom plate 22a is set higher than the front surface 26a of the light guide plate 26 placed on the bottom plate 22a, it is possible to make the protrusions 22c inserted through the holes 124 formed inside of the tabs 23d of the optical sheets 23D. This makes it easier to define the position of the optical sheets 23d on the front surface 26a of the light guide plate 26.

<Embodiment 6>

Figure 13:
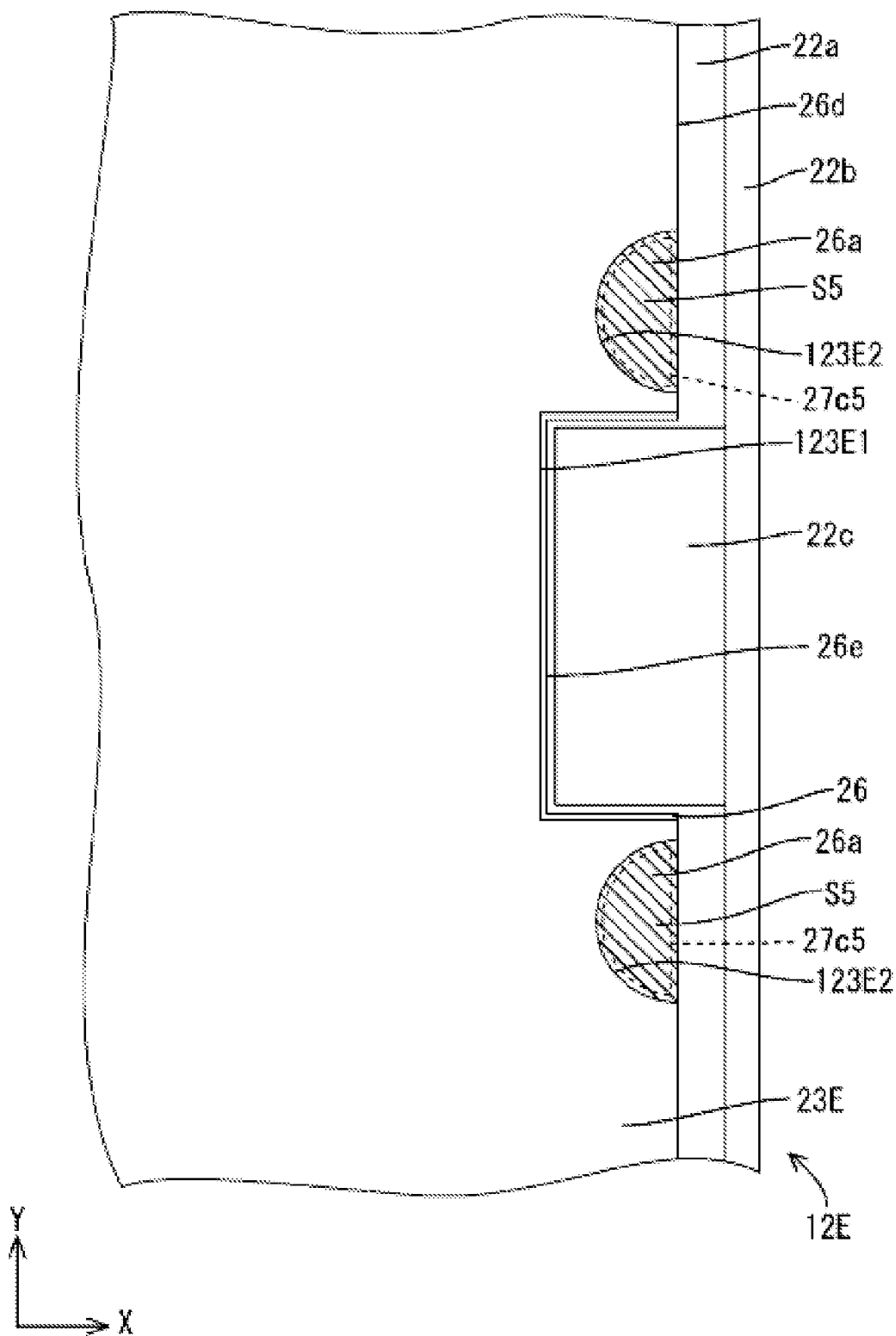
FIG. 13 is a magnified plan view showing a plan view configuration of a backlight device of Embodiment 6.

Next, Embodiment 6 will be explained with reference to FIG. 13 mainly. The basic configuration of a backlight device 12E of Embodiment 6 shown in FIG. 13 is similar to that of Embodiment 1. However, Embodiment 6 differs from Embodiment 1 in the shape of peripheral portions S5, the shape of notches 123E1, 123E2 of optical sheets 23E, the shape of pressing parts 27c5 that press the peripheral portions S5, and the like. Here, those differences will be mainly explained.

The backlight device 12E shown in FIG. 13 differs from that in Embodiment 1 in the location and shape of the peripheral portions S5 on the front surface 26a of the light guide plate 26. Specifically, each of the peripheral portions S5 is divided so as to be positioned adjacent to respective two short sides of a protrusion 22c that has a rectangular shape in a plan view. The divided peripheral portions S5, S5 each have a semicircular shape as shown in FIG. 13, and are arranged so as to have a recess 26e (and a protrusion 22c) therebetween. These peripheral portions S5, S5 are recessed inwardly from the end face 26d of the light guide plate 26. In other words, the shape and size of the notches 123E2 are set such that the peripheral portions S5 having the above-mentioned shape are exposed from the optical sheets 23E. In addition to the notches 123E2 for exposing the peripheral portions S5, the optical sheets 23E of the present embodiment also have a notch 123E1 formed in a shape corresponding to the shape of the recess 26e. The protrusion 22c is exposed from the notch 123E1. In the present embodiment, pressing parts 27c5 having a corresponding shape to the shape of the peripheral portions S5 are provided in the frame 27 That is, each pressing part 27c5 is divided into two pieces so as to correspond to the divided peripheral portions S5, S5 provided at one short side end. The peripheral portions S5 and the pressing parts 27c5 for pressing the peripheral portions S5 are provided at respective short side ends in a manner similar to Embodiment 1.

In the backlight device 12E of the present embodiment, the light guide plate 26 can be held in place securely in the chassis 22, and therefore, it is possible to prevent the light guide plate 26 from moving inside the chassis 22 as in Embodiment 1. It is also possible to prevent the gaps between the respective end faces 26b, 26b of the light guide plate 26 and the respective light source units 2 from varying. As a result, variations in efficiency of light from the respective LEDs 24 entering through the respective end faces 26b, 26b can also be prevented, which makes it possible to prevent uneven brightness in the backlight device 12E. Furthermore, even when the light guide plate 26 undergoes thermal expansion, it is possible to prevent noise and the like caused by the front surface 26a of the light guide plate 26 rubbing the frame that has the pressing parts 27c5 and the like.

<Embodiment 7>

Figure 14:
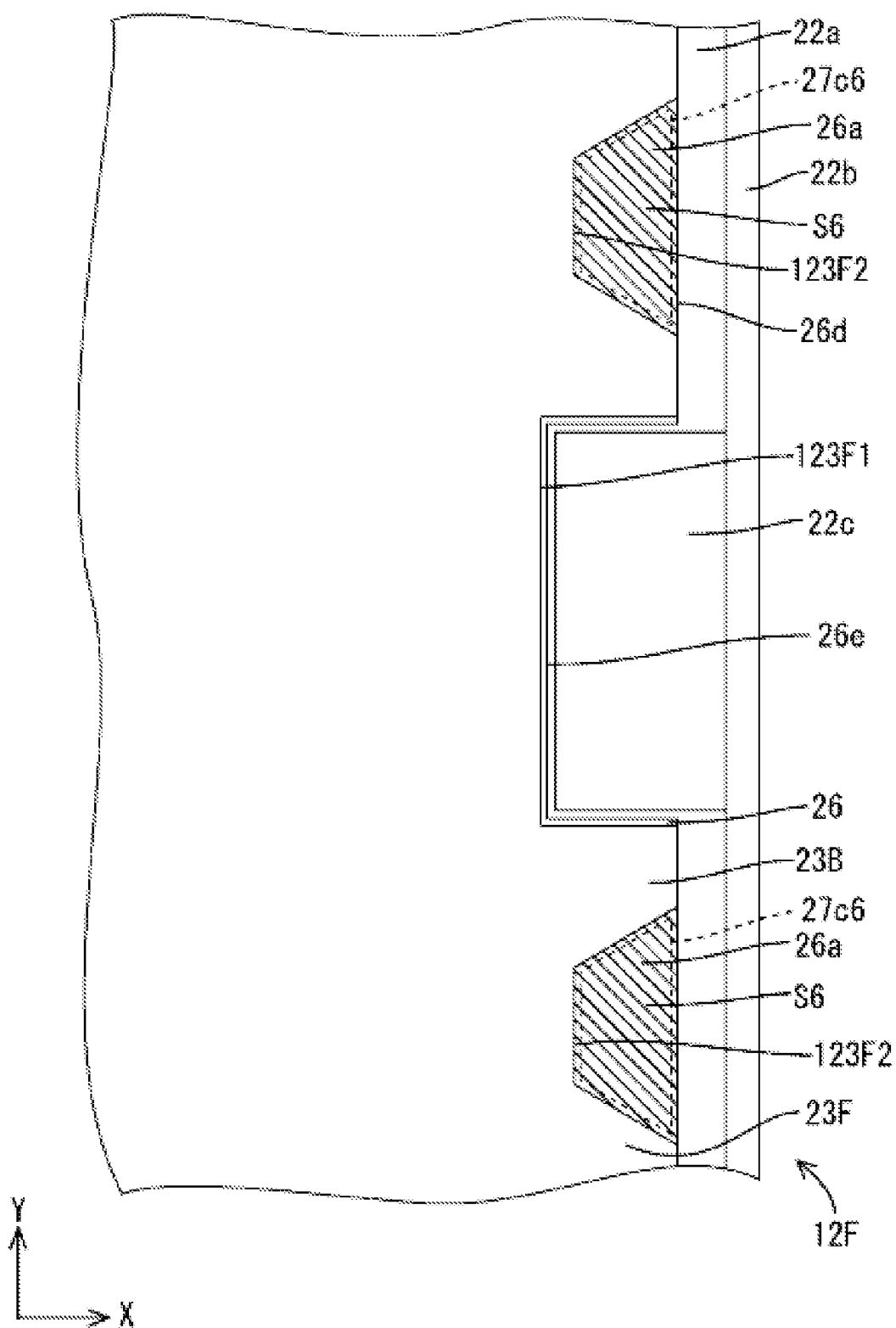
FIG. 14 is a magnified plan view showing a plan view configuration of a backlight device of Embodiment 7.

Next, Embodiment 7 will be explained with reference to FIG. 14 mainly. The basic configuration of a backlight device 12F of Embodiment 7 shown in FIG. 14 is similar to that of Embodiment 1. However, Embodiment 7 differs from Embodiment 1 in the shape of peripheral portions S6, the shape of notches 123F1, 123F2 of optical sheets 23F, the shape of pressing parts 27c6 that press the peripheral portions S6, and the like. Here, those differences will be mainly explained.

The backlight device 12F shown in FIG. 14 differs from that in Embodiment 1 in the location and shape of the peripheral portions S6 on the front surface 26a of the light guide plate 26. Specifically, each of the peripheral portions S6 is divided so as to be positioned adjacent to respective two short sides of a protrusion 22c that has a rectangular shape in a plan view. The divided peripheral portions S6, S6 each have a trapezoidal shape as shown in FIG. 14, and are arranged so as to have a recess 26e (and a protrusion 22c) therebetween. The peripheral portions S6, S6 are recessed inwardly from the end face 26d of the light guide plate 26, and are disposed such that the bottom side of each trapezoid matches the end face 26d of the light guide plate 26. In other words, the shape and size of the notches 123F2 are set such that the peripheral portions S6 having the above-mentioned shape are exposed from the optical sheets 23F. In addition to the notches 123F2 for exposing the peripheral portions S6, the optical sheets 23F of the present embodiment also have a notch 123F1 formed in a shape corresponding to the shape of the recess 26e. The protrusion 22c is exposed from the notch 123F1. In the present embodiment, pressing parts 27c6 having a corresponding shape to the shape of the peripheral portions S6 are provided in the frame 27. That is, each pressing part 27c6 is divided into two pieces so as to correspond to the divided peripheral portions S6, S6 provided at one short side end. The peripheral portions S6 and the pressing parts 27c6 for pressing the peripheral portions S6 are provided at respective short side ends in a manner similar to Embodiment 1.

In the backlight device 12F of the present embodiment, the light guide plate 26 can be held in place securely in the chassis 22, and therefore, it is possible to prevent the light guide plate 26 from moving inside the chassis 22 as in Embodiment 1. It is also possible to prevent the gaps between the respective end faces 26b, 26b of the light guide plate 26 and the respective light source units 2 from varying. As a result, variations in efficiency of light from the respective LEDs 24 entering through the respective end faces 26b, 26b can also be prevented, which makes it possible to prevent uneven brightness in the backlight device 12F. Furthermore, even when the light guide plate 26 undergoes thermal expansion, it is possible to prevent noise and the like caused by the front surface 26a of the light guide plate 26 rubbing the frame that has the pressing parts 27c6 and the like.

<Embodiment 8>

Figure 15:
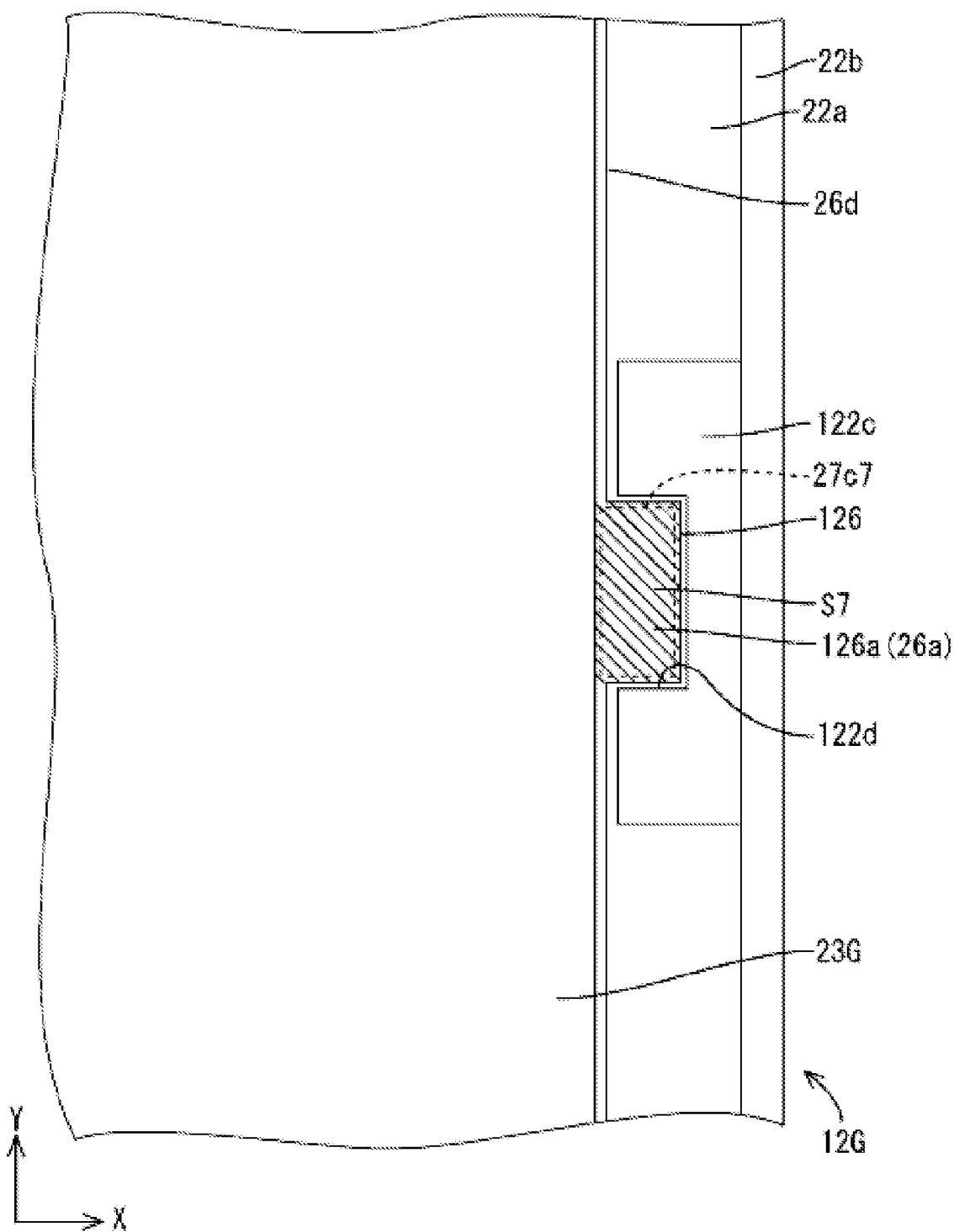
FIG. 15 is a magnified plan view showing a plan view configuration of a backlight device of Embodiment 8.

Next, Embodiment 8 will be explained with reference to FIG. 15 mainly. The basic configuration of a backlight device 12G of Embodiment 8 shown in FIG. 15 is similar to that of Embodiment 1. However, Embodiment 8 differs from Embodiment 1 in the shape of the light guide plate 26, the shape of protrusions 122c, the shape of optical sheets 23G, the shape of peripheral portions S7, and the like. Here, those differences will be mainly explained.

In the backlight device 12G shown in FIG. 15, a projection 126 is formed on the end face 26d of the light guide plate 26.

The projection 126 is provided instead of the recess 26e in the light guide plate 26 of Embodiment 1. The protrusion 122c has a recessed surface 122d that faces the light guide plate 26 disposed in the chassis 22. The light guide plate 26 of the present embodiment is disposed on the bottom plate 22a of the chassis 22 with the projection 126 engaging the recessed surface 122d of the protrusion 122c. That is, as opposed to Embodiment 1, the projection 126 is provided in the light guide plate 26, and the recessed surface 122d is formed in the protrusion 122c.

The optical sheets 23G are placed on the front surface 26a of the light guide plate 26 so as to cover the front surface 26a of the light guide plate 26, except for a surface 126a of the projection 126. In other words, the surface 126a of the projection 126 protrudes from the optical sheets 23G. The peripheral portion S7 of the present embodiment is provided on this protruding portion. In other words, the surface 126a of the projection 126 is the peripheral portion S7. The optical sheets 23G of the present embodiment are formed in a rectangular shape, and are not provided with a notch unlike the optical sheet 23 of Embodiment 1.

The projection 126 is provided at each of the short side ends of the light guide plate 26, and the peripheral portions S7, S7 are on the surfaces of the respective projections 126. Pressing parts 27c7 having a corresponding shape to the shape of the peripheral portions S7 are provided at prescribed locations of the frame 27 for pressing the respective peripheral portions S7, S7.

The peripheral portions S7 are appropriately provided on the outer edge W of the front surface 26a of the light guide plate 26 and around the projections 126 that do not undergo thermal expansion almost at all in the light guide plate 26.

In the backlight device 12G of the present embodiment, the light guide plate 26 can be held in place securely in the chassis 22, and therefore, it is possible to prevent the light guide plate 26 from moving inside the chassis 22 as in Embodiment 1. It is also possible to prevent the gaps between the respective end faces 26b, 26b of the light guide plate 26 and the respective light source units 2 from varying. As a result, variations in efficiency of light from the respective LEDs 24 entering through the respective end faces 26b, 26b can also be prevented, which makes it possible to prevent uneven brightness in the backlight device 12G. Furthermore, even when the light guide plate 26 undergoes thermal expansion, it is possible to prevent noise and the like caused by the front surface 26a of the light guide plate 26 rubbing the frame that has the pressing parts 27c7 and the like.

<Embodiment 9>

Figure 16:
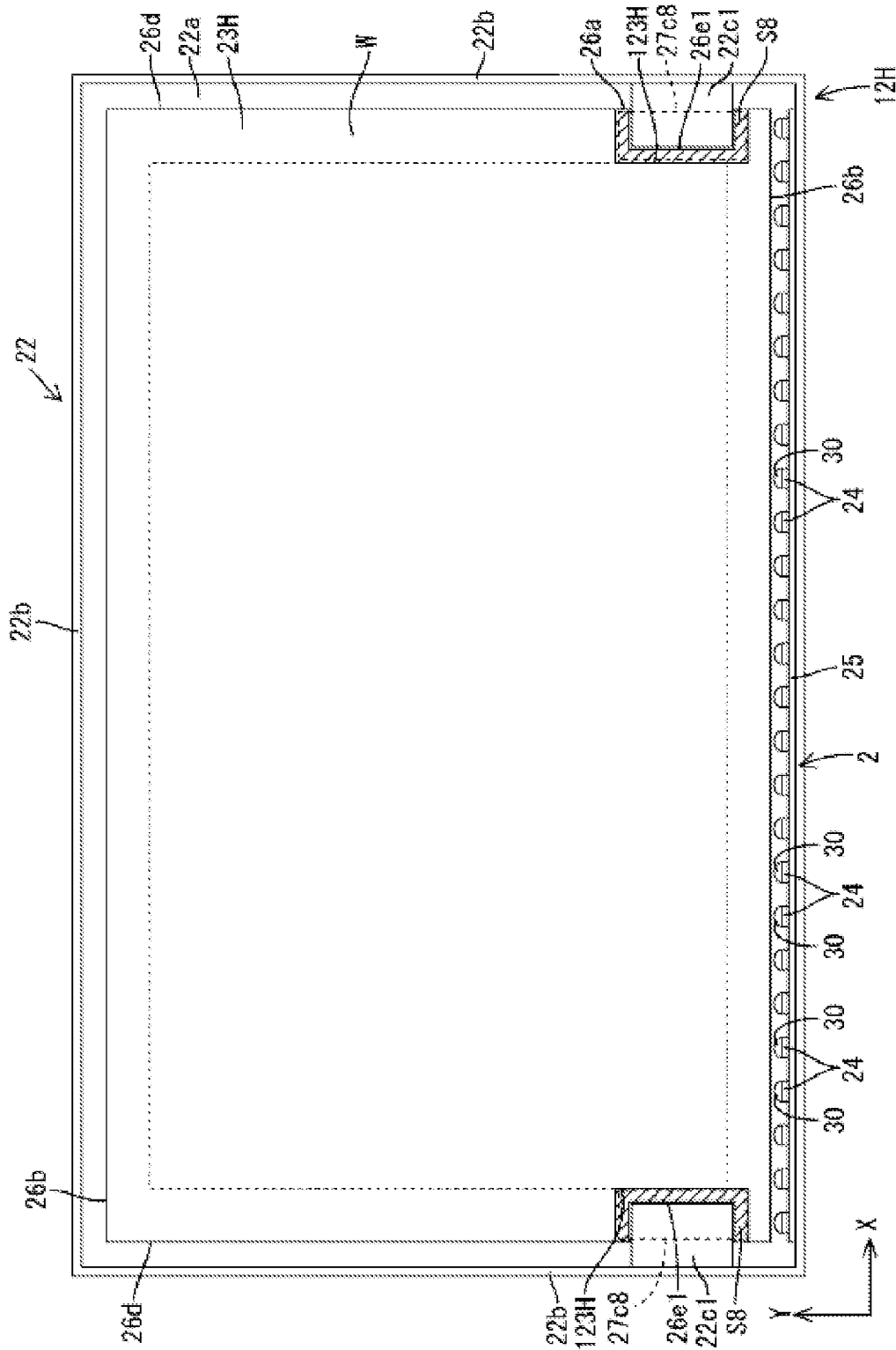
FIG. 16 is a plan view showing a plan view configuration of a backlight device of Embodiment 9.

Next, Embodiment 9 will be explained with reference to FIG. 16 mainly. The basic configuration of a backlight device 12H of Embodiment 9 shown in FIG. 16 is similar to that of Embodiment 1. However, in Embodiment 9, the light source unit 2 is disposed in the chassis 22 so as to face one end face 26b only of two end faces (second end faces) 26b on the long sides of the light guide plate 26. Recesses 26e1, 26e1 are respectively formed at two end faces (first end faces) 26d, 26d on the short sides of the light guide plate 26 in positions closer to the light source unit 2. Protrusions 22c1 that engage the recesses 26e1 are also disposed in positions closer to the light source unit 2. Furthermore, notches 123H formed in optical sheets 23H are also disposed in positions closer to the light source unit 2. The shape, size, and the like of the protrusions 22c1, the recesses 26e1, and the notches 123H are the same as those in Embodiment 1. Therefore, the shape, size, and the like of peripheral portions S8 are also the same as those in Embodiment 1. As shown in FIG. 16, the peripheral portions S8 are provided at two locations on the light guide plate 26.

Also, pressing parts 27c8 having a corresponding shape to the shape of the peripheral portions S8 are provided to the frame.

In the backlight device 12H of the present embodiment, the light guide plate 26 can be held in place securely in the chassis 22, and therefore, it is possible to prevent the light guide plate 26 from moving inside the chassis 22 as in Embodiment 1. It is also possible to prevent the gap between the end face 26b of the light guide plate 26 and the light source unit 2 from varying. As a result, variations in efficiency of light from the respective LEDs 24 entering through the end face 26b can also be prevented, which makes it possible to prevent uneven brightness in the backlight device 12H. Furthermore, even when the light guide plate 26 undergoes thermal expansion, it is possible to prevent noise and the like caused by the front surface 26a of the light guide plate 26 rubbing the frame that has the pressing parts 27c8 and the like.

<Embodiment 10>

Figure 17:
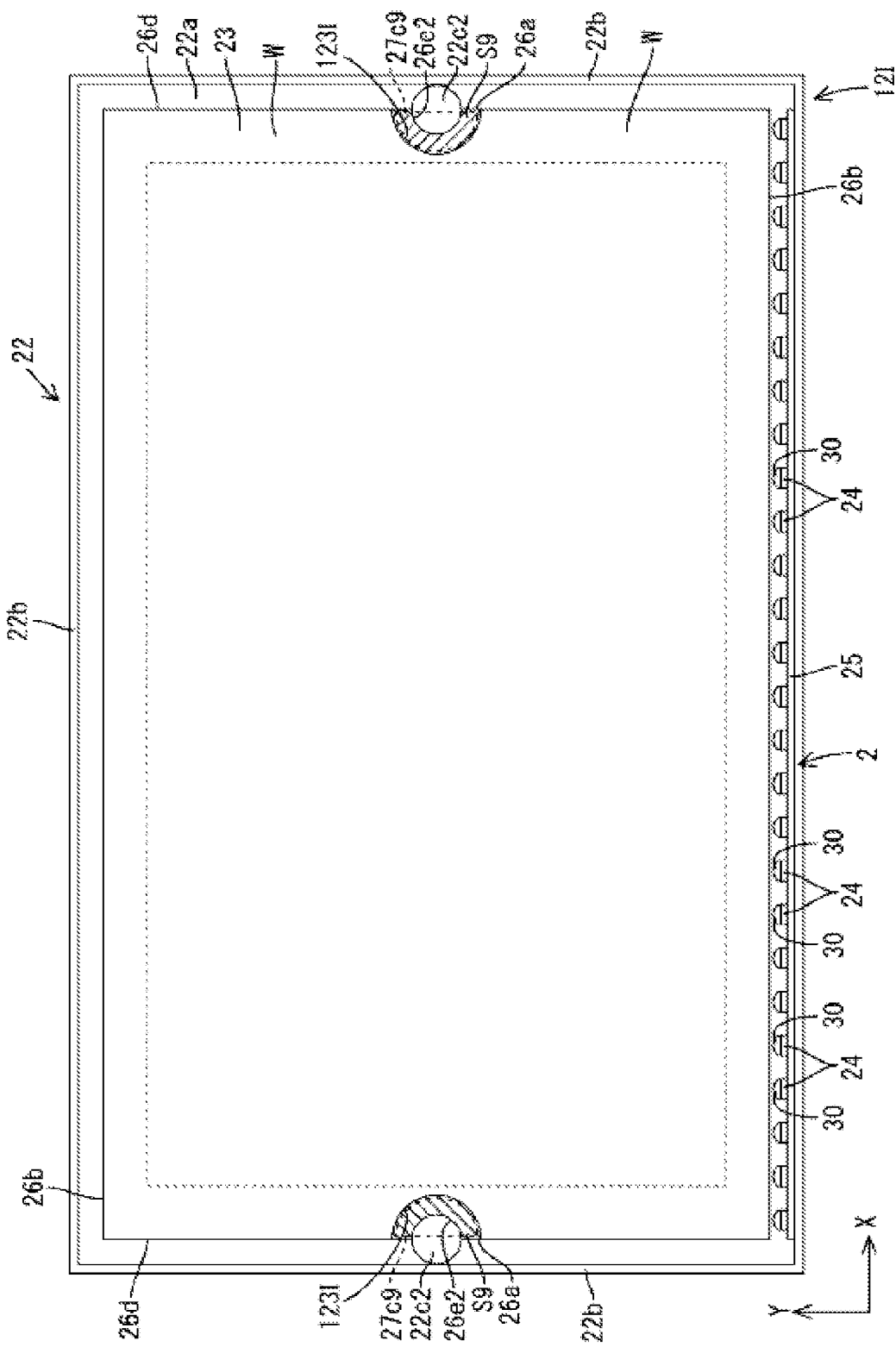
FIG. 17 is a plan view showing a plan view configuration of a backlight device of Embodiment 10.

Next, Embodiment 10 will be explained with reference to FIG. 17 mainly. The basic configuration of a backlight device 12I of Embodiment 10 shown in FIG. 17 is similar to that of Embodiment 1. However, in Embodiment 10, the light source unit 2 is disposed in the chassis 22 so as to face one end face 26b only of two end faces (second end faces) 26b on the long sides of the light guide plate 26. Recesses 26e2, 26e2 having a semicircular shape are provided in the respective centers of the two end faces (first end faces) 26d, 26d on the short sides of the light guide plate 26. Protrusions 22c2 that engage these recesses 26e2 each have a circular column shape, and are provided on the bottom plate 22a of the chassis 22. Notches 123I provided in the optical sheets 23 have a semicircular shape, and the front surface 26a of the light guide plate 26 is exposed from the notches 123I. The exposed portions are peripheral portions S9. The shape of each peripheral portion S9 corresponds to a half circular ring. As shown in FIG. 17, the peripheral portions S9 are provided at two locations on the light guide plate 26. Also, pressing parts 27c9 having a corresponding shape to the shape of the peripheral portions S9 are provided to the frame.

In the backlight device 12I of the present embodiment, the light guide plate 26 can be held in place securely in the chassis 22, and therefore, it is possible to prevent the light guide plate 26 from moving inside the chassis 22 as in Embodiment 1. It is also possible to prevent the gap between the end face 26b of the light guide plate 26 and the light source unit 2 from varying. As a result, variations in efficiency of light from the respective LEDs 24 entering through the end face 26b can also be prevented, which makes it possible to prevent uneven brightness in the backlight device 12I. Furthermore, even when the light guide plate 26 undergoes thermal expansion, it is possible to prevent noise and the like caused by the front surface 26a of the light guide plate 26 rubbing the frame that has the pressing parts 27c9 and the like.

<Embodiment 11>

Figure 18:
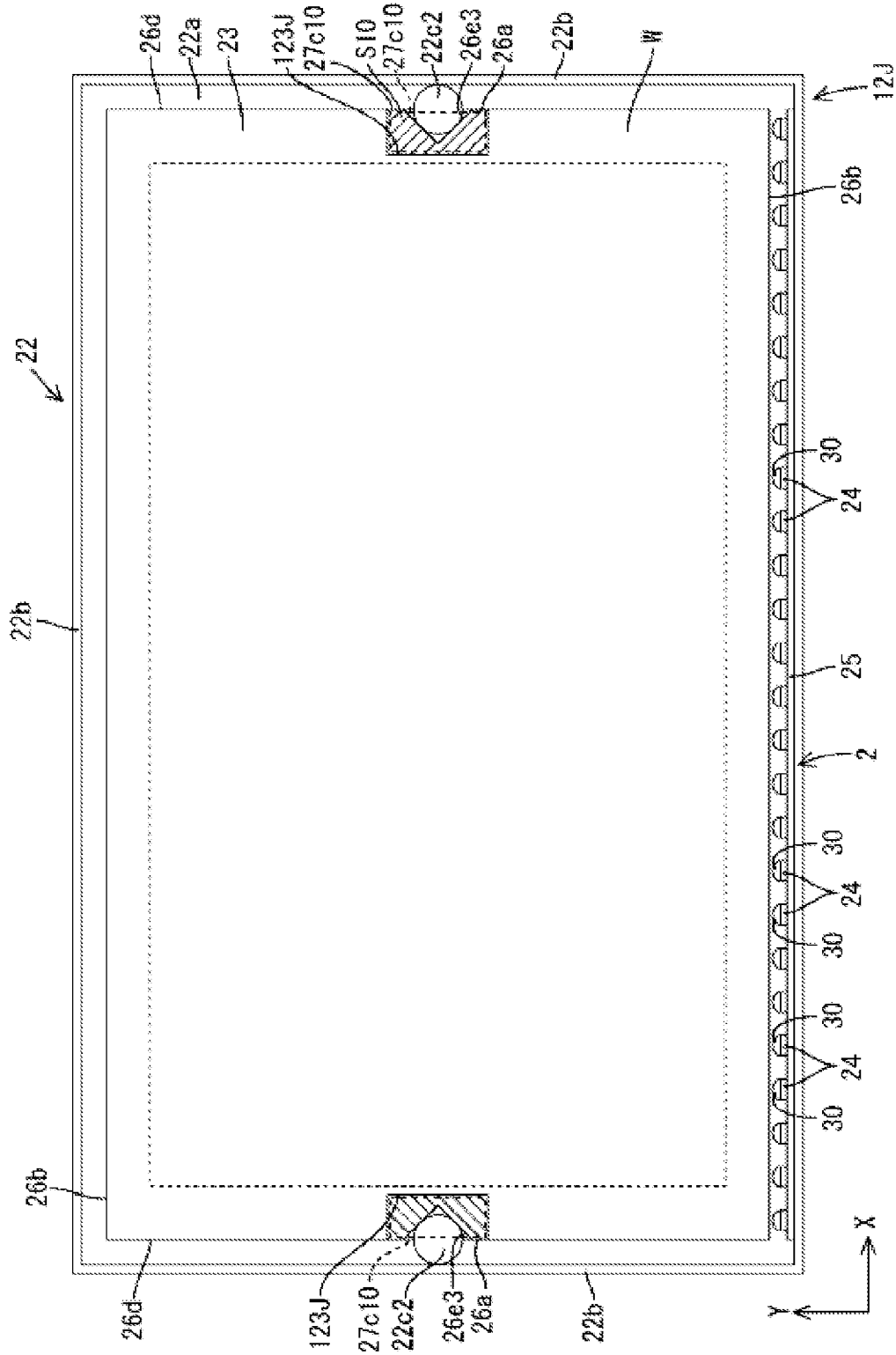
FIG. 18 is a plan view showing a plan view configuration of a backlight device of Embodiment 11.

Next, Embodiment 11 will be explained with reference to FIG. 18 mainly. The basic configuration of a backlight device 12J of Embodiment 11 shown in FIG. 18 is similar to that of Embodiment 1. However, in Embodiment 11, the light guide plate 26 is provided with a triangular recesses 26e3, 26e3 in the respective centers of the two end faces (first end faces) 26d, 26d on the longer sides of the light guide plate 26. The recess 26e3 has a shape that is surrounded by two sides of a triangle. The protrusions 22c2 that engage the recesses 26e3 each have a circular column shape as in Embodiment 10, and are provided on the bottom plate 22a of the chassis 22. The protrusions 22c2 engage the recesses 26e3 by being disposed between surfaces on the two sides of a triangle.

Notches 123J provided in the optical sheets 23 have a rectangular shape as in Embodiment 1, and the front surface 26a of the light guide plate 26 is exposed from the notches 123J. The exposed portions are peripheral portions S10. As shown in FIG. 18, the peripheral portions S10 are provided at two locations on the light guide plate 26. Also, pressing parts 27c10 having a corresponding shape to the shape of the peripheral portions S10 are provided to the frame.

In the backlight device 12J of the present embodiment, the light guide plate 26 can be held in place securely in the chassis 22, and therefore, it is possible to prevent the light guide plate 26 from moving inside the chassis 22 as in Embodiment 1. It is also possible to prevent the gap between the end face 26b of the light guide plate 26 and the light source unit 2 from varying. As a result, variations in efficiency of light from the respective LEDs 24 entering through the end face 26b can also be prevented, which makes it possible to prevent uneven brightness in the backlight device 12J. Furthermore, even when the light guide plate 26 undergoes thermal expansion, it is possible to prevent noise and the like caused by the front surface 26a of the light guide plate 26 rubbing the frame that has the pressing parts 27c10 and the like.

<Embodiment 12>

Figure 19:
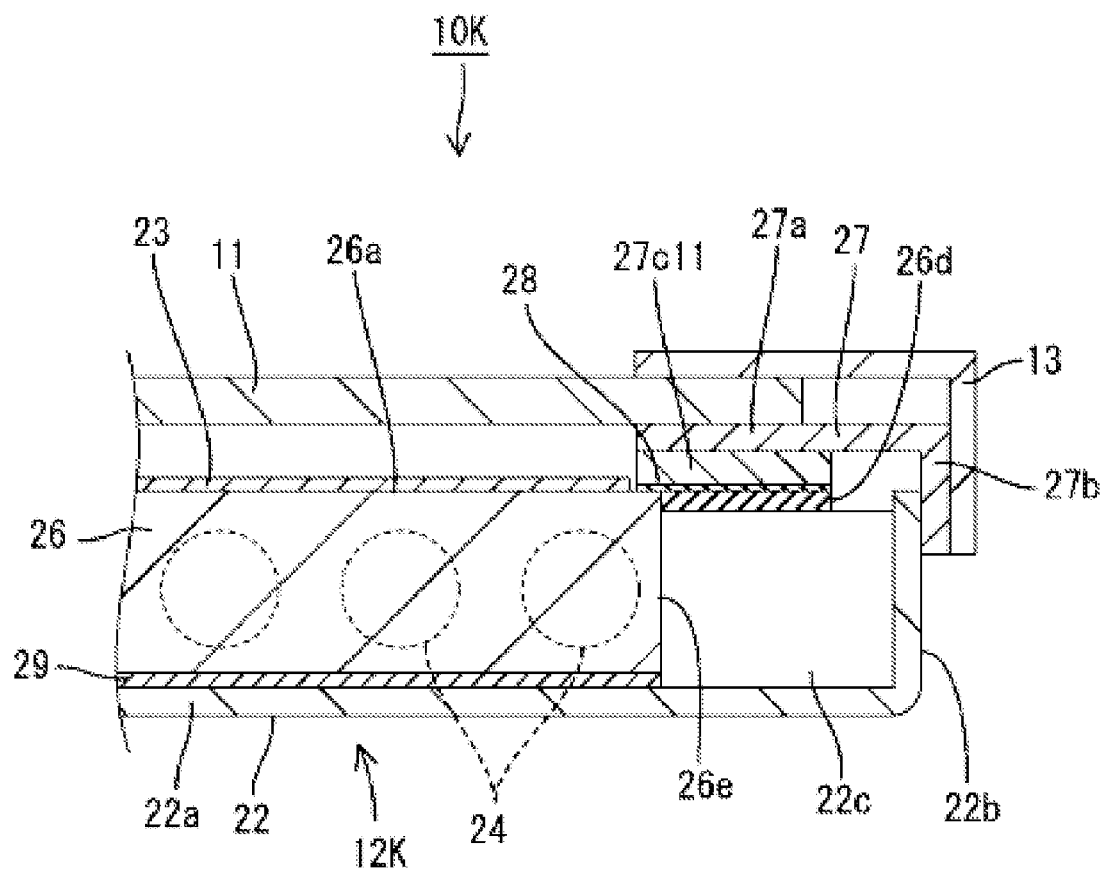
FIG. 19 is a cross-sectional view showing a part of a cross-sectional configuration of a liquid crystal display device of Embodiment 12 along the long side direction.

Next, Embodiment 12 will be explained with reference to FIG. 19 mainly. The basic configuration of a liquid crystal display device 10K of Embodiment 12 shown in FIG. 19 is similar to that of Embodiment 1. However, the present embodiment differs from Embodiment 1 in pressing parts 27c11 provided in the frame 27 of a backlight device 12K of the liquid crystal display device 10K. Specifically, a sheet-shaped reflective part 28 is provided on the end face of each pressing part 27c11. The reflective part 28 is made of the same type of material as the reflective sheet 29, for example. As described above, if the reflective part 28 is provided on the end face of each pressing part 27c11, light emitted from the respective LEDs 24 and outputted from the front surface 26a of the light guide plate 26 is reflected by the reflective part 28, and can be sent back to the light guide plate 26, thereby further improving the light utilization efficiency.

The reflective part 28 can be made of other materials than the same material as the reflective sheet 29. Other materials for the reflective part 28 include a material that has a higher reflectivity (light reflectivity) than that of the material used for the frame 27, for example.

<Embodiment 13>

Figure 20:
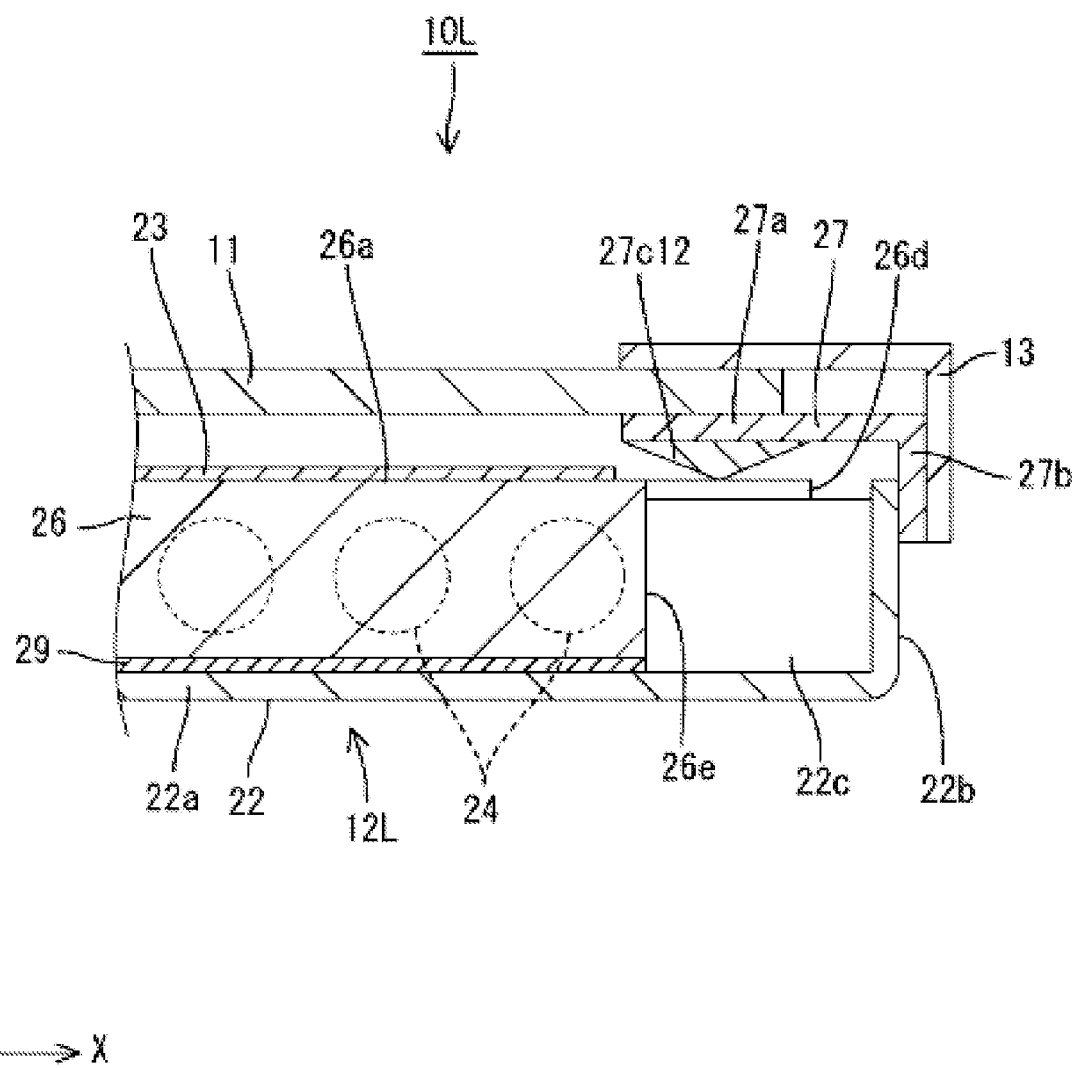
FIG. 20 is a cross-sectional view showing a part of a cross-sectional configuration of a liquid crystal display device of Embodiment 13 along the long side direction.

Next, Embodiment 13 will be explained with reference to FIG. 20 mainly. The basic configuration of a liquid crystal display device 10L of Embodiment 13 shown in FIG. 20 is similar to that of Embodiment 1. However, the present embodiment differs from Embodiment 1 in pressing parts 27c12 provided in the frame 27 of a backlight device 12L of the liquid crystal display device 10L. Specifically, an end face of each pressing part 27c12 is made narrower (smaller) than that of Embodiment 1. As shown in FIG. 20, the cross-sectional shape of the pressing part 27c12 is a triangular shape that gradually narrows from the base side (covering plate 27a side) toward the end (the width in the X axis direction gradually narrows). In other words, the pressing part 27c12 tapers off from the base side toward the end (light guide plate 26 side), and has a pointed shape as compared with that of Embodiment 1. The end of the pressing part 27c12 extends along the short side direction of the light guide plate 26.

When the front surface 26a (peripheral portion) of the light guide plate 26 that is exposed from a notch of the optical sheets 23 is pressed by the pressing part 27c12 having the tapered shape, the pressing part 27c12 makes contact with the front surface 26a of the light guide plate 26 along a line. In other words, a contact area of the pressing part 27c12 with the front surface 26a of the light guide plate 26 is made smaller. This reduces a friction between the light guide plate 26 and the pressing part 27c12. Therefore, in the liquid crystal display device 10L (and the backlight device 12L) of the present embodiment, it is possible to more effectively prevent noise and the like caused by a friction between the pressing parts 27c12 and the light guide plate 26, when the light guide plate 26 undergoes thermal expansion. The pressing part 27c12 may have one tapered tip as shown in FIG. 20, or may have two or more tips. In another embodiment, the pressing part 27c12 may be formed so as to be in contact with the front surface 26a of the light guide plate 26 at a point (circular cone shape, for example). Even with the pressing part 27c12 having such a shape, the friction between the pressing part 27c12 and the light guide plate 26 can be reduced.

<Embodiment 14>

Figure 21:
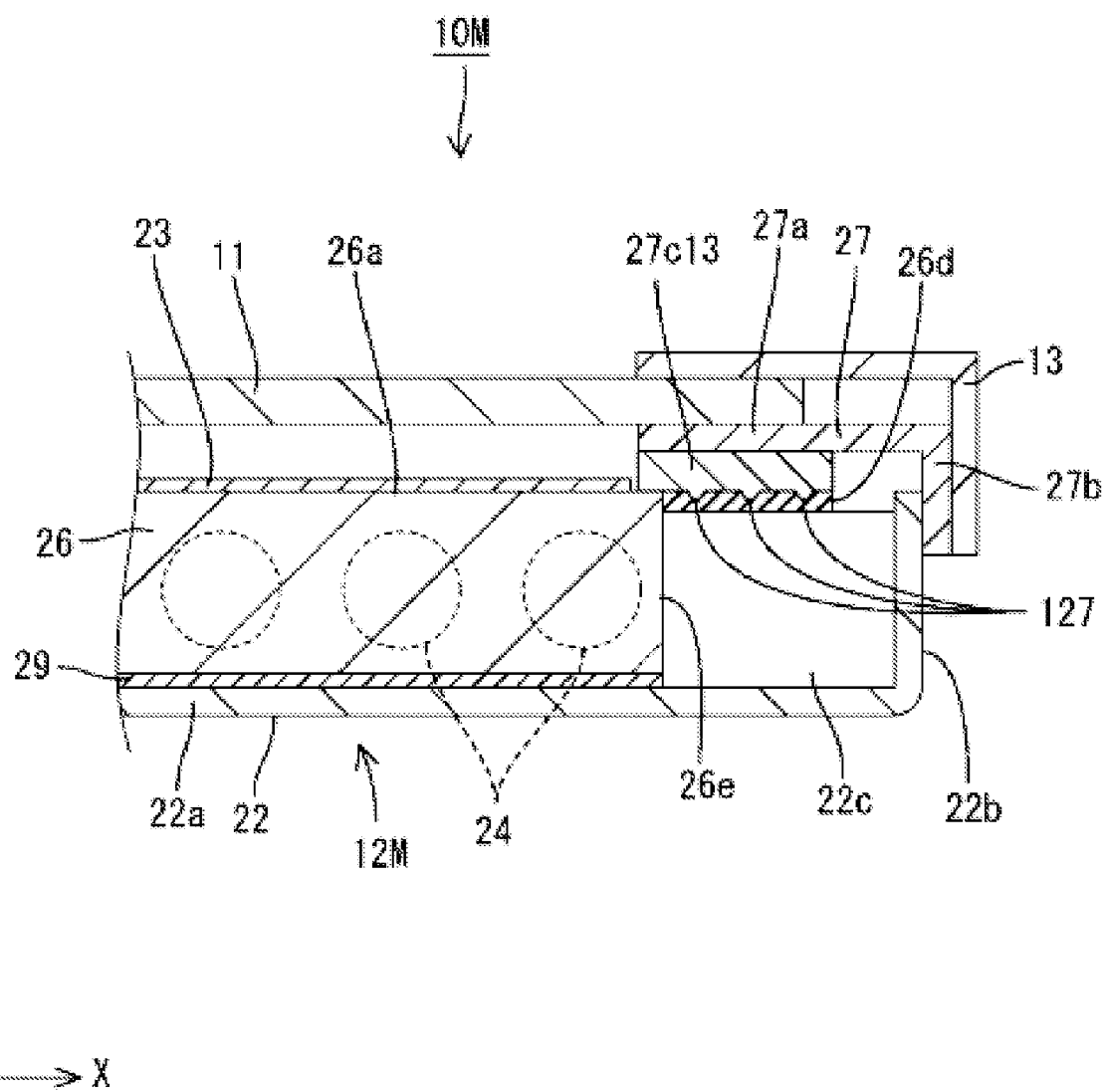
FIG. 21 is a cross-sectional view showing a part of a cross-sectional configuration of a liquid crystal display device of Embodiment 14 along the long side direction.

Next, Embodiment 14 will be explained with reference to FIG. 21 mainly. The basic configuration of a liquid crystal display device 10M of Embodiment 14 shown in FIG. 21 is similar to that of Embodiment 1. However, the present embodiment differs from Embodiment 1 in that grooves 127 are formed in the front surface 26a of the light guide plate 26 of a backlight device 12M of the liquid crystal display device 10M. The grooves 127 are formed in a portion (that is, a peripheral portion) that is pressed by a pressing part 27c13 attached to the frame 27, of the front surface 26a of the light guide plate 26. Three grooves 127 are formed along the short side direction (Y axis direction) of the light guide plate 26. The shape, size, and the like of the pressing part 27c13 are the same as those in Embodiment 1. As described above, if the grooves 127 are formed in the front surface 26a of the light guide plate 26, portions of the end part of the pressing part 27c13 come inside the grooves 127, thereby making the pressing part 27c13 and the grooves 127 engage each other. This makes it easier for the pressing part 27c13 to press the light guide plate 26 against the bottom plate 22a. Therefore, in the liquid crystal display device 10M (and the backlight device 12M) of the present embodiment, the light guide plate 26 can be held between the pressing part 27c13 and the bottom plate 22a with greater ease.

The portion of the light guide plate 26 that is pressed by the pressing part 27c13 is generally less susceptible to thermal expansion as compared with other portions. However, depending on the conditions of the LEDs 24, the light guide plate 26, and the like that are used in the device, the portion that is pressed by the pressing part 27c13 can slightly expand due to heat. However, if the grooves 127 are formed in the front surface 26a of the light guide plate 26 as in the present embodiment, when the light guide plate 26 undergoes thermal expansion, the portion of the light guide plate 26 that is pressed by the pressing part 27c13 can move smoothly along the short side direction (direction of thermal expansion), while being in friction with the pressing part 27c13. Similarly, when the light guide plate 26 cools down and shrinks back to the original size, the light guide plate 26 can move smoothly along the short side direction (direction of thermal expansion).

As shown in FIG. 21, the grooves 127 may be formed along the short side direction of the light guide plate 26, or as necessary, may be formed along the long side direction (X axis direction) of the light guide plate 26.

<Embodiment 15>

Figure 22:
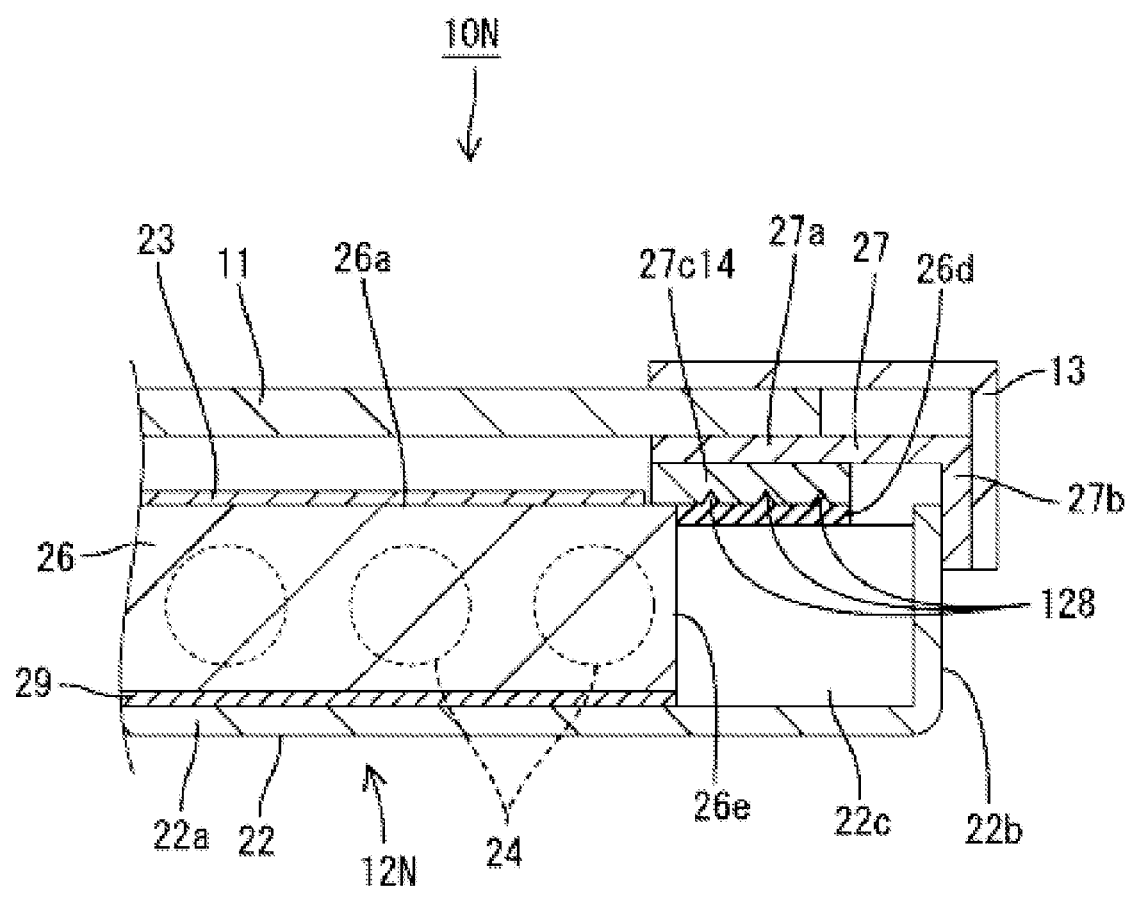
FIG. 22 is a cross-sectional view showing a part of a cross-sectional configuration of a liquid crystal display device of Embodiment 15 along the long side direction.

Next, Embodiment 15 will be explained with reference to FIG. 22 mainly. The basic configuration of a liquid crystal display device 10N of Embodiment 15 shown in FIG. 22 is similar to that of Embodiment 1. However, in the present embodiment, banks 128 that have a triangular cross section are formed on the front surface 26a of the light guide plate 26 of a backlight device 12N of the liquid crystal display device 10N. The banks 128 are formed in a portion (that is, a peripheral portion) that is pressed by a pressing part 27c14 attached to the frame 27, of the front surface 26a of the light guide plate 26. Three banks 128 are formed along the short side direction (Y axis direction) of the light guide plate 26. The shape, size, and the like of the pressing part 27c14 are the same as those in Embodiment 1. As described above, if the banks 128 are formed on the front surface 26a of the light guide plate 26, the banks 128 are pressed into the end surface of the pressing part 27c14, thereby making the two engage each other. This makes it easier for the pressing part 27c14 to press the light guide plate 26 against the bottom plate 22a. Therefore, in the liquid crystal display device 10N (and the backlight device 12N) of the present embodiment, the light guide plate 26 can be held between the pressing part 27c14 and the bottom plate 22a with greater ease.

Furthermore, if the banks 128 are formed on the front surface 26a of the light guide plate 26 as in the present embodiment, in a manner similar to Embodiment 14 above, when the light guide plate 26 undergoes thermal expansion, the portion of the light guide plate 26 that is pressed by the pressing part 27c14 can move smoothly along the short side direction (direction of thermal expansion), while being in friction with the pressing part 27c14. Similarly, when the light guide plate 26 cools down and shrinks back to the original size, the light guide plate 26 can move smoothly along the short side direction (direction of thermal expansion).

The cross-sectional shape of the banks 128 may be a triangular shape as shown in FIG. 22, or may be other shapes such as a quadrangular shape. The banks 128 may be formed along the long side direction (X axis direction) of the light guide plate 26 as necessary.

<Other Embodiments>

The present invention is not limited to the embodiments shown in the drawings and described above, and the following embodiments are also included in the technical scope of the present invention, for example.

(1) In the respective embodiments above, the light source units were disposed to face the two end faces on the long sides of the light guide plate 26, respectively, but in other embodiments, a light source unit may be disposed to face only one end face, for example.

(2) In the respective embodiments above, the plate-shaped member that has an even thickness was used as the light guide plate, but the present invention is not limited to such. In other embodiments, a plate-shaped member that gradually becomes thinner from one second end face toward the other second end face may be used as the light guide plate, for example. Thus, a plate-shaped member with a cross-sectional shape (first end face) being a so-called wedge shape may also be used as the light guide plate, for example. In other words, a plate-shaped member with the thickness (width) thereof at the other second end face being very small and having a cross-sectional shape of a wedge shape with a pointed end (shape of the first end face) may be used as the light guide plate. When the above-mentioned plate-shaped member in which the thickness thereof gradually becomes smaller from one second end face toward the other second end face is used as the light guide plate, the light guide plate may be disposed such that the surface (light output surface) is parallel to the liquid crystal panel, or may be disposed such that the surface is inclined relative to the liquid crystal panel.

(3) In the respective embodiments above, the optical sheets include a diffusion sheet, a lens sheet, and a reflective polarizing sheet layered in this order, but in other embodiments, a configuration other than this may be used.

(4) In the respective embodiments above, the pressing part was made of an elastic material, but in other embodiments, the pressing part may be formed of the same material as the frame, which is made of a synthetic resin, for example.

Figure 23:
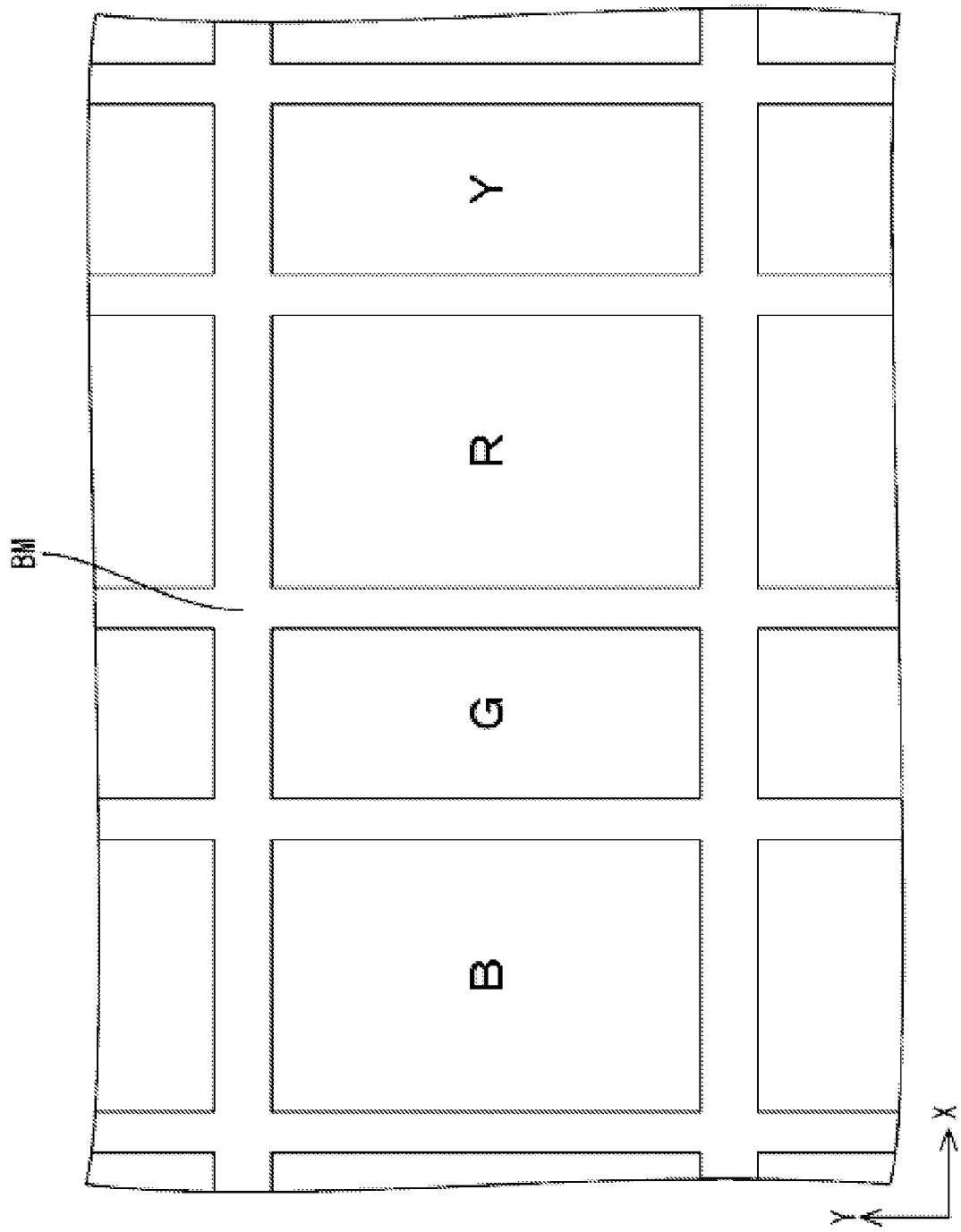
FIG. 23 is a magnified plan view showing a plan view configuration of a CF substrate according to Embodiment 16 of the present invention.

(5) Besides the respective embodiments above, the order of the respective colored portions R, G, B, and Y of the color filters may be appropriately modified, and as shown in FIG. 23, for example, a configuration in which the blue colored portion B, the green colored portion G, the red colored portion R, and the yellow colored portion Y are aligned in this order from the left side of the figure in the X axis direction is also included in the present invention.

Figure 24:
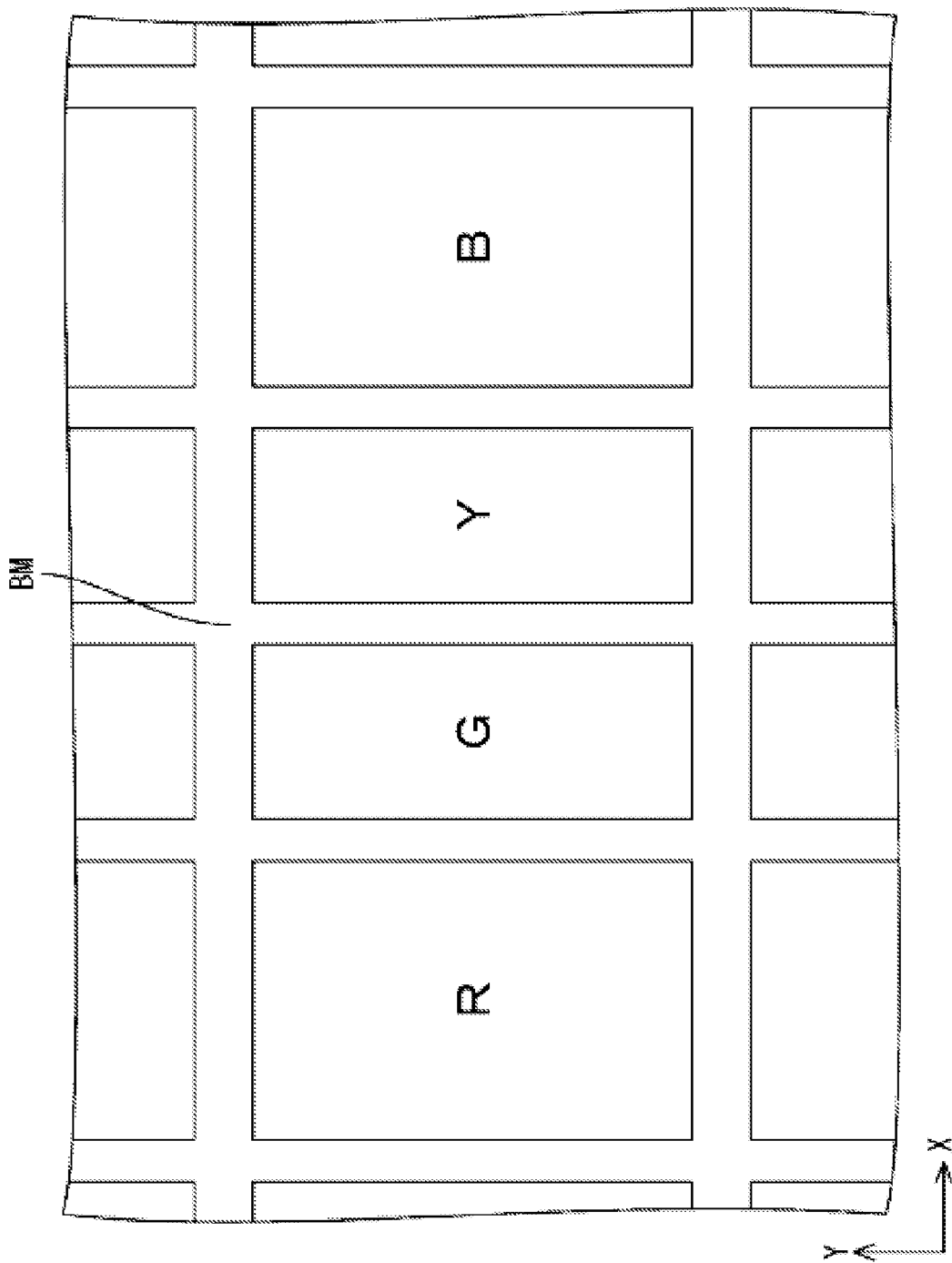
FIG. 24 is a magnified plan view showing a plan view configuration of a CF substrate according to Embodiment 17 of the present invention.

(6) Besides the configuration of (5) above, as shown in FIG. 24, for example, a configuration in which the respective colored portions R, G, B, and Y of the color filters are aligned in the order of the red colored portion R, the green colored portion G, the yellow colored portion Y, and the blue colored portion B from the left side of the figure in the X axis direction is also included in the present invention.

Figure 25:
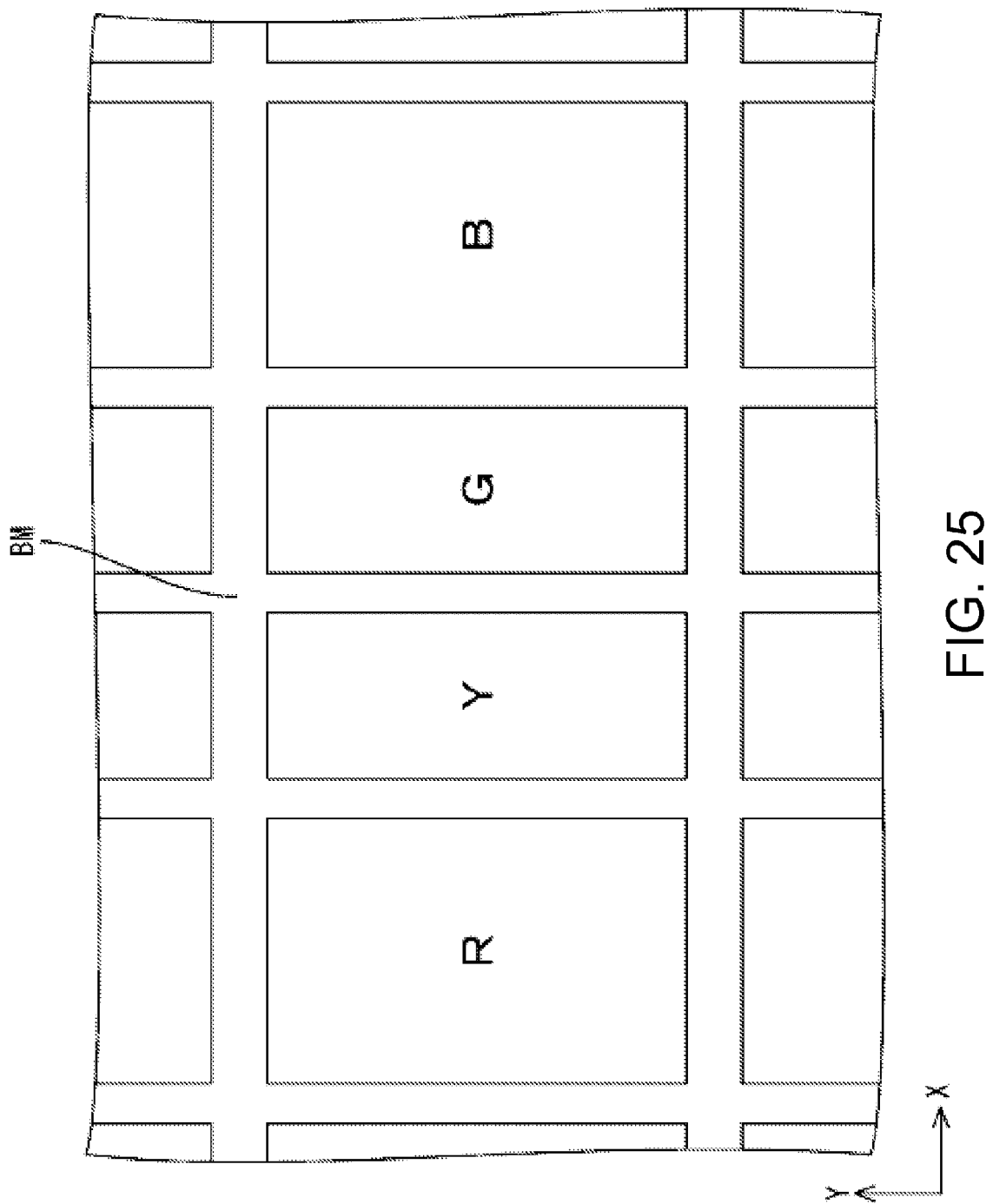
FIG. 25 is a magnified plan view showing a plan view configuration of a CF substrate according to Embodiment 18 of the present invention.

(7) Besides the configurations of (5) and (6) above, as shown in FIG. 25, for example, a configuration in which the respective colored portions R, G, B, and Y of the color filters are aligned in the order of the red colored portion R, the yellow colored portion Y, the green colored portion G, and the blue colored portion B from the left side of the figure in the X axis direction is also included in the present invention.

Figure 26:
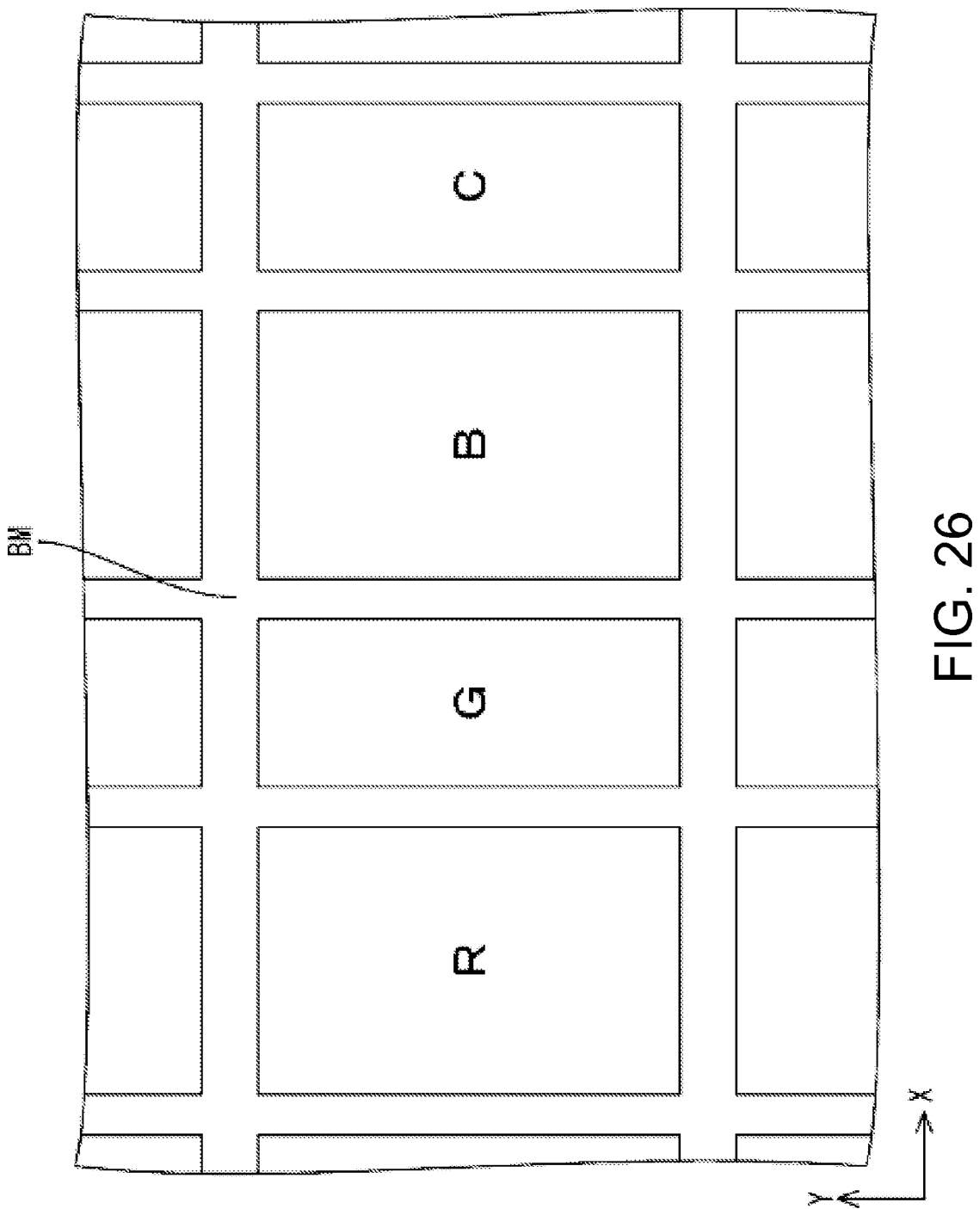
FIG. 26 is a magnified plan view showing a plan view configuration of a CF substrate according to Embodiment 19 of the present invention.

(8) In the respective embodiments above, the colored portions of the color filters were configured to have yellow (Y), in addition to red (R), green (G), blue (B), which are the three primary colors of light, but as shown in FIG. 26, it is also possible to add cyan colored portions C, instead of the yellow colored portions.

Figure 27:
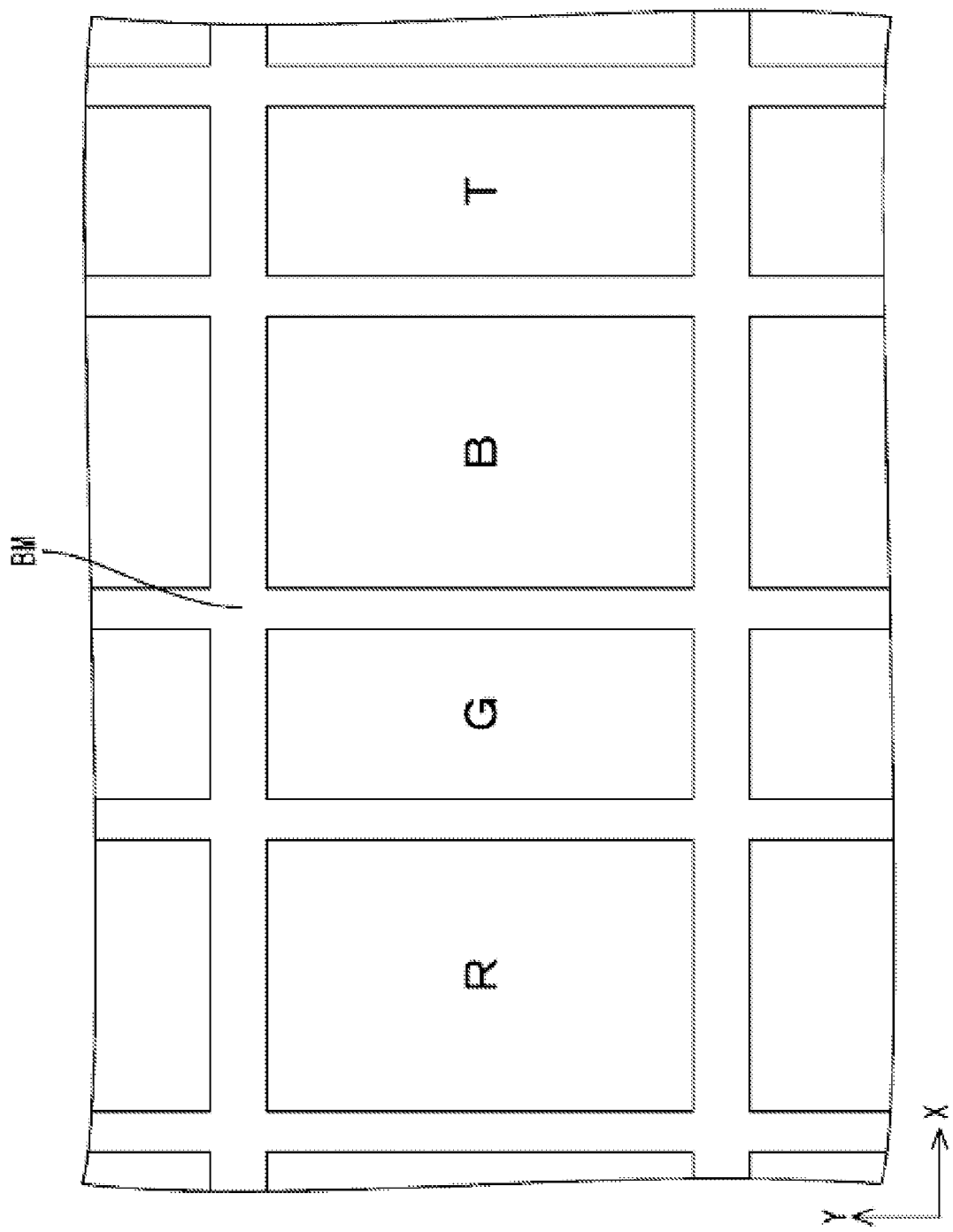
FIG. 27 is a magnified plan view showing a plan view configuration of a CF substrate according to Embodiment 20 of the present invention.

(9) In the respective embodiments above, the colored portions of the color filters had four colors, but as shown in FIG. 27, it is also possible to dispose transmissive portions T that do not color the transmitted light, in place of the yellow colored portions. The transmissive portions T transmit the entire wavelength of at least visible light in an equal manner, and thus do not color the transmitted light to a specific color.

Figure 28:
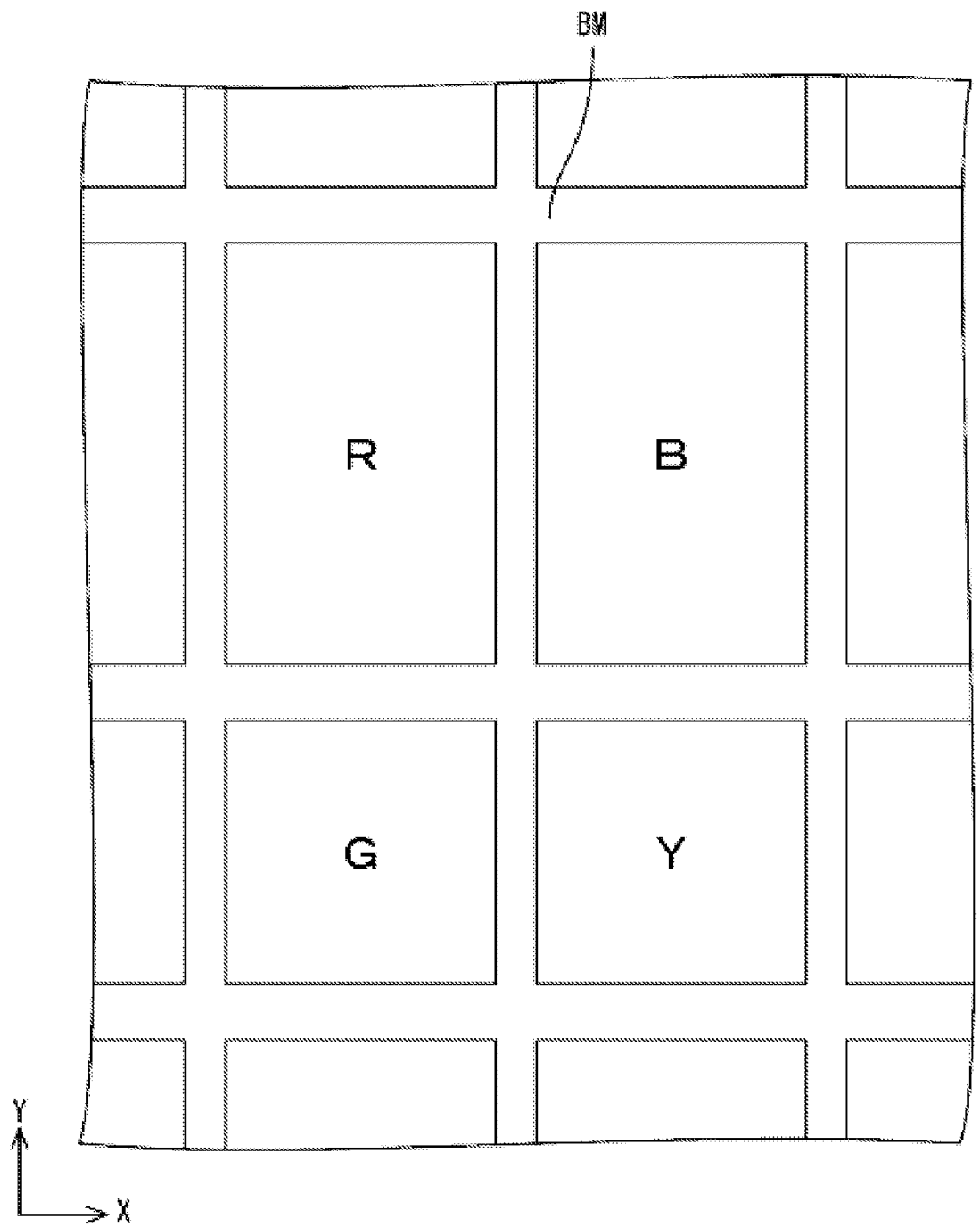
FIG. 28 is a magnified plan view showing a plan view configuration of a CF substrate according to Embodiment 21 of the present invention.

(10) In the respective embodiments above, the configuration in which the colored portions of four colors R, G, B, and Y that constitute the color filters are arranged along the row direction was described as an example, but it is also possible to arrange the colored portions of four colors R, G, B, and Y in the row and column directions. Specifically, as shown in FIG. 28, the colored portions of four colors R, G, B, and Y are arranged in a matrix with the X direction being the row direction and the Y direction being the column direction, and while the dimension of the respective colored portions R, G, B, and Y in the row direction (X axis direction) is the same, the colored portions R, G, B, and Y that are disposed in adjacent rows have different dimensions in the column direction (Y axis direction) from each other. In the row with the relatively large column direction size, the red colored portion R and the blue colored portion B are disposed adjacent to each other along the row direction, and in the row with the relatively small column direction size, the green colored portion G and the yellow colored portion Y are disposed adjacent to each other along the row direction. That is, in a first row with the relatively large column direction dimension, the red colored portions R and the blue colored portions B are alternately arranged in the row direction, and in a second row with the relatively small column direction dimension, the green colored portions G and the yellow colored portions Y are alternately arranged in the row direction, and the first row and the second row are alternately and repeatedly arranged in the column direction. Accordingly, the area of the red colored portion R and the blue colored portion B is larger than the area of the green colored portion G and the yellow colored portion Y. The green colored portion G is disposed adjacent to the red colored portion R in the column direction, and the yellow colored portion Y is disposed adjacent to the blue colored portion B in the column direction.

Figure 29:
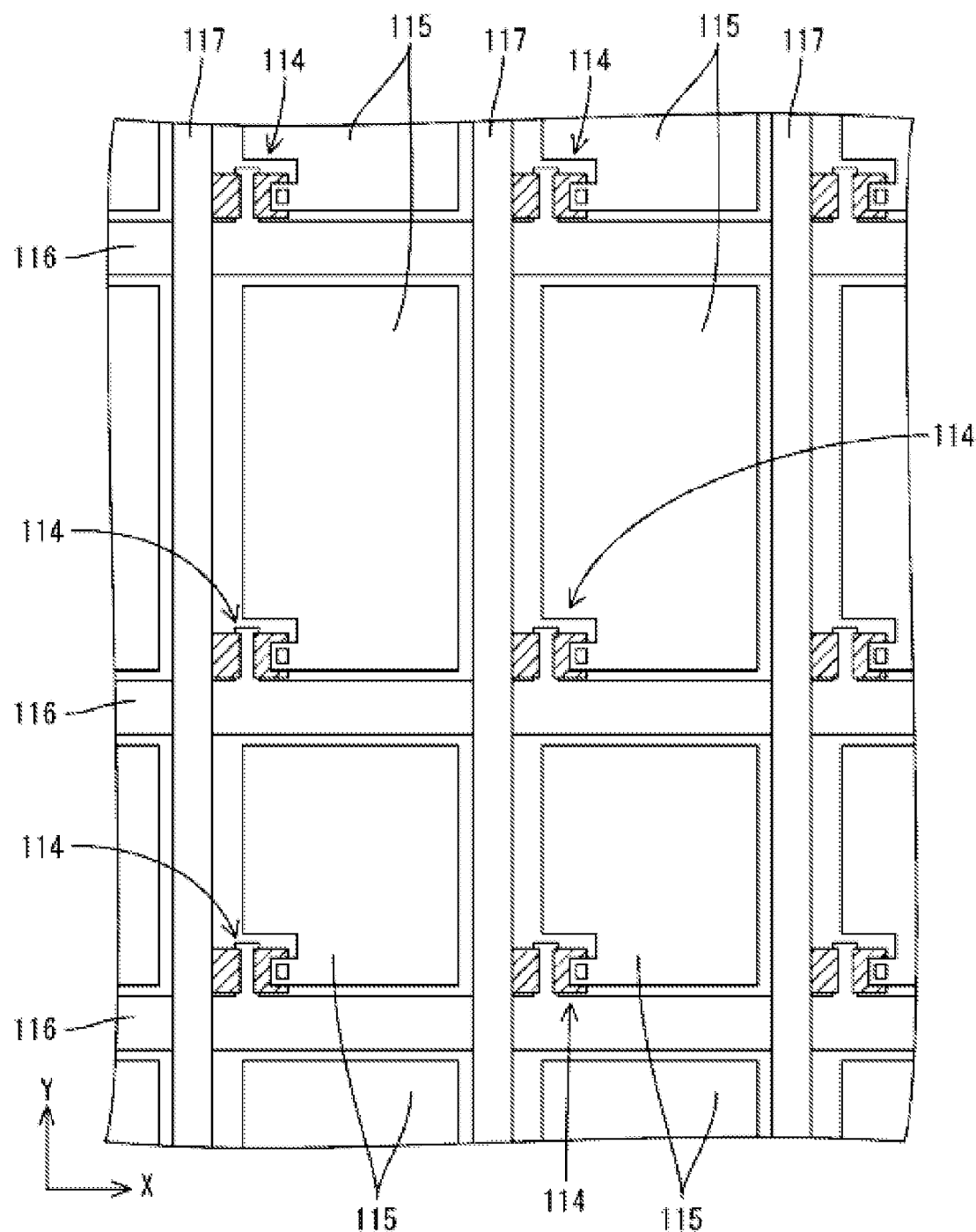
FIG. 29 is a magnified plan view showing a plan view configuration of an array substrate according to Embodiment 21 of the present invention.

Because of the above-mentioned configuration of the color filters, as shown in FIG. 29, the array substrate is configured such that respective pixel electrodes 115 disposed in adjacent rows have different column direction dimensions from each other. That is, the area of pixel electrodes 115 that respectively face the red colored portions R and the blue colored portions B is larger than the area of pixel electrodes 115 that respectively face the yellow colored portions Y and the green colored portions G. The film thicknesses of the respective colored portions R, G, B, and Y are the same as each other. Also, while source wiring lines 117 are all disposed with the same pitch, gate wiring lines 116 are disposed at two different pitches in accordance with the column direction dimensions of the pixel electrodes 115. FIGS. 28 and 29 show a case in which the area of the red colored portions R and the blue colored portions B is approximately 1.6 times larger than the area of the yellow colored portions Y and the green colored portions G.

Figure 30:
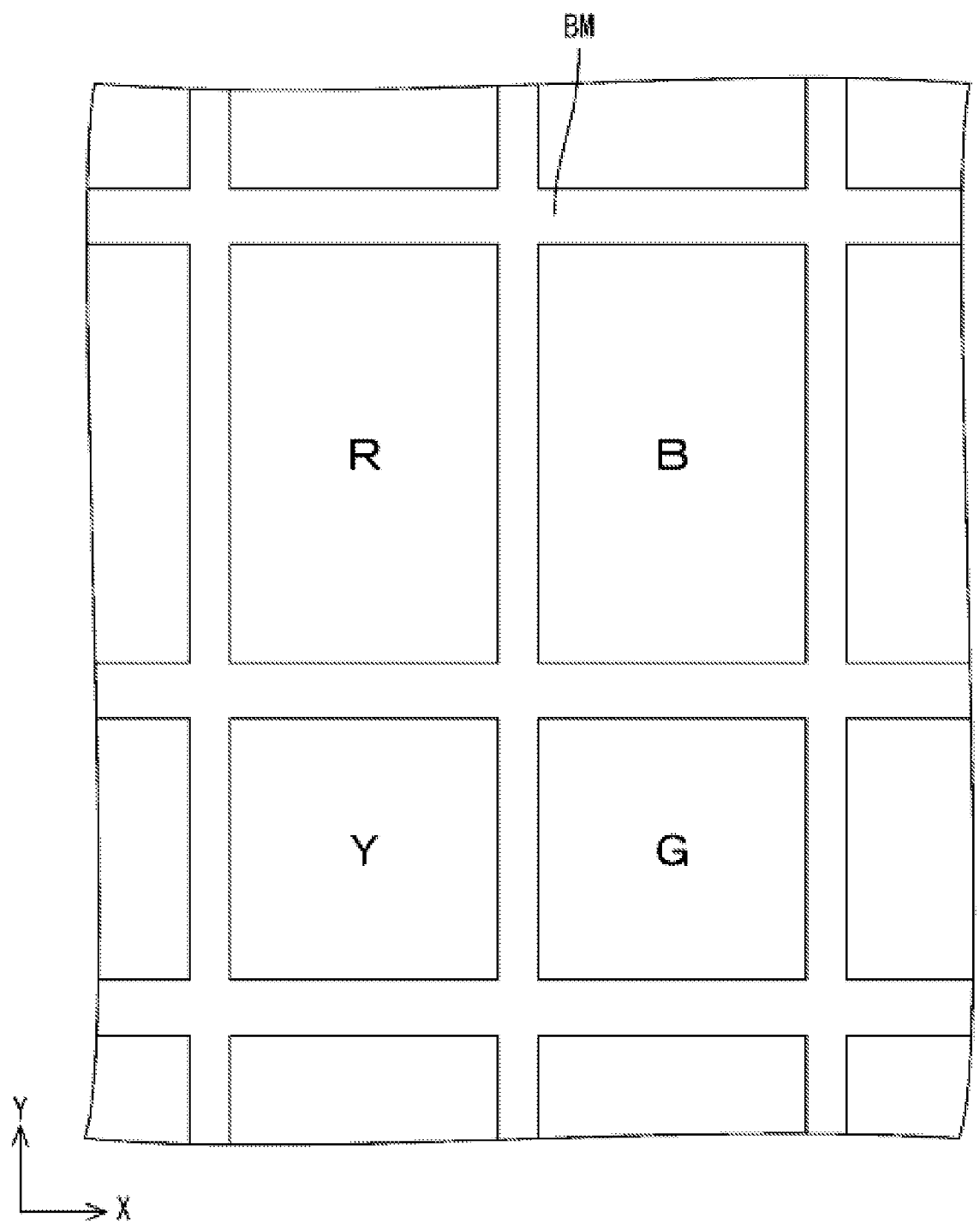
FIG. 30 is a magnified plan view showing a plan view configuration of a CF substrate according to Embodiment 22 of the present invention.

(11) As another modification example of the above-mentioned (10), as shown in FIG. 30, it is also possible to employ a configuration in which the yellow colored portion Y is disposed adjacent to the red colored portions R in the column direction, and the green colored portion G is disposed adjacent to the blue colored portion B in the column direction.

Figure 31:
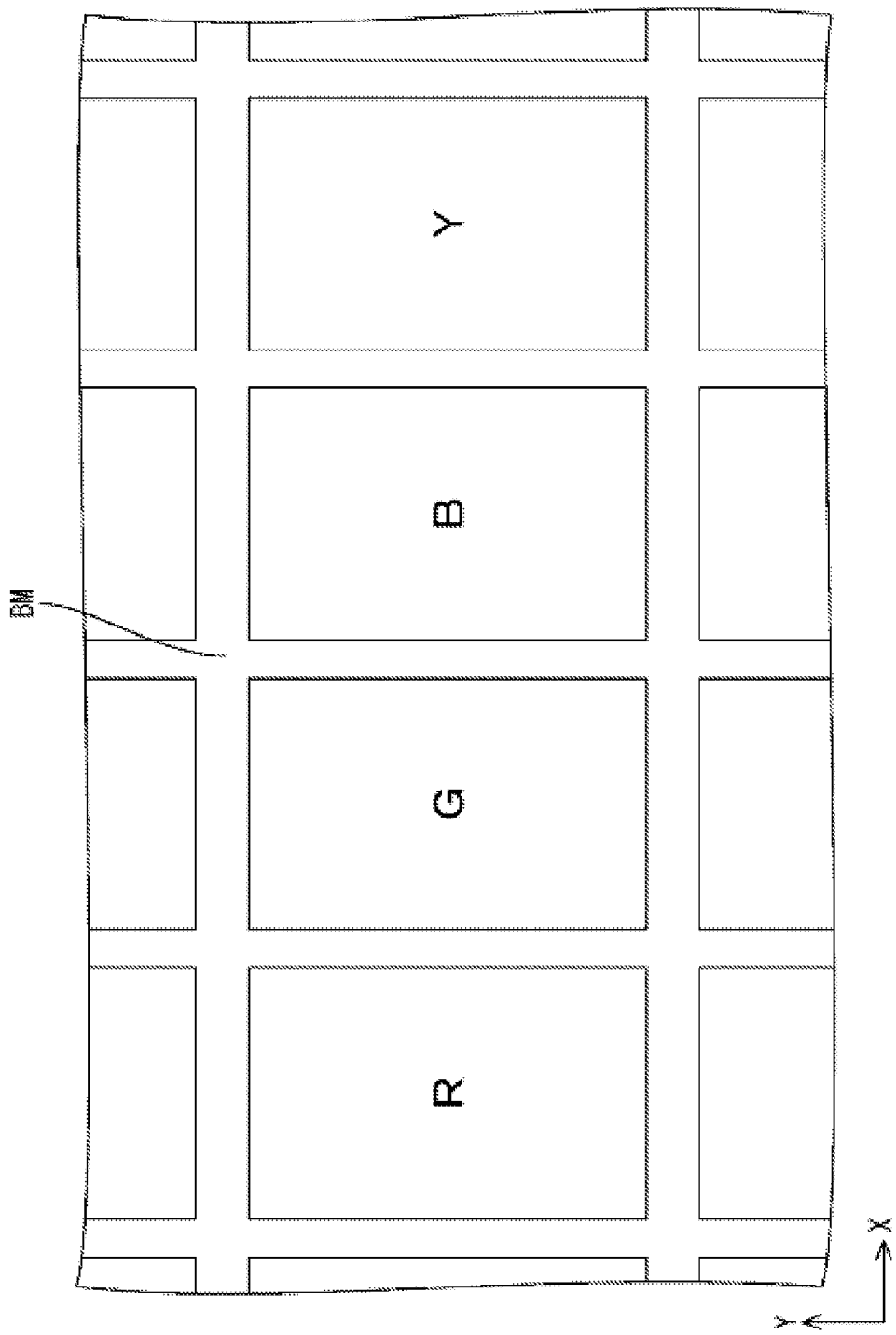
FIG. 31 is a magnified plan view showing a plan view configuration of a CF substrate according to Embodiment 23 of the present invention.
Figure 32:
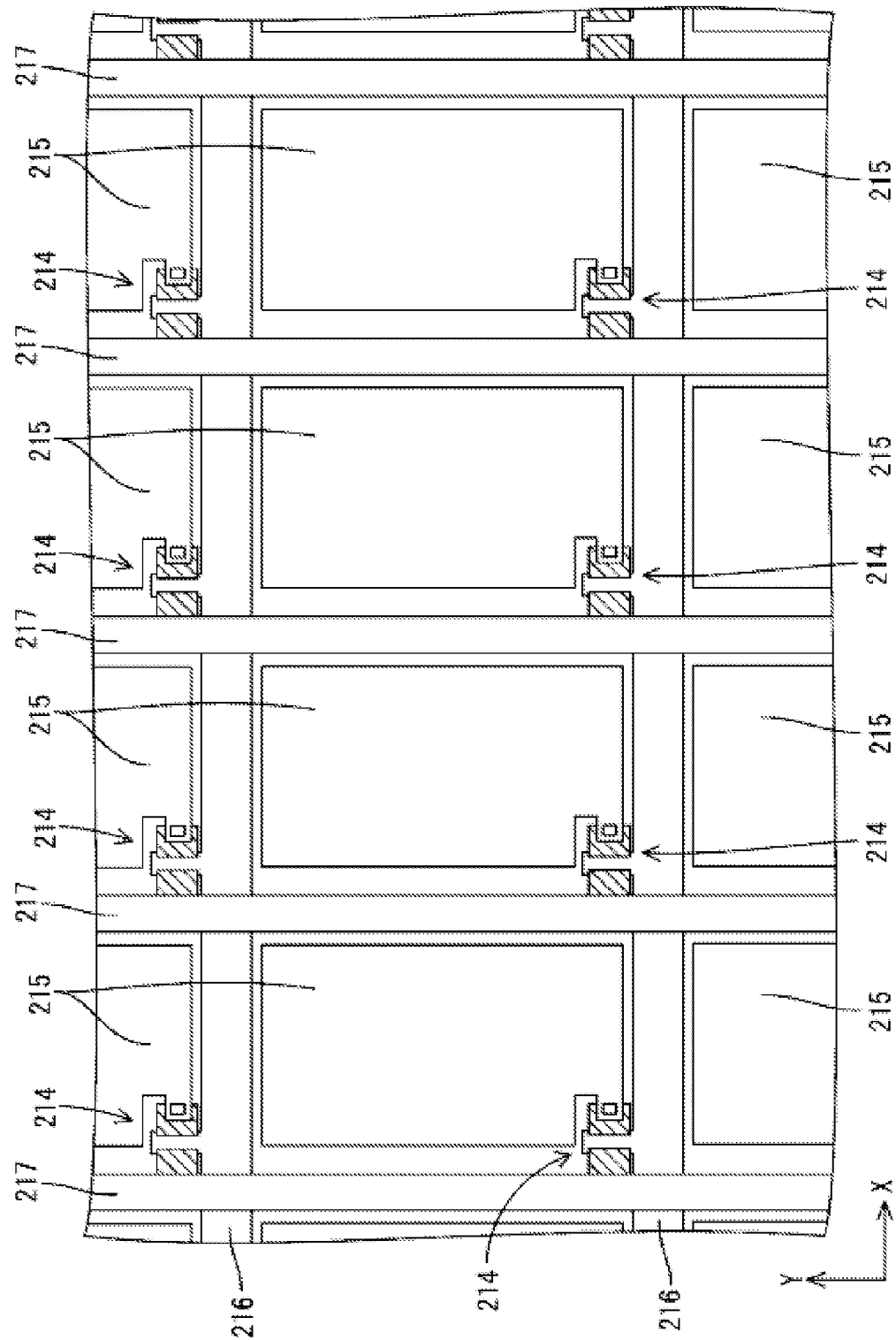
FIG. 32 is a magnified plan view showing a plan view configuration of an array substrate according to Embodiment 23 of the present invention.

(12) In the respective embodiments above, the configuration in which the areas of the respective colored portions R, G, B, and Y that constitute the color filters were different from each other was described as an example, but it is also possible to configure the respective colored portions R, G, B, and Y such that the area thereof is the same as each other. Specifically, as shown in FIG. 31, the respective colored portions R, G, B, and Y are arranged in a matrix with the X axis direction being the row direction and the Y axis direction being the column direction, and the size in the row direction (X axis direction) and the size in the column direction (Y axis direction) of the respective colored portions R, G, B, and Y are the same as each other. Accordingly, the area of the respective colored portions R, G, B, and Y is the same as each other. Because of the above-mentioned configuration of the color filters, as shown in FIG. 32, the array substrate is configured such that respective pixel electrodes 215 that face the respective colored portions R, G, B, and Y have the same dimensions in the row direction and in the column direction, thereby making all of the pixel electrodes 215 have the same shape and the same area. Also, gate wiring lines 216 and source wiring lines 217 are respectively disposed at the same pitch.

(13) In the above-mentioned configuration (12), it is also possible to arrange the respective colored portions R, G, B, and Y in a manner similar to the above-mentioned configurations (5) to (7).

(14) It is also possible to apply the configurations described in (8) and (9) to the configurations described in (10) and (12), respectively.

Figure 33:
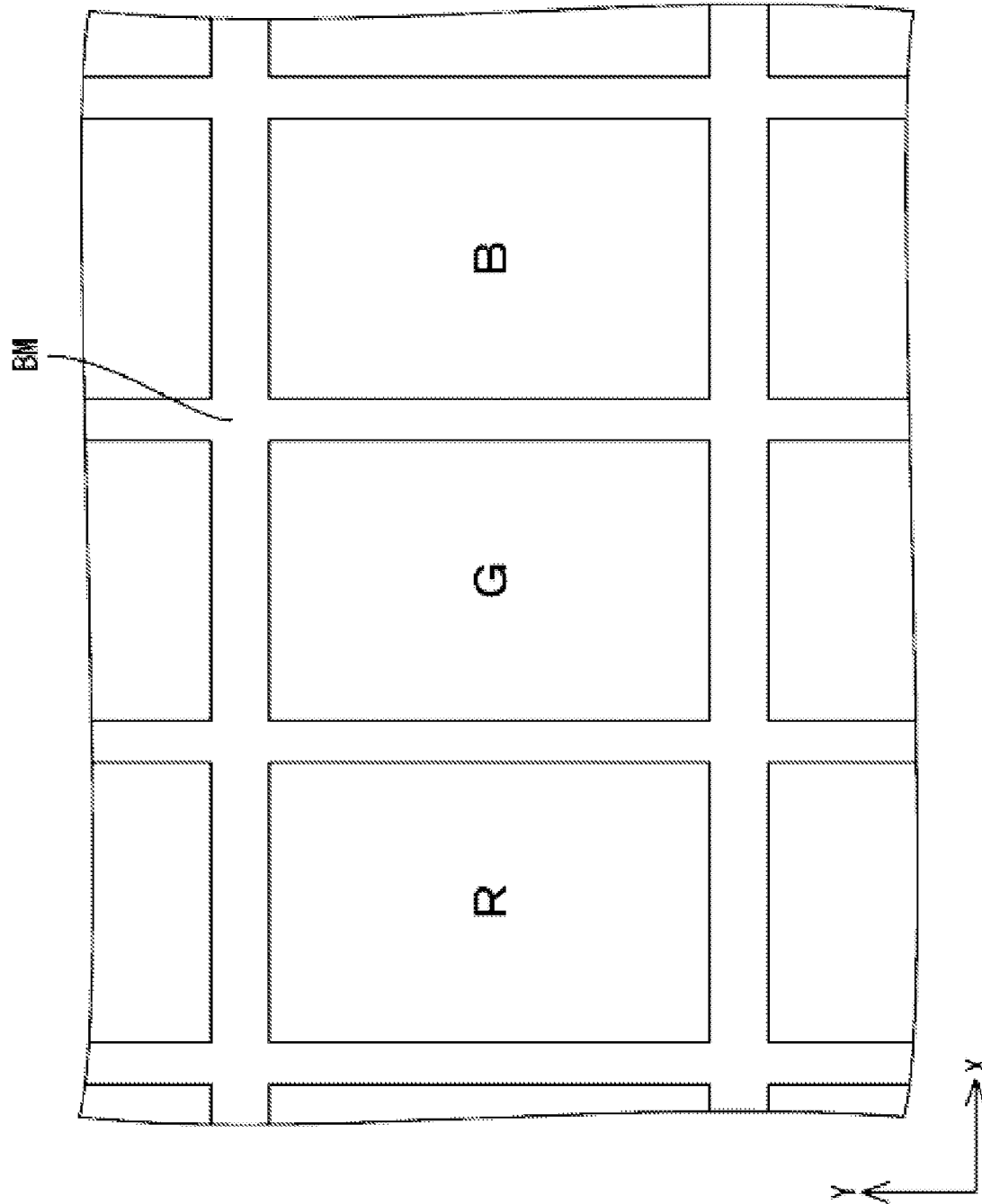
FIG. 33 is a magnified plan view showing a plan view configuration of a CF substrate according to Embodiment 24 of the present invention.

(15) In the respective embodiments above, the colored portions of the color filters had four colors, but as shown in FIG. 33, it is also possible to have only red (R), green (G), and blue (B), which are the three primary colors of light, omitting the yellow colored portions. In such a case, it is preferable that the area of the respective colored portions R, G, and B be the same as each other.

Figure 34:
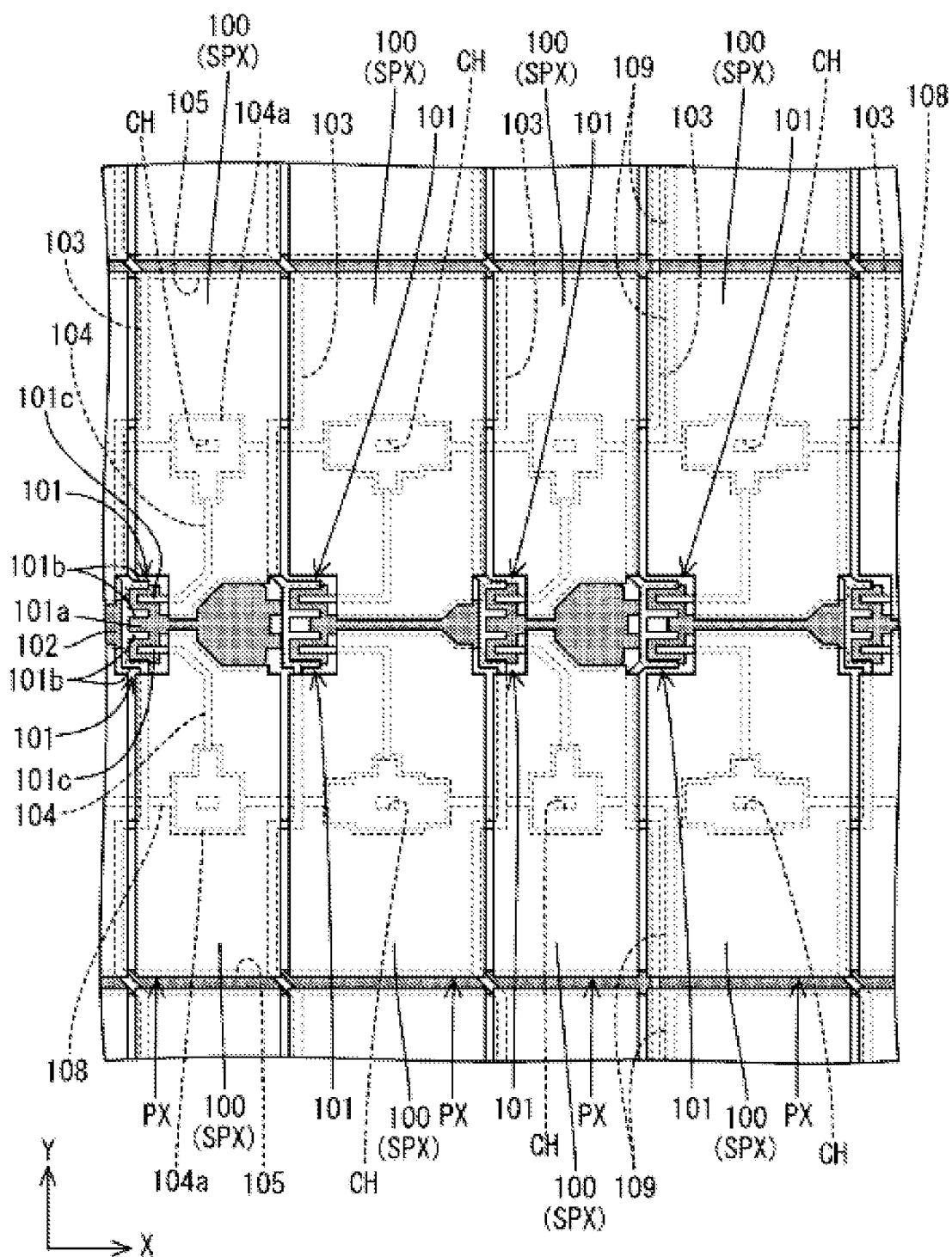
FIG. 34 is a magnified plan view showing a plan view configuration of an array substrate according to Embodiment 25 of the present invention.

(16) In the respective embodiments above, the configuration of the pixels was described with reference to simplified figures (FIGS. 4 and 5), but in addition to the configuration disclosed in these figures, the specific configuration of the pixels can be modified. For example, the present invention can also be applied to the configuration that conducts so-called multi-pixel driving in which each pixel is divided into a plurality of subpixels, and these subpixels are driven such that gradation values thereof are made different from each other. As shown in FIG. 34, in the specific configuration thereof, one pixel PX is constituted of a pair of subpixels SPX, and the pair of subpixels SPX are constituted of a pair of pixel electrodes 100 adjacent to each other across a gate wiring line 102. On the other hand, on the gate wiring line 102, a pair of TFTs 101 is formed for the pair of pixel electrodes 100. Each TFT 101 includes a gate electrode 101a made of a part of the gate wiring line 102; a source electrode 101b made of a pair of branching lines branching out from the source wiring line 103 and disposed on the gate electrode 101a; and a drain electrode 101c disposed on the gate electrode 101a and arranged between the pair of source electrodes 101b. The pair of TFTs 101 is arranged on the gate wiring line 102 along the direction in which the pair of subpixels SPX constituting one pixel PX are arranged (Y axis direction). The drain wiring line 104 has, at one end thereof, a contact portion 104a connected to the pixel electrode 100, and the other end of the drain wiring line 104 is connected to the drain electrode 101c of the TFT 101. The contact portion 104a and the pixel electrode 100 are connected via a contact hole CH formed in an interlayer insulating film (not shown) interposed therebetween, with both the contact portion 104a and the pixel electrode 100 being at the same potential. On the other hand, at the pair of the pixel electrodes 100, an auxiliary capacitance wiring line 105 is disposed at an end of each pixel electrode on the side opposite to the gate wiring line 102 so as to overlap each pixel electrode in a plan view, and the auxiliary capacitance wiring line 105 forms a capacitance with the corresponding pixel electrode 100. In other words, the respective two pixel electrodes 100 that constitute one pixel PX form capacitance with the different auxiliary capacitance wiring lines 105, respectively. In addition, between the gate wiring line 102 and each auxiliary capacitance wiring line 105, an in-pixel auxiliary capacitance wiring line 108 is respectively formed so as to be parallel to the gate wiring line 102 and the auxiliary capacitance wiring line 105 and so as to be formed across the respective pixel electrodes 100 and the respective contact portions 104a. The respective in-pixel auxiliary capacitance wiring lines 108 are connected to the respective auxiliary capacitance wiring lines 105 disposed opposite to the gate wiring lines 102 through connecting wiring lines 109, and thus, the in-pixel auxiliary capacitance wiring lines 108 are at the same potential as the respective auxiliary capacitance wiring lines 105. Therefore, the in-pixel auxiliary capacitance wiring lines 108, which are at the same potential as the auxiliary capacitance wiring lines 105, form capacitance with the respective contact portions 104a, which respectively overlap the in-pixel auxiliary capacitance wiring lines 108 in a plan view and are at the same potential as the pixel electrodes 100. During the driving, the pair of TFTs 101 is supplied with a scan signal and a data signal from the common gate wiring line 102 and source wiring line 103, respectively, while the respective auxiliary capacitance wiring lines 105 and the respective in-pixel auxiliary capacitance wiring lines 108 that respectively overlap the two pixel electrodes 100 and the two contact portions 104a connected thereto are applied with signals (potentials) that differ from each other, thereby allowing the voltage values charged into the respective subpixels SPX, or in other words, the gradation values, to be made to differ from each other. With this configuration, it is possible to conduct so-called multi-pixel driving, and it is possible to have excellent viewing angle characteristics.

Figure 35:
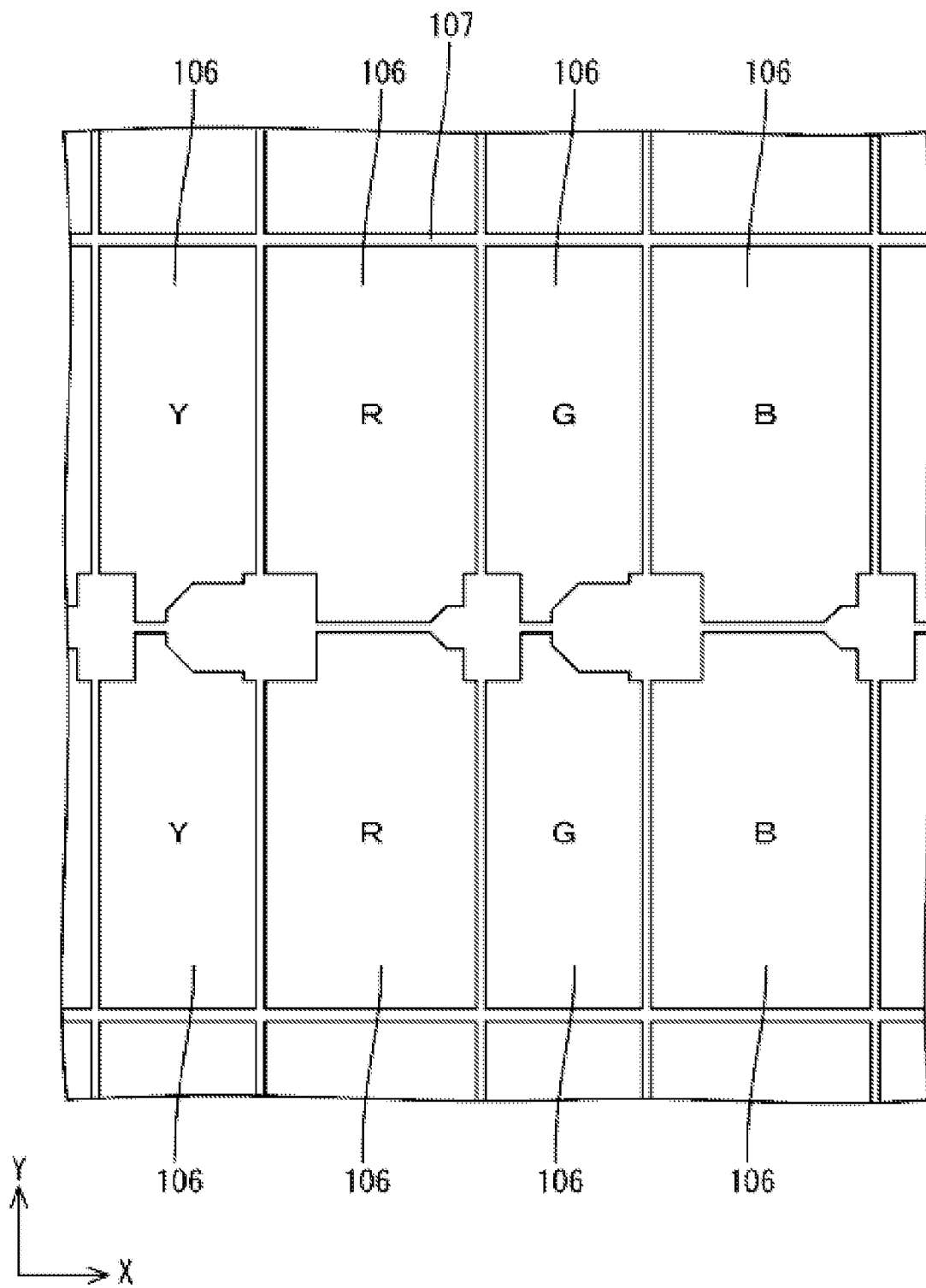
FIG. 35 is a magnified plan view showing a plan view configuration of a CF substrate according to Embodiment 25 of the present invention.

In the pixel configuration for conducting the above-mentioned multi-pixel driving, the respective pixel electrodes 100 and the respective colored portions R, G, B, and Y in color filters 106, which face the respective pixel electrodes 100, have the following configuration. That is, as shown in FIG. 35, the color filters 106 are constituted of the colored portions of four colors R, G, B, and Y, and the yellow colored portion Y, the red colored portion R, the green colored portion G, and the blue colored portion B are repeatedly arranged in a row in this order from the left side of the figure along the X axis direction. The respective colored portions R, G, B, and Y are divided by a light-shielding layer (black matrix) 107, and the light-shielding layer 107 is arranged in a substantially grid pattern, overlapping the gate wiring lines 102, the source wiring lines 103, and the auxiliary capacitance wiring lines 105 in a plan view. Among the respective colored portions R, G, B, and Y, while the yellow colored portions Y and the green colored portions G have substantially the same dimension as each other with respect to the X axis direction (direction in which the colored portions R, G, B, and Y are arranged), the dimension of the red colored portions R and the blue colored portions B along the X axis direction is relatively large compared to that of the yellow colored portions Y and the green colored portions G (approximately 1.3 times to 1.4 times larger, for example). More specifically, the dimension of the red colored portions R along the X axis direction is slightly larger than the dimension of the blue colored portions B. As shown in FIG. 34, the respective pixel electrodes 100 have substantially the same size as each other with respect to the Y axis direction, but with respect to the X axis direction, the pixel electrodes 100 have the sizes that respectively correspond to the sizes of the colored portions R, G, B, and Y of the color filters 106 that face the respective pixel electrodes 100.

Description of Reference Characters

10 liquid crystal display device (display device)
    11 liquid crystal panel (display panel)
    12, 12A, 12B, 12C, 12D, 12E, 12F, 12G backlight device (illumination device)
    13 bezel
    TFT
    22 chassis (housing member)
    22a bottom plate
    22b side wall
    22c protrusion
    23, 23A, 23B, 23C, 23D, 23E, 23F, 23G optical sheet
    123, 123A, 123B, 123C, 123D, 123E1, 123E2, 123F1, 123F2 notch
    24 LED (light source)
    25 LED substrate (light source substrate)
    2 light source unit
    26 light guide plate
    26a front surface
    26b second end face
    26c rear surface
    26d first end face
    126 projection
    27 frame
    27a covering plate
    27b outer wall
    27c pressing part
    29 reflective sheet
    S0, S1, S2, S3, S4, S5, S6, S7 peripheral portion (pressed portion)

The invention claimed is:

1. An illumination device, comprising:
a housing member that has a bottom plate, side walls that rise from the bottom plate, and a pair of protrusions disposed on inner sides of the side walls, the pair of protrusions protruding from a plate surface of the bottom plate to face each other;
a light guide plate that is a plate-shaped member having a pair of first end faces extending in one direction, and a pair of second end faces extending in a direction perpendicular to the first end faces, the light guide plate having, on the respective first end faces, a pair of recesses recessed inwardly from the respective end faces, the light guide plate being disposed inside the side walls such that a rear surface thereof faces the bottom plate and such that the respective protrusions engage the respective recesses;
a light source unit having light sources and a light source substrate on which the light sources are mounted, the light source unit being disposed in the housing member such that the light sources face at least one of the second end faces of the light guide plate; and
a frame having a frame-shaped covering plate that covers outer edges of a plate surface of the light guide plate, the frame further having pressing parts that extend downward from the covering plate so as to selectively press areas on the plate surface of the light guide plate around the recesses.

2. The illumination device according to claim 1, further comprising an optical sheet disposed on a front side of the light guide plate, the optical sheet having notches or holes at side edges for exposing the respective areas around the recesses.

3. An illumination device, comprising:
a housing member that has a bottom plate, side walls that rise from the bottom plate, and a pair of protrusions disposed on inner sides of the side walls, the pair of protrusions protruding from a plate surface of the bottom plate to face each other, the pair of protrusions respectively having recessed surfaces that face each other;
a light guide plate that is a plate-shaped member having a pair of first end faces extending in one direction, and a pair of second end faces extending in a direction perpendicular to the first end faces, the light guide plate having, on the respective first end faces, a pair of projections projecting outwardly from the respective end faces, the light guide plate being disposed inside the side walls such that a rear surface thereof faces the bottom plate and such that the respective projections engage the recessed surfaces of the protrusions;
a light source unit having light sources and a light source substrate on which the light sources are mounted, the light source unit being disposed in the housing member such that the light sources face at least one of the second end faces of the light guide plate; and
a frame having a frame-shaped covering plate that covers outer edges of a plate surface of the light guide plate, the frame further having pressing parts that extend downward from the covering plate so as to selectively press respective surfaces of the projections.

4. The illumination device according to claim 3, further comprising an optical sheet disposed on a front side of the light guide plate, the optical sheet covering a surface of the light guide plate so as to expose the respective surfaces of the projections.

5. The illumination device according to claim 1, wherein the pressing parts are each in contact with the plate surface of the light guide plate along a line or at a point.

6. The illumination device according to claim 1, wherein the pressing parts are each formed so as to become narrower from the covering plate toward the light guide plate.

7. The illumination device according to claim 1, wherein a portion of the plate surface pressed by each of the pressing members has a groove or a bank.

8. The illumination device according to claim 1, wherein the pressing parts each have a reflective part on an end thereof.

9. The illumination device according to claim 8, wherein a reflectivity of the reflective part is set higher than a reflectivity of the frame.

10. The illumination device according to claim 1, wherein the frame has outer walls that extend downward from outer edges of the covering plate, the outer walls being fixed to the side walls such that the light guide plate is pressed against the bottom plate by the pressing parts.

11. The illumination device according to claim 1, wherein the pressing parts are made of an elastic material.

12. A display device, comprising a display panel that conducts display by using light from the illumination device according to claim 1.

13. The display device according to claim 12, wherein the display panel is a liquid crystal panel that uses liquid crystal.

14. A television receiver, comprising the display device according to claim 12.

15. The illumination device according to claim 3, wherein the pressing parts are each in contact with the plate surface of the light guide plate along a line or at a point.

16. The illumination device according to claim 3, wherein the pressing parts are formed so as to become narrower from the covering plate toward the light guide plate.

17. The illumination device according to claim 3, wherein the plate surface pressed by each of the pressing members has a groove or a bank.

18. The illumination device according to claim 3, wherein the pressing parts each have a reflective part on an end thereof.

19. The illumination device according to claim 18, wherein a reflectivity of the reflective part is set higher than a reflectivity of the frame.

20. The illumination device according to claim 3, wherein the frame has outer walls that extend downward from outer edges of the covering plate, the outer walls being fixed to the side walls such that the light guide plate is pressed against the bottom plate by the pressing parts.

21. The illumination device according to claim 3, wherein the pressing parts are made of an elastic material.

22. A display device, comprising a display panel that conducts display by using light from the illumination device according to claim 3.

23. The display device according to claim 22, wherein the display panel is a liquid crystal panel that uses liquid crystal.

24. A television receiver, comprising the display device according to claim 22.

* * * * *